June 20, 1967

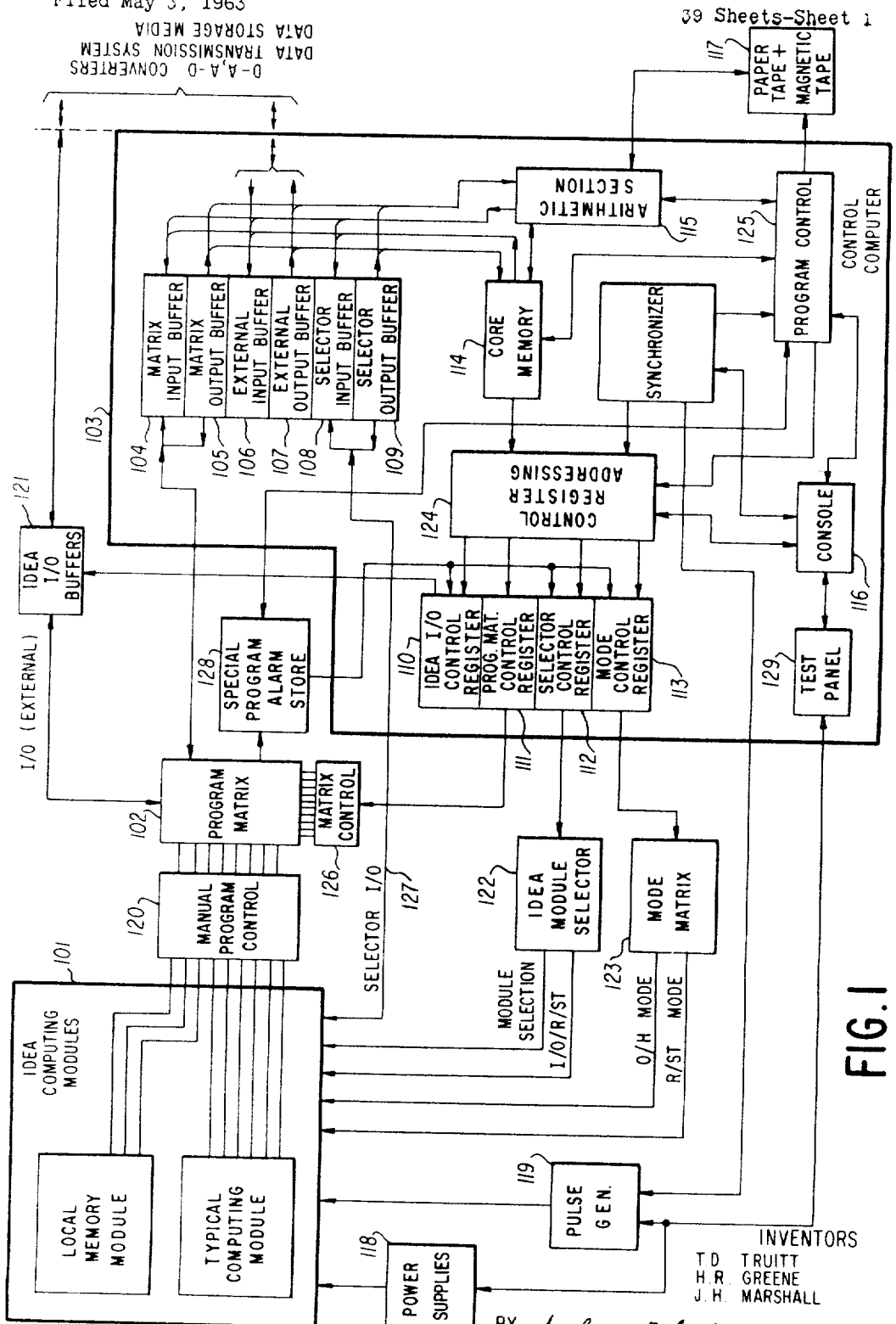

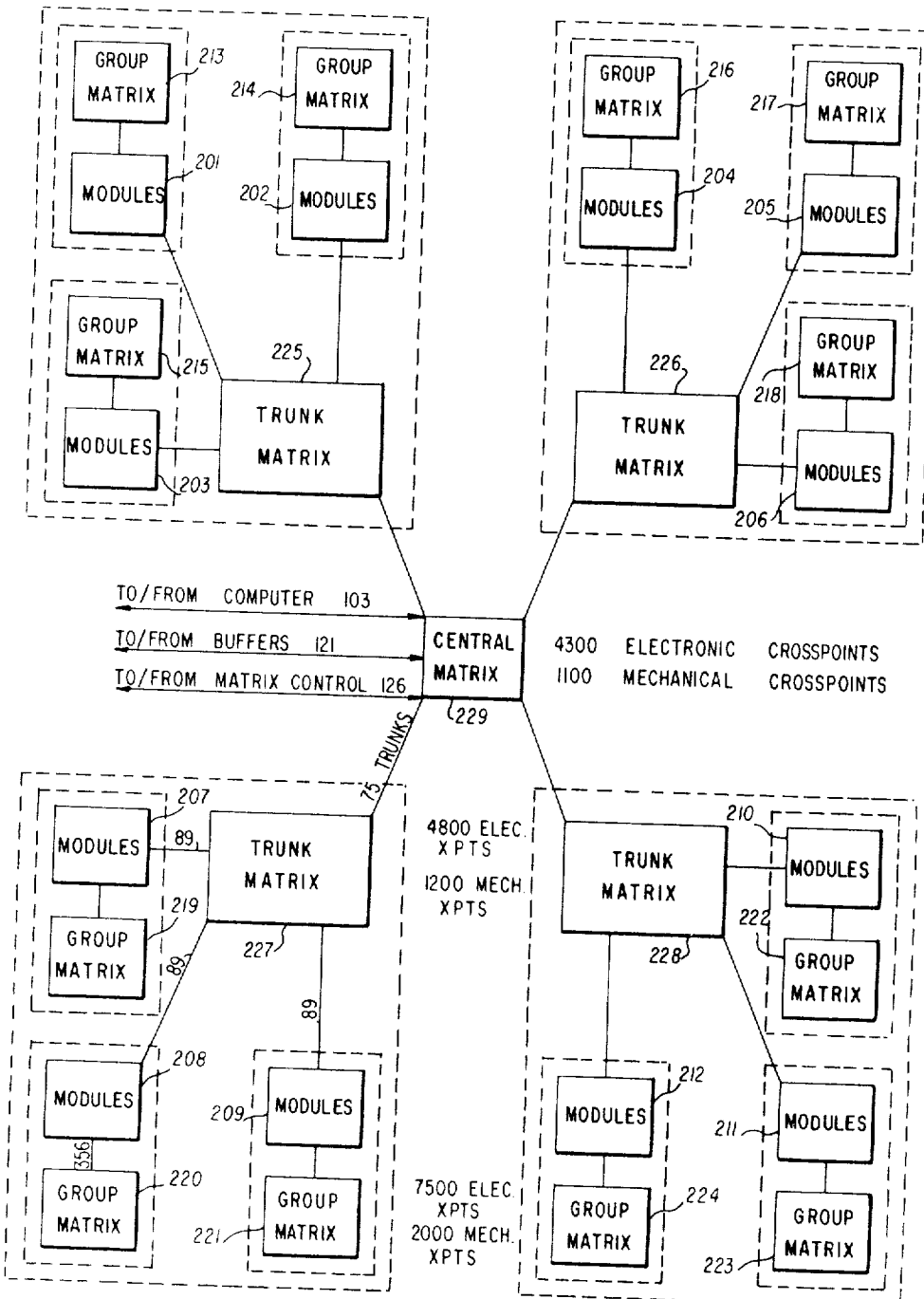

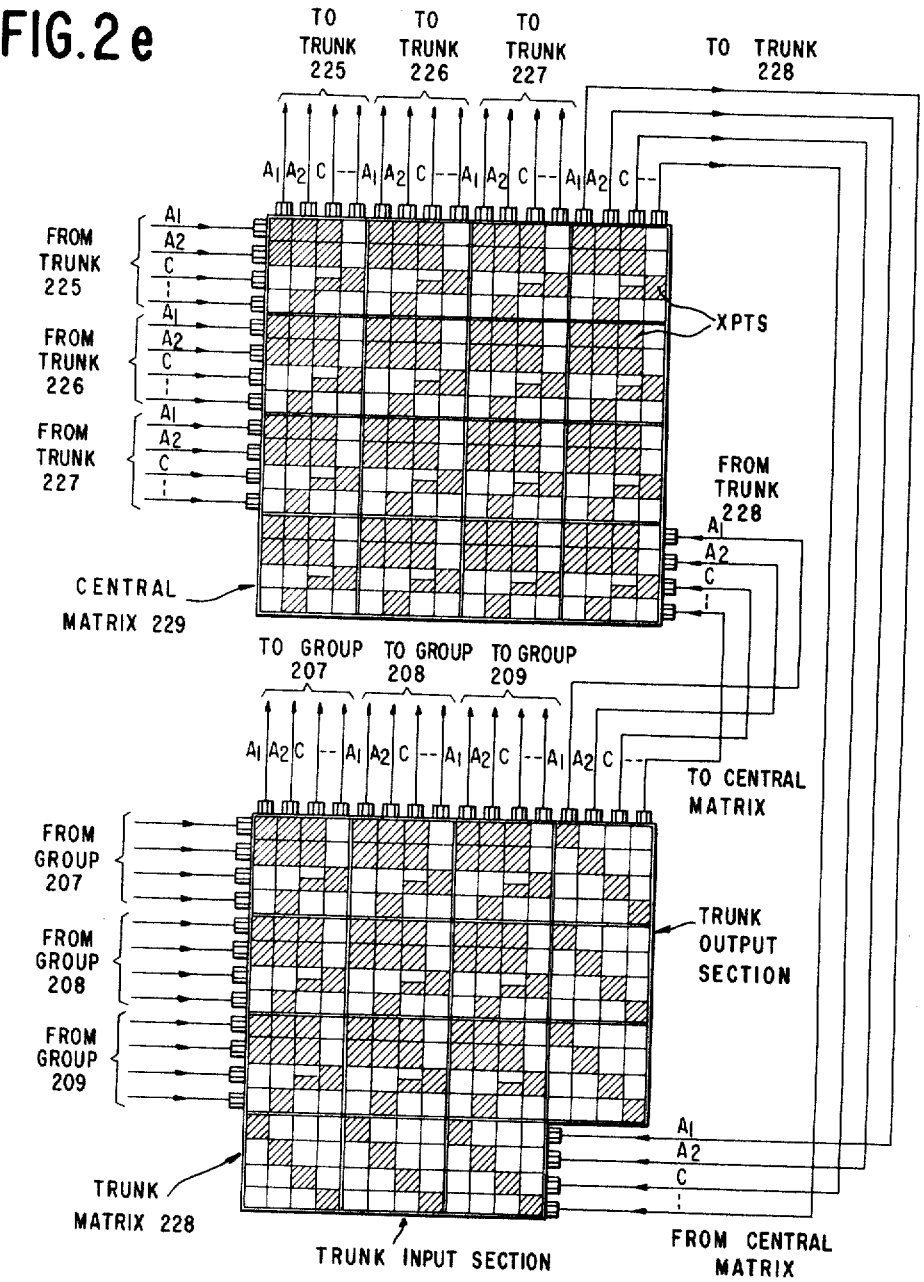

T. D. TRUITT ET AL 3,327,102

COMPUTING SYSTEM

Filed May 3, 1963

June 20, 1967  T. D. TRUITT ETAL  3,327,102
COMPUTING SYSTEM
Filed May 3, 1963
39 Sheets-Sheet 8
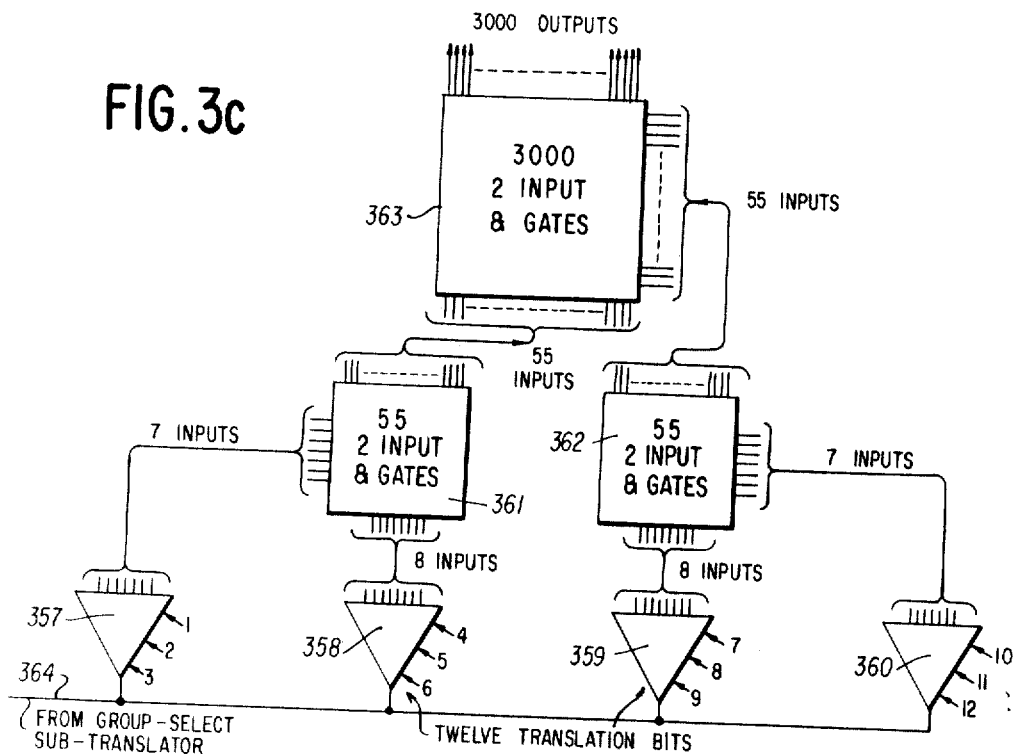
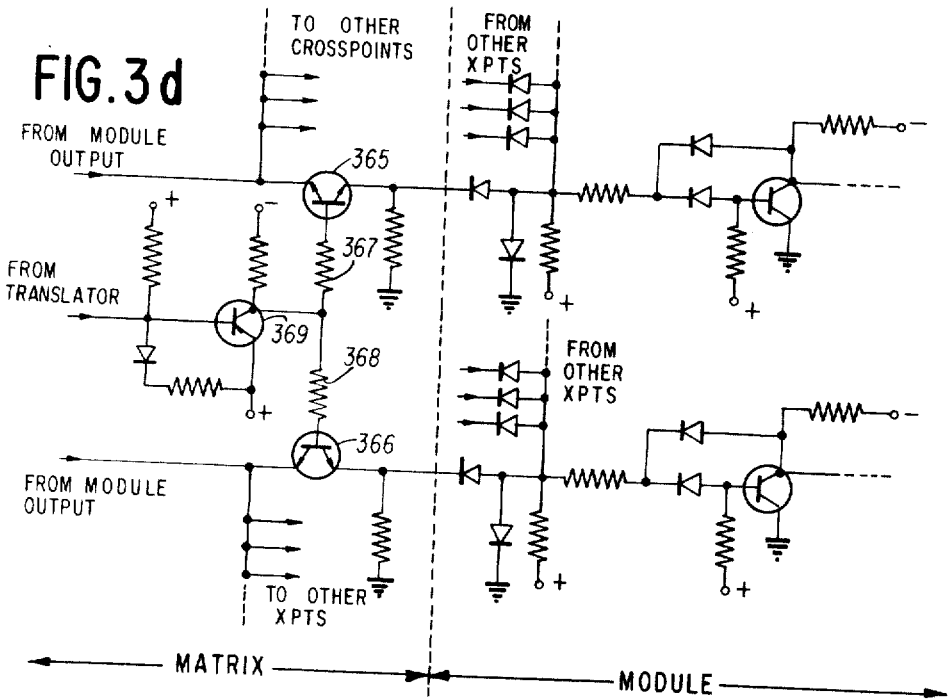

June 20, 1967  T. D. TRUITT ET AL  3,327,102
COMPUTING SYSTEM
Filed May 3, 1963
39 Sheets-Sheet 9

FIG. 4

LIST OF SYMBOLS

∩, LOGICAL "AND"

∪, LOGICAL "OR"

$\overline{f}$, LOGICAL "INVERSION" OF FUNCTION, f $\hat{f}$, BOTH THE LOGICAL FUNCTION, f, AND ITS COMPLEMENT f⟩, LOGICAL SYMBOL TO COMPLEMENT THE FUNCTION, f Ⓕ, LOGICAL SYMBOL FOR THE SIGN OF FUNCTION, f

═══, 4 BIT NUMBER

≡≡≡, 8 BIT NUMBER

-----, 4 BIT DISTRIBUTED RATE

=====, 8 BIT DISTRIBUTED RATE

─────, SINGLE BIT

────≫, PULSE LINE

ATTACHED SLANT LINE REPRESENTS SIGN BIT.

ATTACHED DASHED SLANT LINE REPRESENTS THAT THE AVAILABLE SIGN IS NOT USED.

SIGN AND INVERTED SIGN BOTH AVAILABLE.

$\underset{=}{n}$, $\underset{-----}{n}$, A BIT NUMBER WHERE n ≠ 1 OR 4 OR 8.

BAR ON SLANT LINE REPRESENTS SIGN INVERSION.

June 20, 1967     T. D. TRUITT ETAL     3,327,102
COMPUTING SYSTEM
Filed May 3, 1963                          39 Sheets-Sheet 10
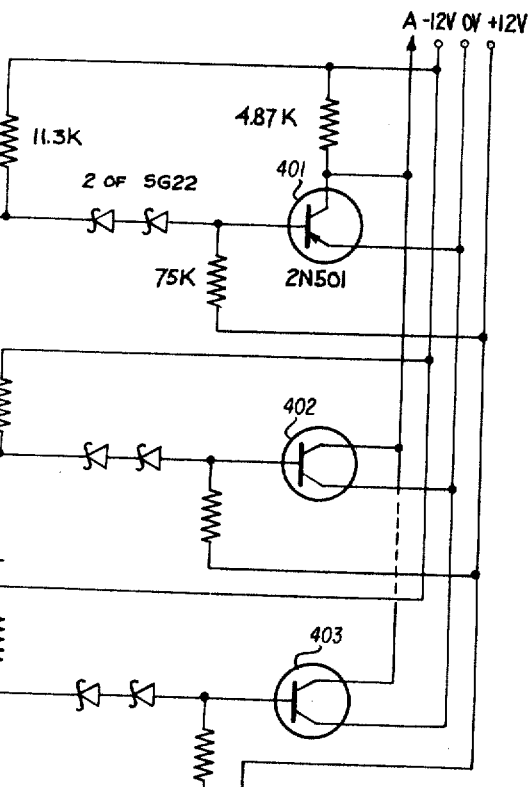
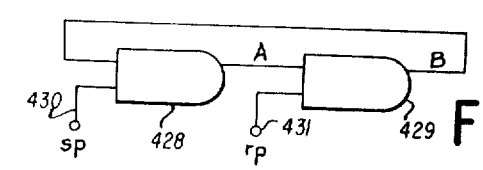

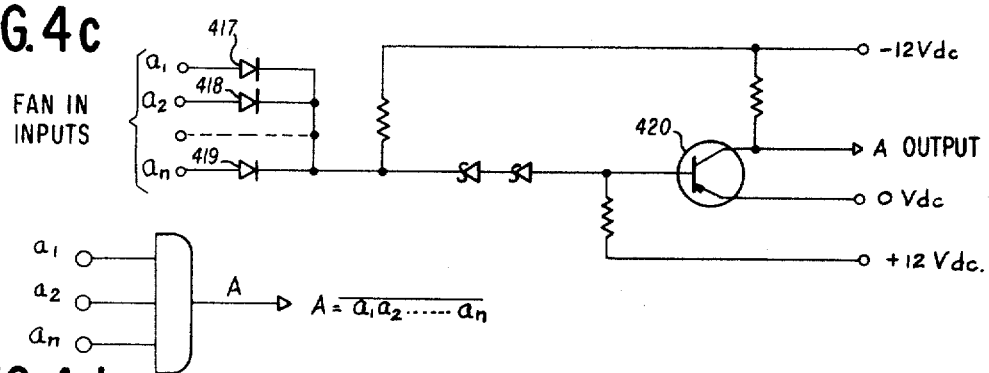
FIG. 4c
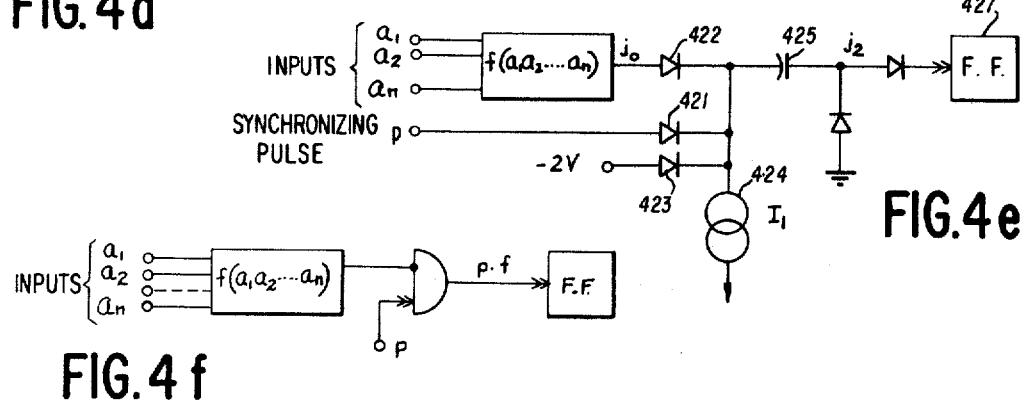
FIG. 4d
FIG. 4e
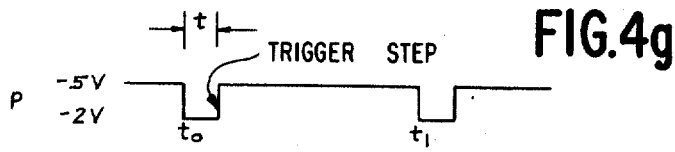
FIG. 4f
FIG. 4g
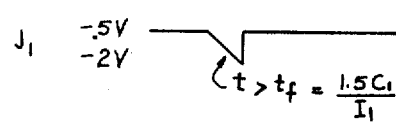
FIG. 4h
FIG. 4i
FIG. 4j

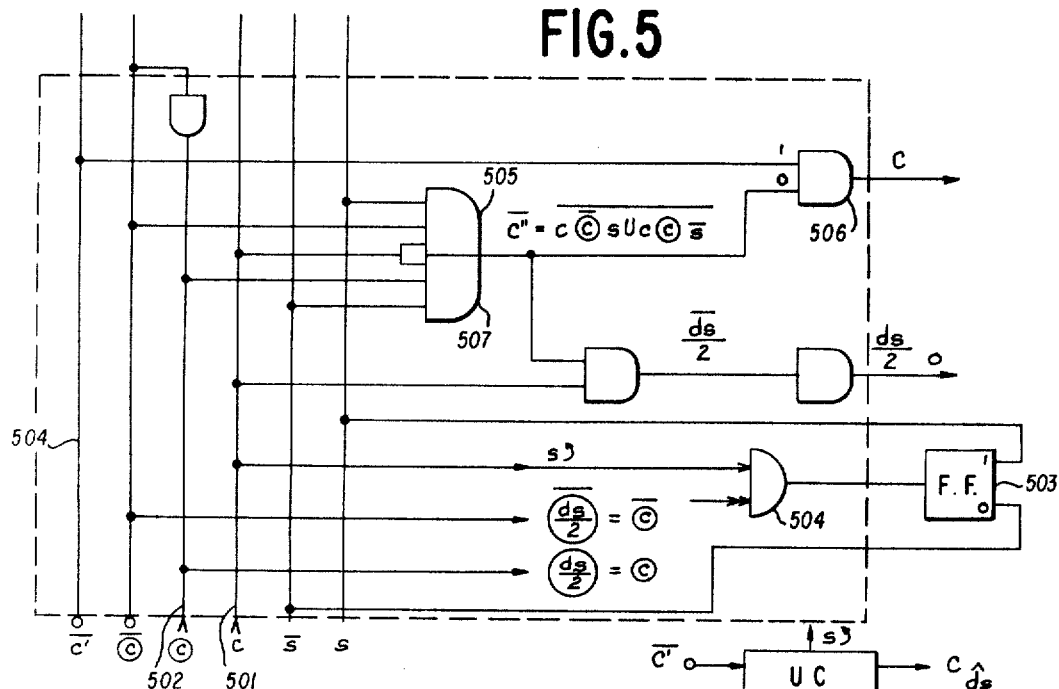
FIG.5
FIG.5a
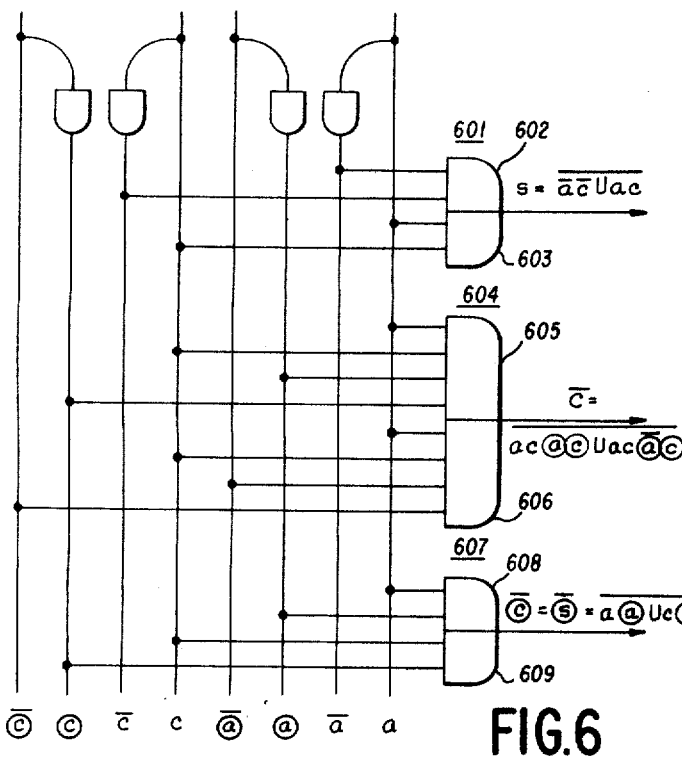
FIG.6
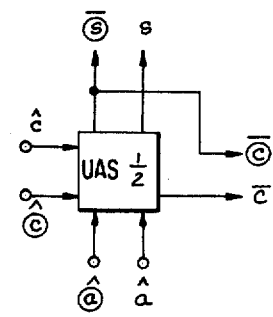
FIG.6a

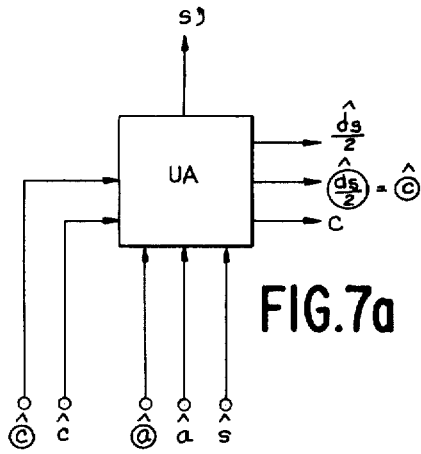
FIG. 7a
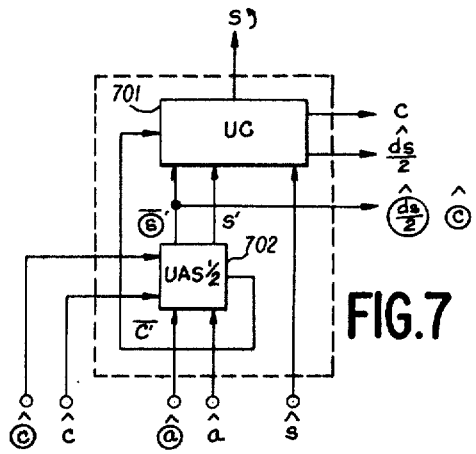
FIG. 7
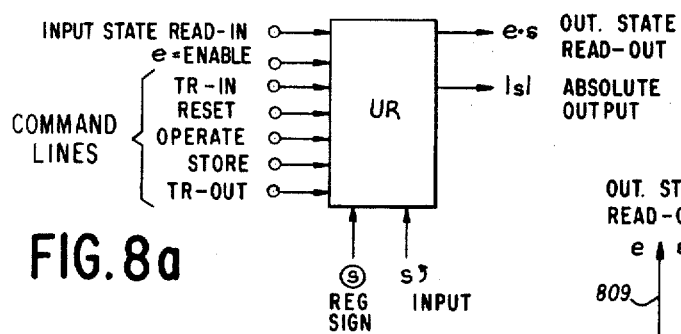
FIG. 8a
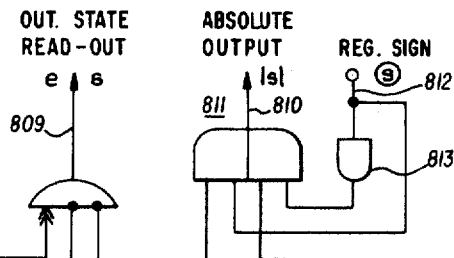
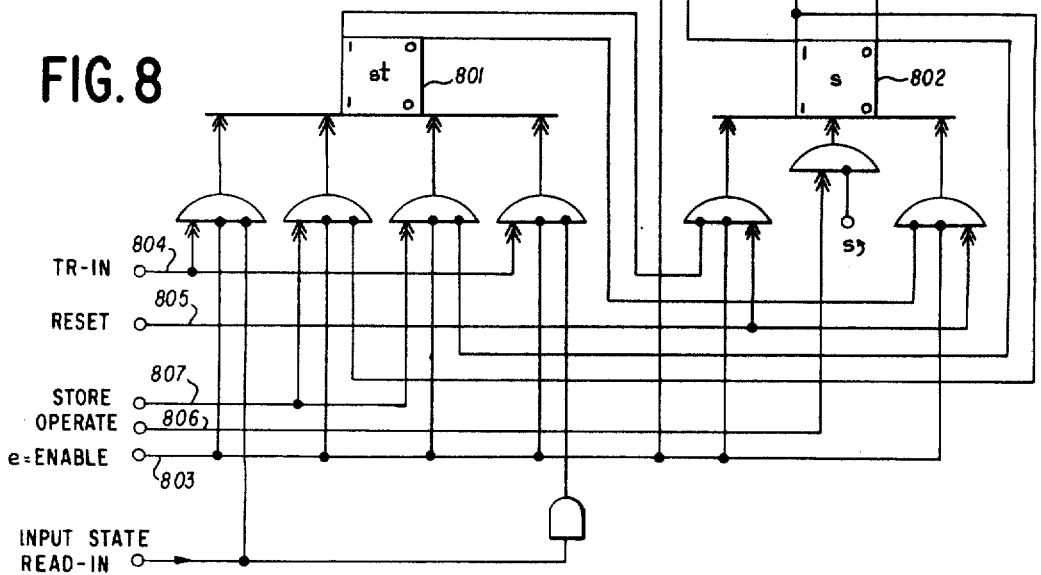
FIG. 8

June 20, 1967   T. D. TRUITT ETAL   3,327,102
COMPUTING SYSTEM
Filed May 3, 1963   39 Sheets-Sheet 15

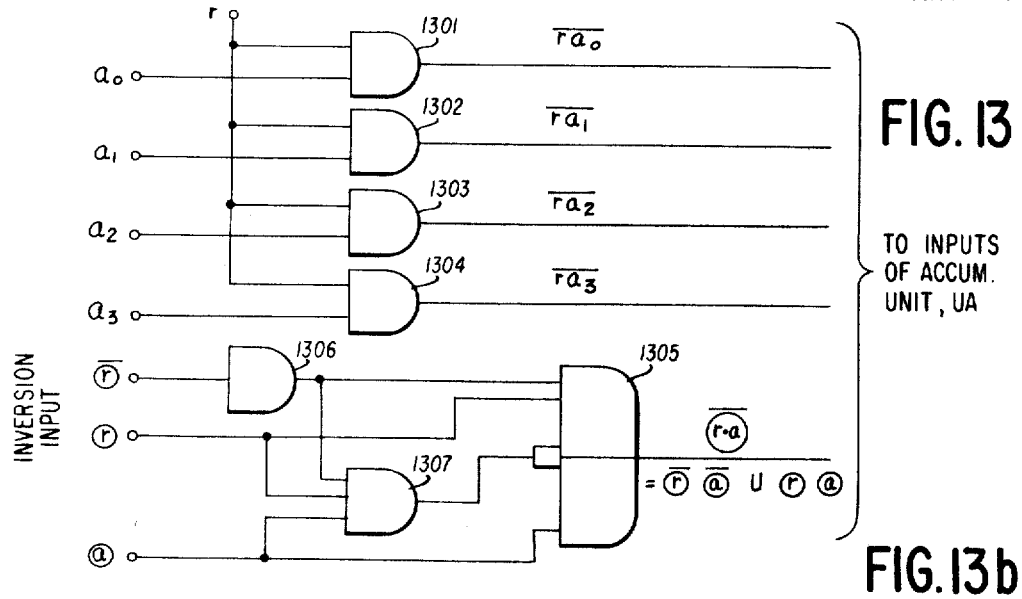
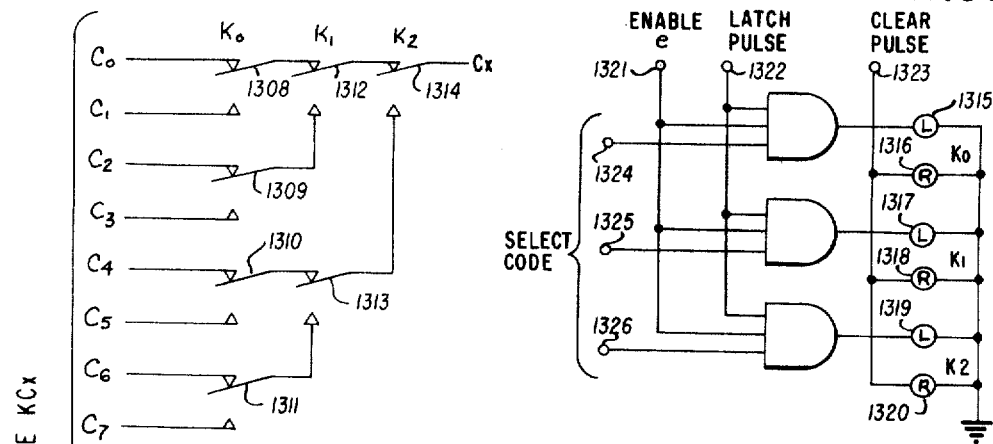
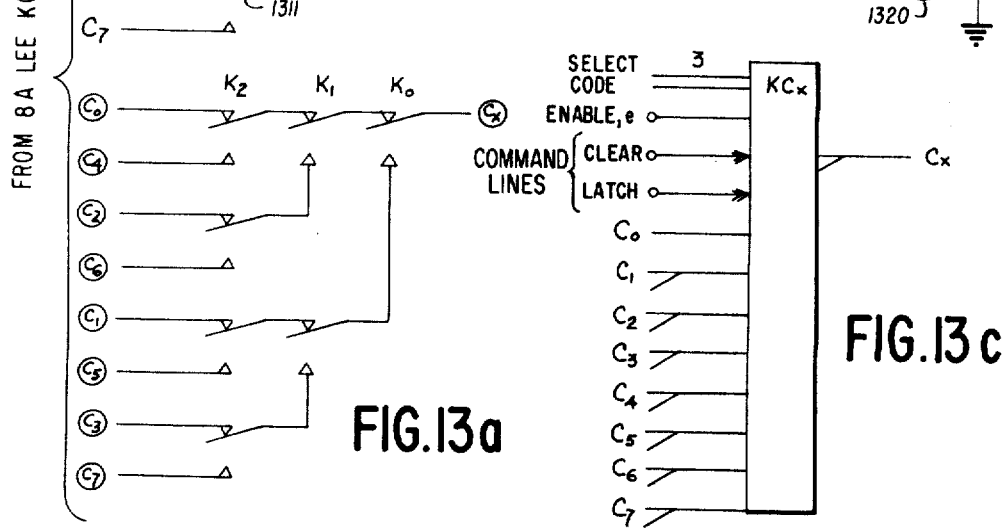

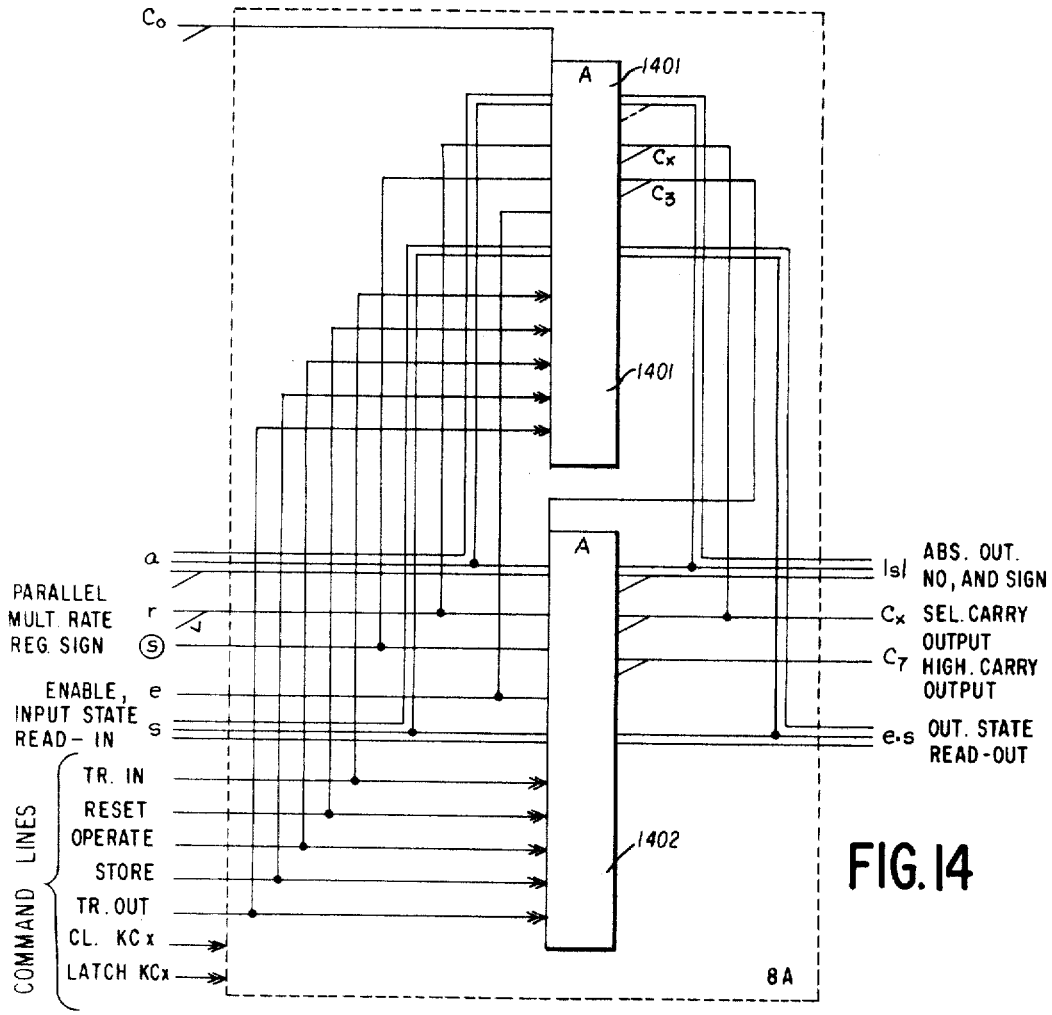
FIG. 14
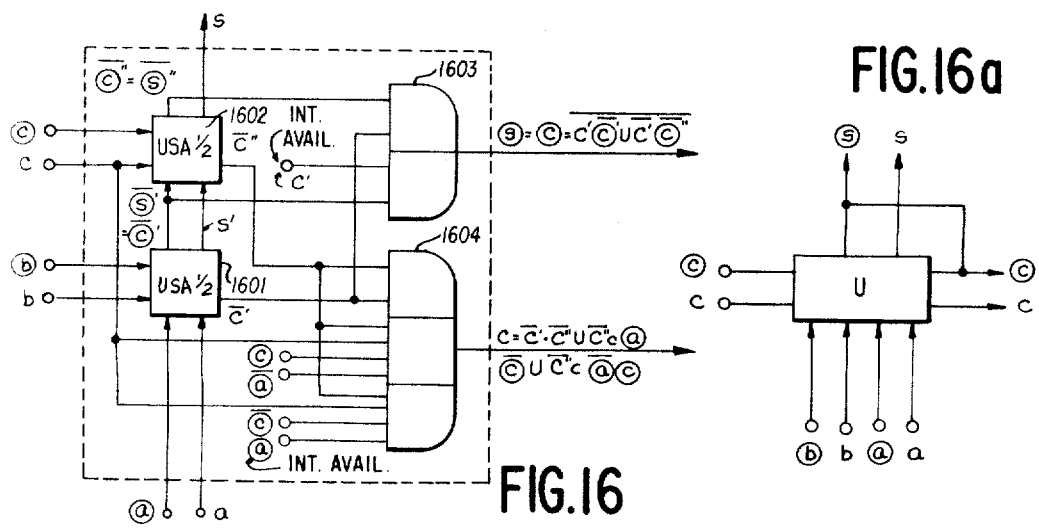
FIG. 16
FIG. 16a

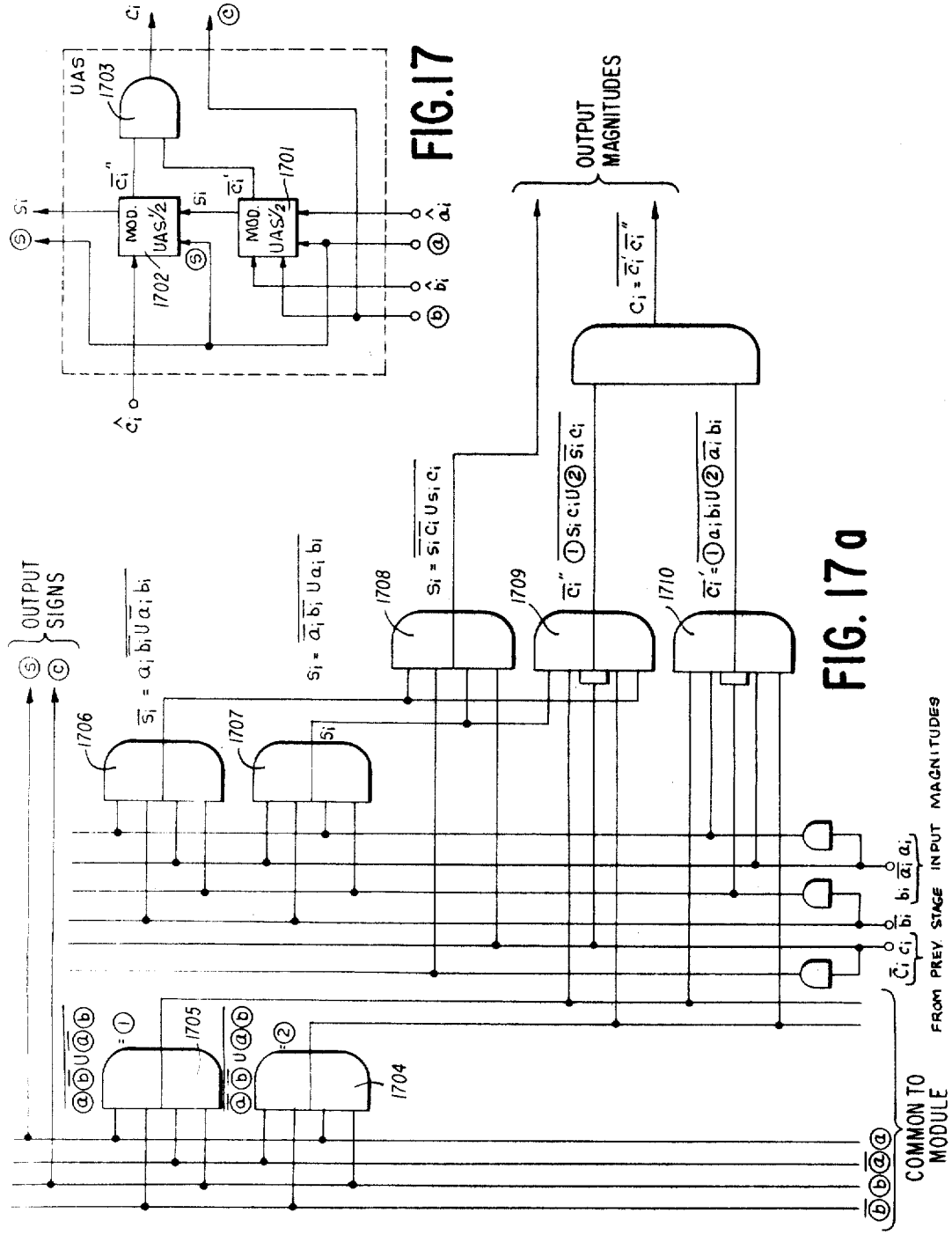

MUST HAVE 0-STATE IF NOT USED

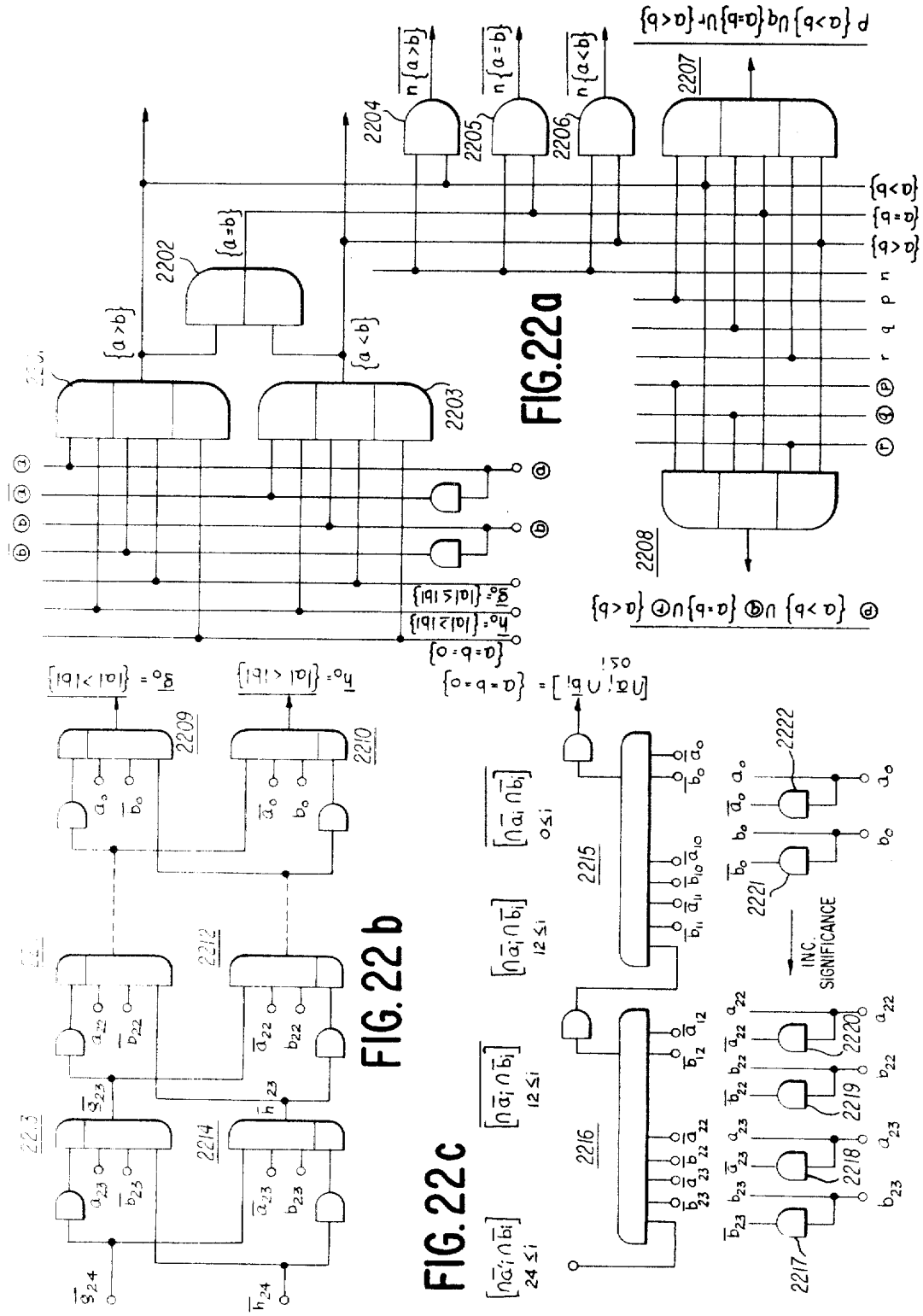

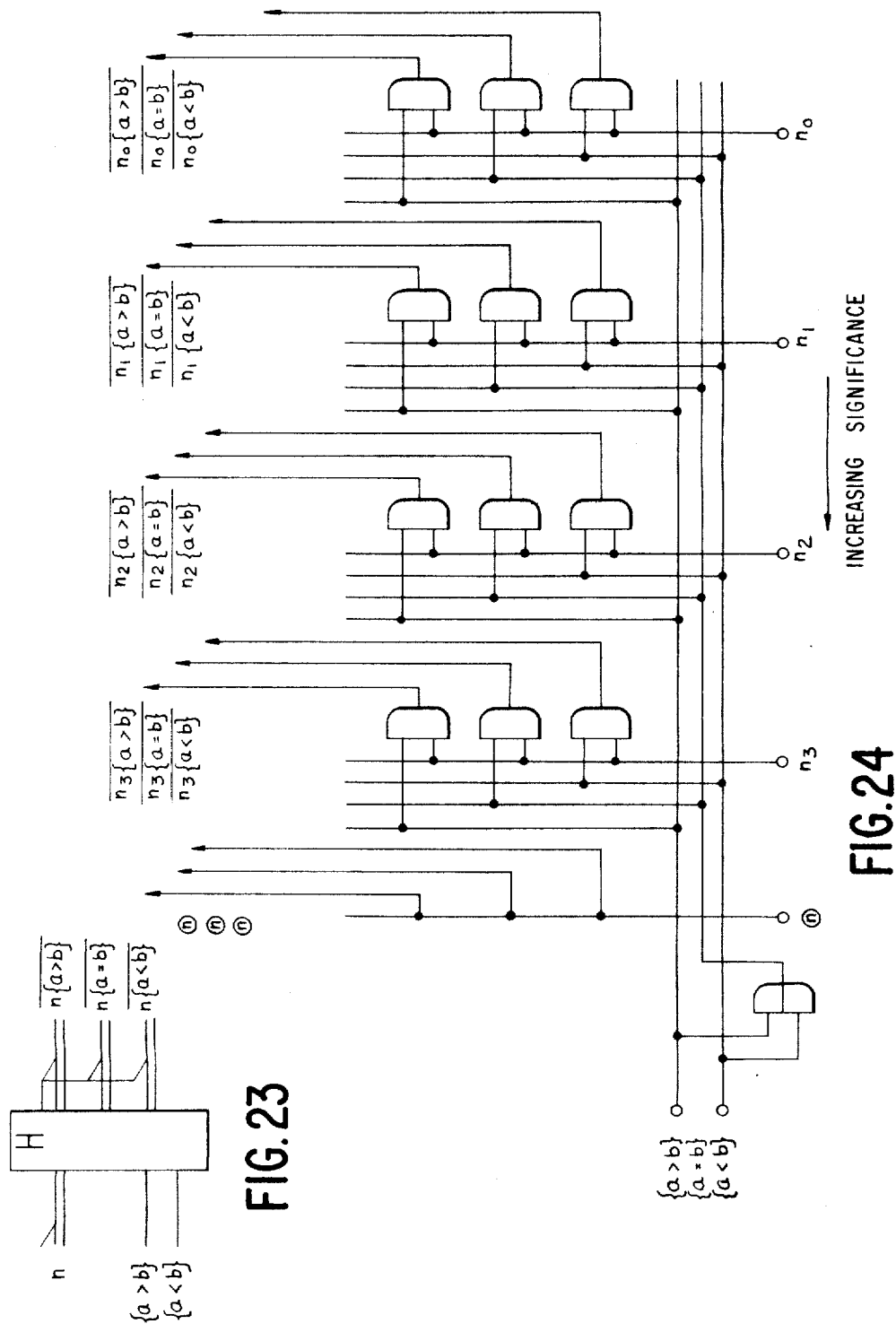

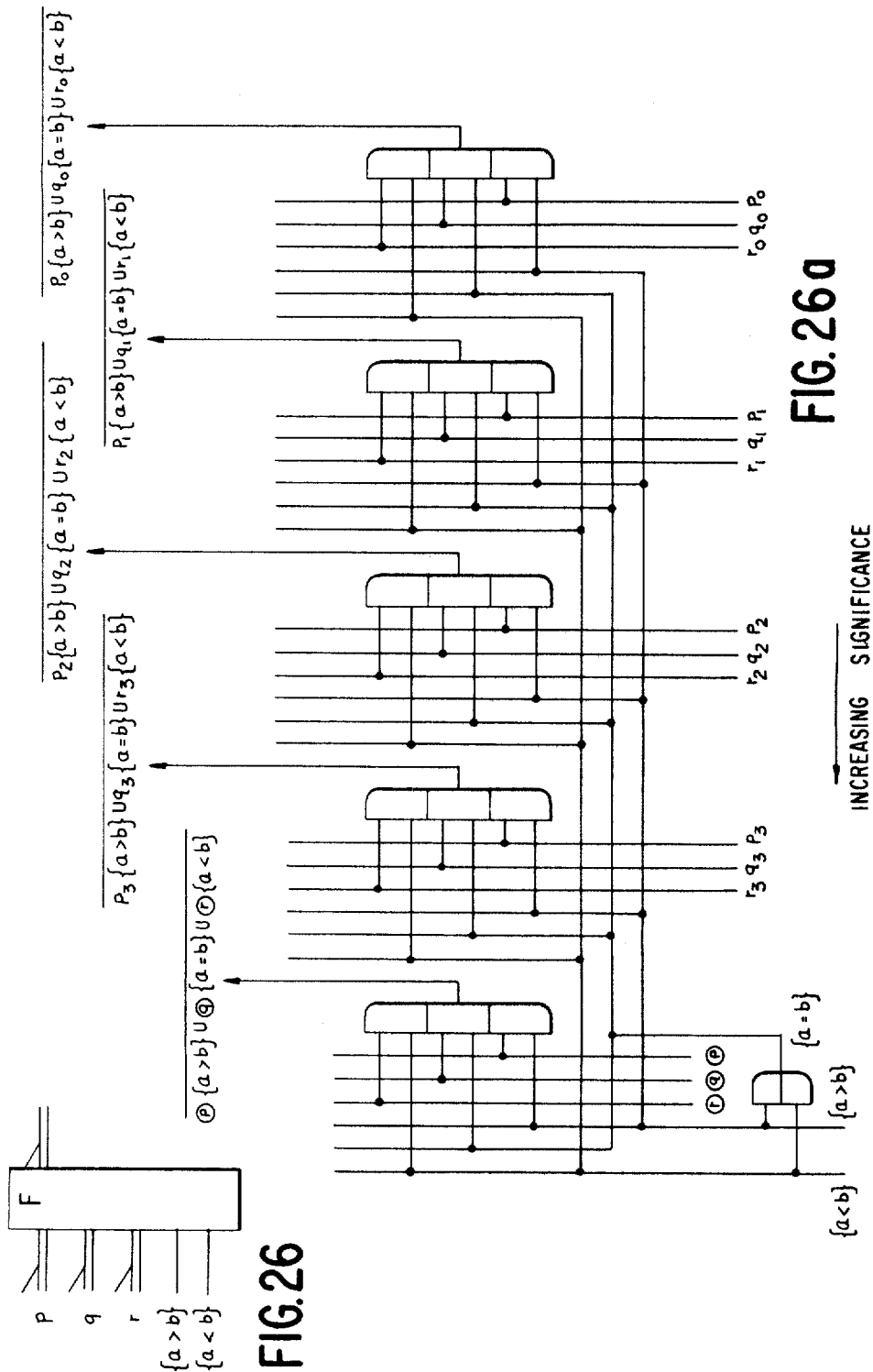

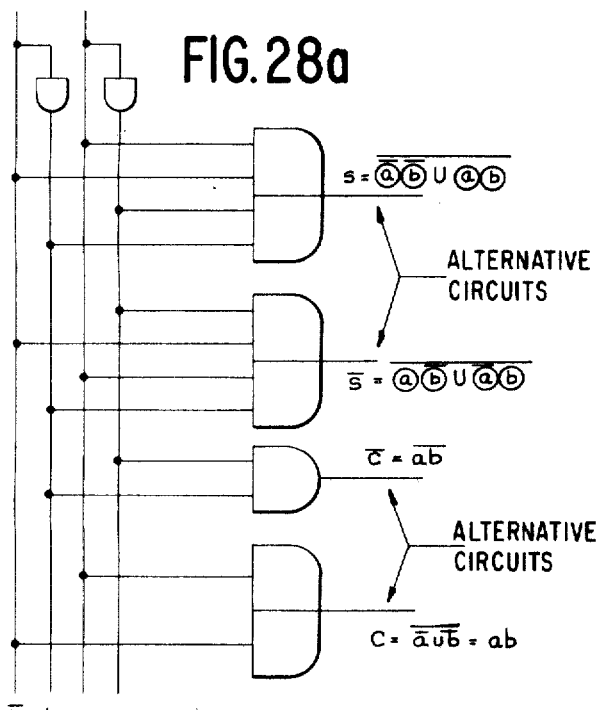
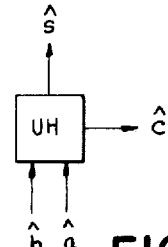
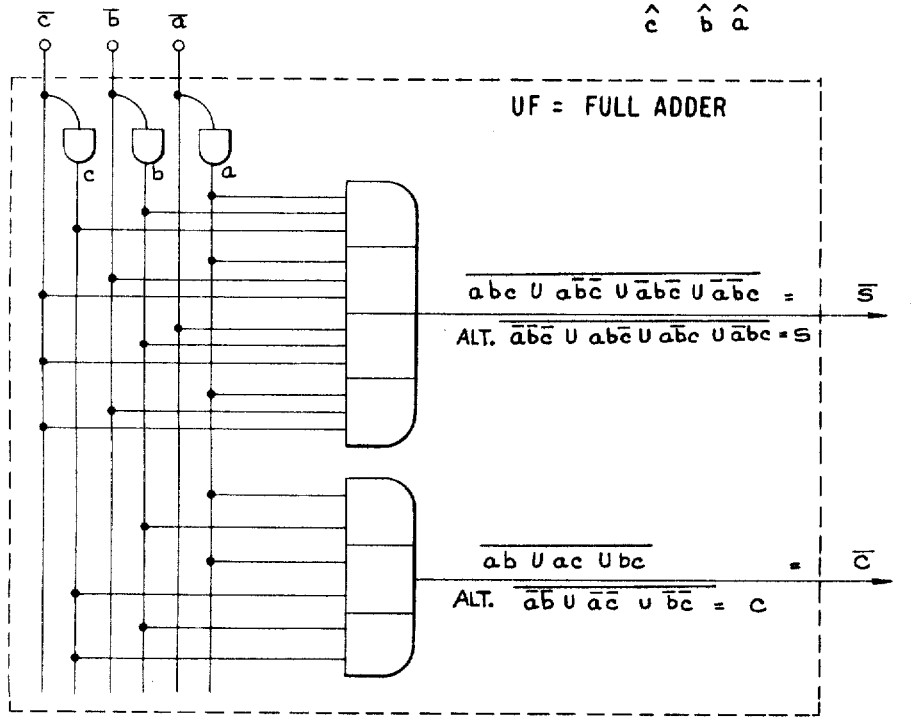

$S_0 = a_0 b_0 + m_0 + n_0$ $S_1 = a_0 b_1 + a_1 b_0 + c_0 + m_1 + n_1$ $S_2 = a_0 b_2 + a_1 b_1 + a_2 b_0 + c_{11} + c_{12} + m_2 + n_2$ $S_3 = a_0 b_3 + a_1 b_2 + a_2 b_1 + a_3 b_0 + c_{21} + c_{22} + c_{23} + m_3 + n_3$ $S_4 = a_1 b_3 + a_2 b_2 + a_3 b_1 + c_{31} + c_{32} + c_{33} + c_{34}$ $S_5 = a_2 b_3 + a_3 b_2 + c_{41} + c_{42} + c_{43}$ $S_6 = a_3 b_3 + c_{51} + c_{52}$ $S_7 = \phantom{a_3 b_3 +} c_6$ June 20, 1967 T. D. TRUITT ETAL 3,327,102
COMPUTING SYSTEM
Filed May 3, 1963 39 Sheets-Sheet 28
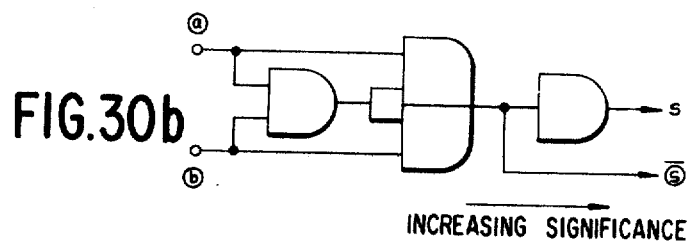
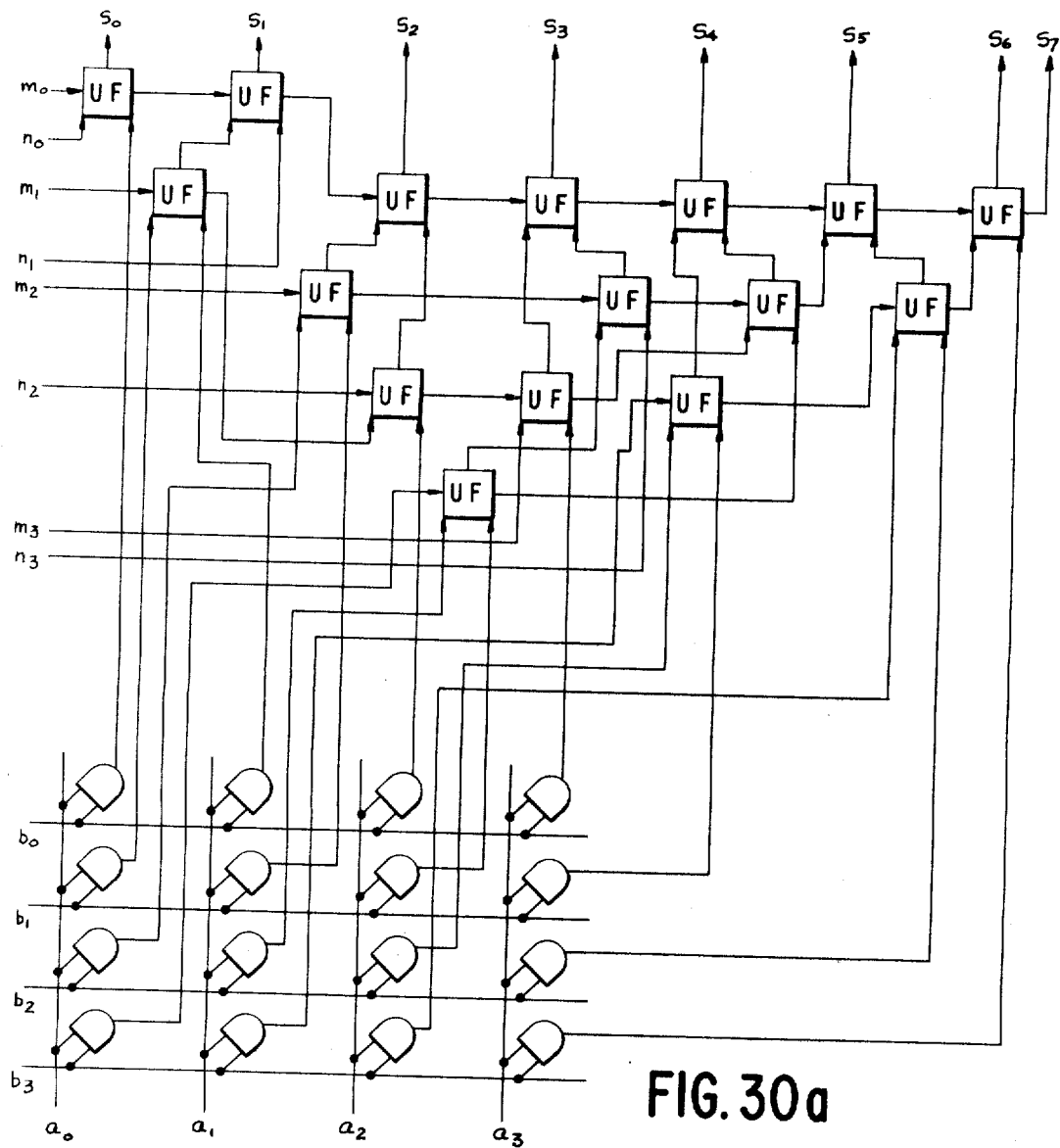

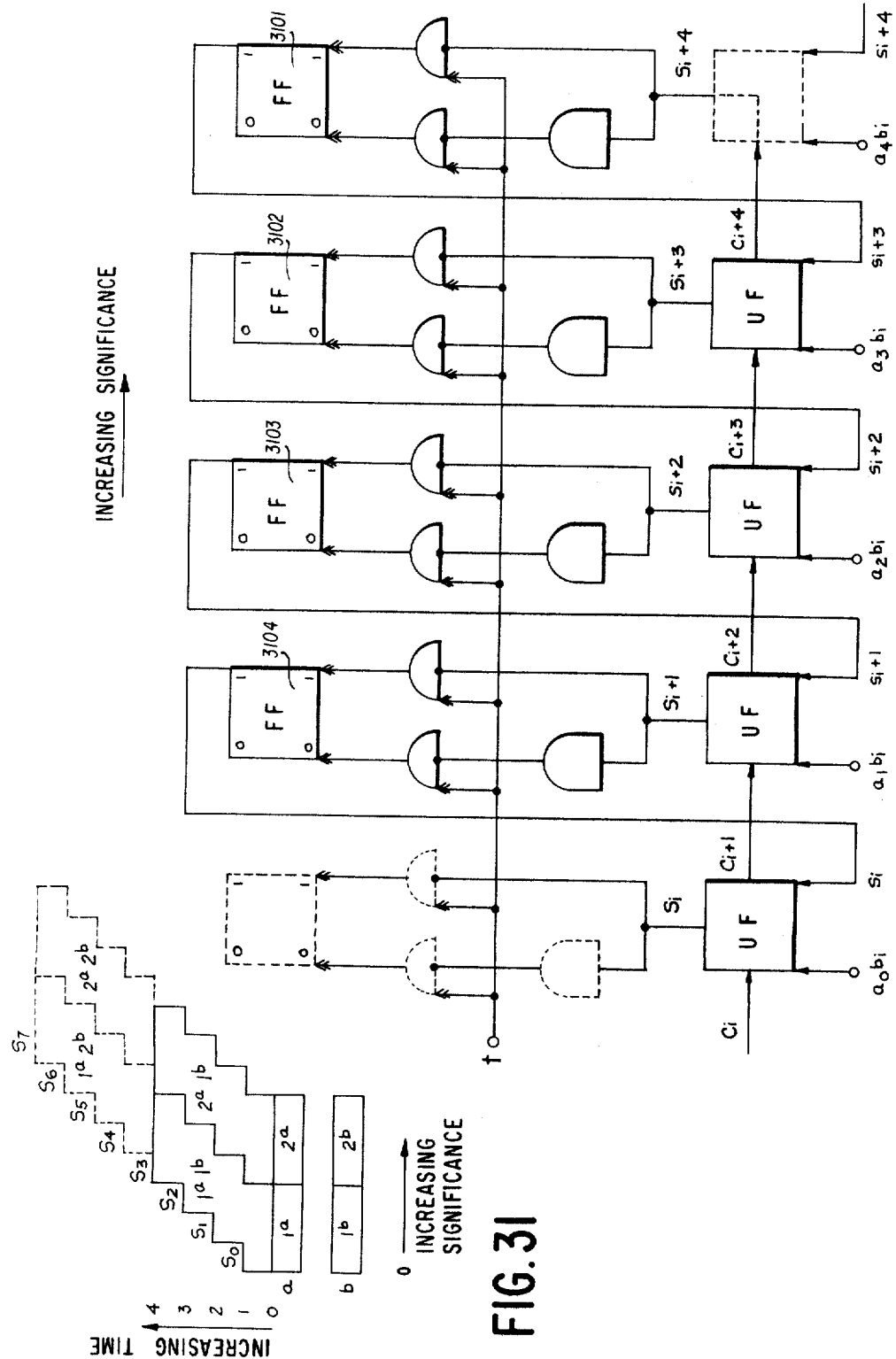

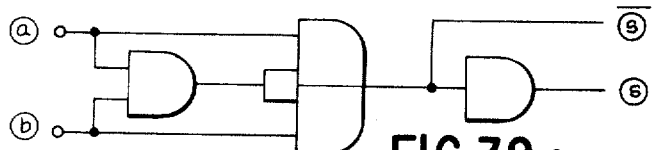
FIG. 32c
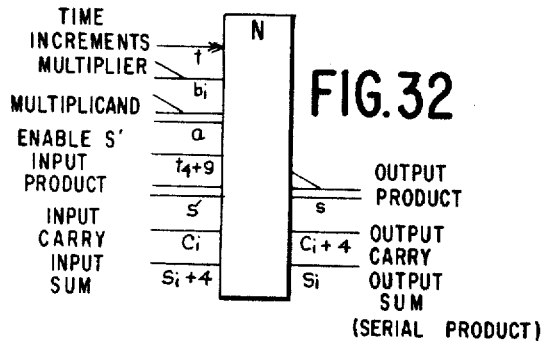
FIG. 32
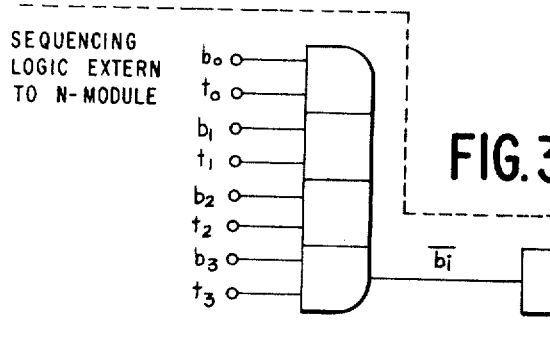
FIG. 32b
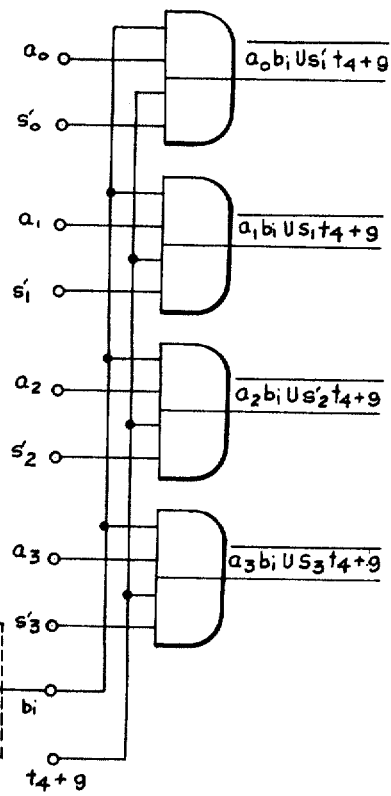
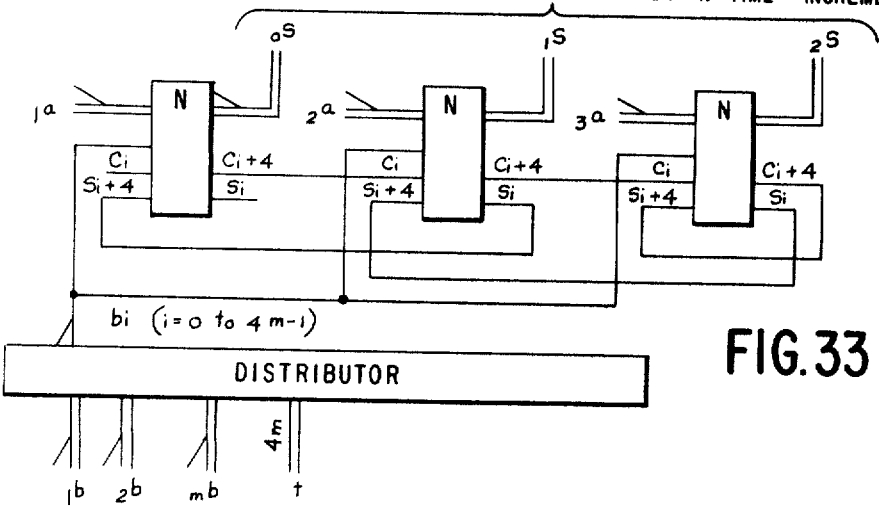
FIG. 33

| FIG. 36a | FIG. 36b |

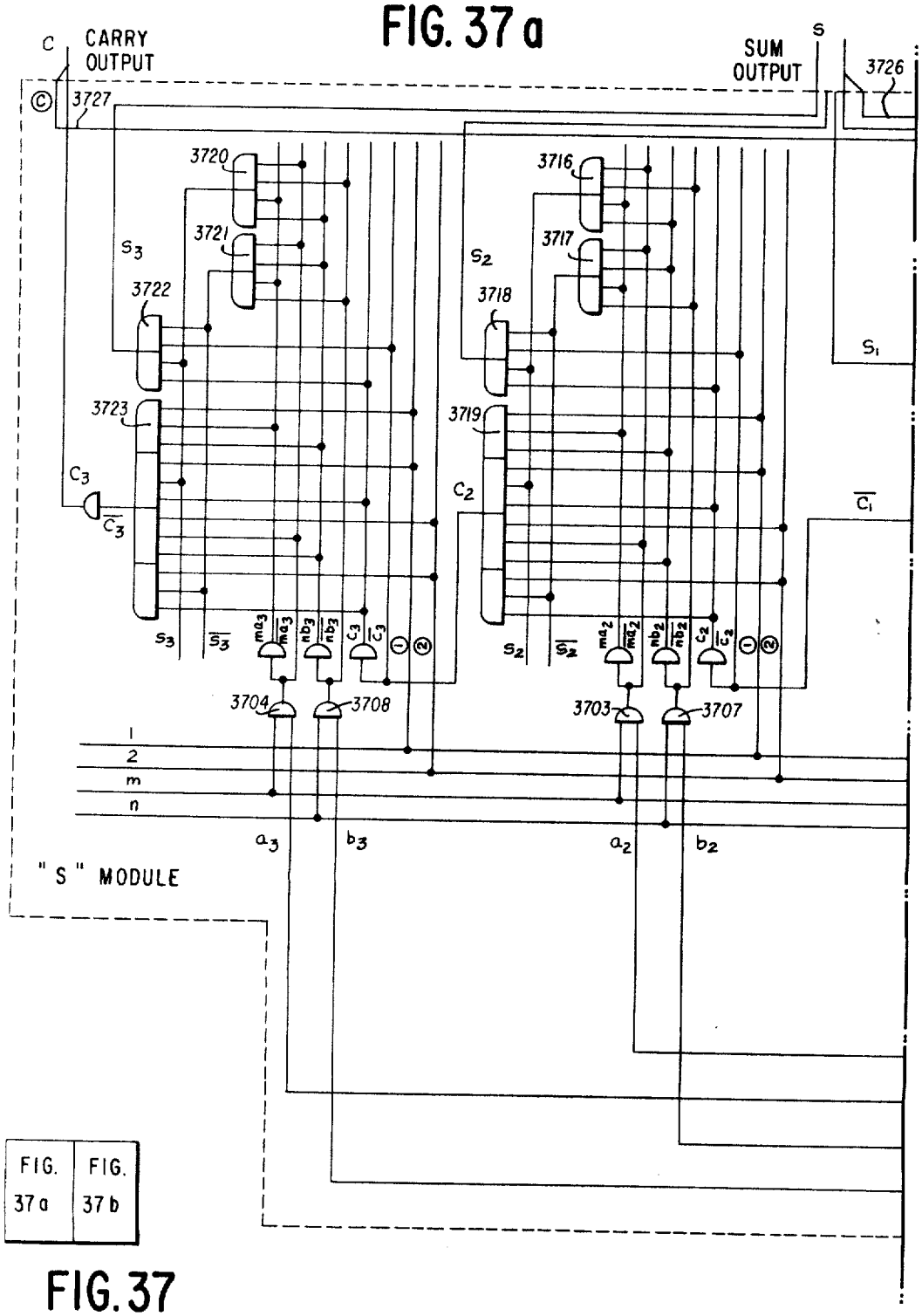

United States Patent Office 3,327,102
Patented June 20, 1967

3,327,102
COMPUTING SYSTEM
Thomas D. Truitt, Princeton, Harold R. Greene, New Shrewsbury, and Joseph H. Marshall, Riverton, N.J., assignors to Electronic Associates, Inc.
Filed May 3, 1963, Ser. No. 277,812
17 Claims. (Cl. 235—156)

This invention relates to computing systems and more particularly to a computing system utilizing the combination of digital and analog techniques to solve complex problems in real time.

TABLE OF CONTENTS

1. Introduction.
2. Objects.
3. List of Drawings.
4. Description of Block Diagram.
    4.1. Control Computer 103.
    4.2. Program Matrix 102.
        4.2.1. Group Matrix Sections 213–224.
        4.2.2. Trunk Matrix and Central Matrix.
    4.3. Matrix Control 126.
5. Description of Modules 101.
    5.1. Timing and Basic Circuitry.
    5.2. Counting Unit.
    5.3. Half Adder-Subtracter Unit.
    5.4. Accumulating Unit.
    5.5. Register Unit, UR.
    5.6. Counter Module, C.
    5.7. Eight-bit Counter Module, 8C.
    5.8. Bit-Rate Summer/Register Sign, B.
    5.9. Accumulator Module, A.
    5.10. Eight-bit Accumulator Module, 8A.
    5.11. Rate Multiplier, R.
    5.12. Summing Unit, U.
    5.13. Adder-Subtracter Unit, UAS.
    5.14. Adder-Subtracter Module, S.
    5.15. Eight-bit Adder-Subtracter Module, 8S.
    5.16. Eight-bit Module with Two Inputs, 8A.
    5.17. Comparator Module, W.
    5.18. Electronic Switch Module, H.
    5.19. Eight-bit Electronic Switch Module, 8H.
    5.20. Electronic Switch Module, F.
    5.21. Eight-bit Electronic Switch Module, 8F.
    5.22. Half Adder Unit, UH.
    5.23. Full Adder Unit, UF.
    5.24 Simultaneous Multiplier Module (Parallel), M.
    5.25. Serial Parallel Multiplier, N.
    5.26. Expandable Serial-Parallel Mutipication.
    5.27. Simultaneous (Serial-Parallel) Multiplication.
6. Description of Operation Involving Solution of Simple Differential Equation.
    6.1. Scaling, Assumptions and Initial Conditions.
    6.2. Description of Block Diagram, 35a.
    6.3. Description of Accumulator Module.
    6.4. Description of Adder-Subtracter Module.
    6.5. Description of Counter Module.
    6.6. Description of Bit-Rate Summer/Register Sign Module.
    6.7. Operation.
7. Description of Operation Involving Solution of Two-Body Problem.

This specification describes a complex computing system and includes an extensive description of many of the details necessary to provide a complete disclosure of the system. However, many of these details are not necessary to an understanding of the basic inventive concepts. In order most quickly to understand the invention, the following is a suggested sequence for reading the specification. Section 1, Introduction; Section 2, Objects; Section 4, Block Diagram up to Section 4.1. Sections 5.1 through 5.5 should be read to gain an understanding of the timing, basic circuitry and logic symbols used in describing the basic arithmetic units or modules. Section 6, describing in detail the solution of a simple differential equation, and Section 7, describing the operation of the computer in solving a complex problem of the type which can be solved in real time only by the computer disclosed in this specification, will provide a final understanding of the invention.

1. Introduction

This invention is directed to digital computing equipment based on a new computing system concept. The computer is referred to as an Integrated Digital Electronic Automatic Computer and, henceforth in this application, will be referred to as an IDEA-type computer.

The IDEA computing system combines the best features of analog and digital computers without many of the limitations of either. Such a system has its primary purpose in the solution of the scientific problems involving sets of nonlinear differential and algebraic equations. In order to accomplish this result, the building blocks of this system are designed for simultaneous operation in the manner of an analog computer while at the same time providing the precision normally associated with digital techniques. The system described in this specification is superior to conventional analog computers in precision, speed of solution, and convenience of automatic programming, check-out and operation. In comparison with existing digital differential analyzers, this computer has greater flexibility and is many times more accurate for comparable real time speeds of solution. This computer has a great speed advantage over even the fastest digital computer due to the use of parallel arithmetic units and a very high iteration rate which approximates one hundred thousand to one million steps per second.

These advantages are accomplished by providing for simultaneous operation of all arithmetic units. These arithmetic units may be combined to form, for example, a plurality of registers. A first register may be used to accumulate a dependent variable. The contents of this register may be simultaneously transferred to another group of arithmetic units in which a parallel mathematical operation involving the dependent variable and one or more independent variables is performed. The outputs of this second group of arithmetic units may be used to provide a parallel input to the first register. In this manner, it is possible continuously and simultaneously to perform mathematical operations involving the dependent variable as well as one or more independent variables which may be functions of time. Such operations are quite important in the solution of many complex problems, particularly those involving differential equations.

An IDEA-type computer is a unique combination of digital building blocks integrated to form a system in which all parts act in unison. The computations are performed in a manner similar to that used in analog computers, although the IDEA computer is implemented with digital computer algorithms, logic, and circuits.

An IDEA-type computer includes a large number of digital devices, in a number of different forms, referred to as IDEA modules. Means are provided for interconnecting the input and output terminals of the modules. The modules include sections of binary registers, adders, subtracters, multipliers and gating circuits which can be combined to form mathematical building blocks such as integrators, multipliers, and arbitrary function generators. The building blocks are interconnected to solve useful mathematical problems. The modules may be interconnected by means of an automatic switching matrix set up by a control system provided to operate the IDEA computing system. This control system may be a digital computer which completely automates the programming and control of the system.

The IDEA-type computer has particular application to the performance of faster than real time calculations of aerospace vehicle trajectories under conditions of variable thrust, aerodynamic drag and multiple gravitational forces where the customary simplifying assumptions are invalid and the kinematic equations must be solved. High speed repetitive calculations of such complexity can be accomplished only with a computer having the speed and accuracy of an IDEA-type computer.

In accordance with one embodiment of the invention, a first group of modules are directly interconnected to form a register which accumulates partial sums and provides partial carries to succeeding modules. Each of these modules is adapted to provide a partial sum of a multiple bit parallel input and the single bit of a serial input rate signal. A second group of modules are interconnected to form a similar register which provides partial sums and partial carries. This second group of modules accumulates the product of a parallel input signal and a serial rate signal. The parallel output of the second group of modules may be connected to the first plurality of registers as a parallel input. The parallel output from selected stages of the first group of modules is connected as a parallel input to the second group of registers. By this arrangement it is possible to accumulate in the first group of modules a dependent variable which is a function of the independent variable time, the independent variable rate signal and a product of the dependent variable contained in the first group of modules and any of the independent variables.

2. Objects

Accordingly, it is an important object of the present invention to provide an improved computer system for the solution of scientific problems involving sets of non-linear differential and algebraic equations.

It is a further object of the present invention to provide an improved calculating system capable of solving complex differential equations at speeds and with an accuracy not heretofore obtainable.

It is another object of the present invention to provide for the simultaneous operation of multiple digital arithmetic units to provide simultaneously solutions to complex mathematical problems.

It is a further object of the present invention to provide for operation of a plurality of computation registers in such a manner that the outputs of the output bit position registers are connected to the inputs of the input bit position registers.

It is a further object of the present invention to provide an improved computing system in which a plurality of directly connected digital arithmetic units are arranged in groups with the parallel outputs of one group of registers forming the parallel inputs for succeeding groups of registers.

It is a further object of the present invention to provide a plurality of accumulating registers each of which is adapted to accumulate the partial product of a single bit of a multiple bit parallel input signal and a serial rate signal and to accumulate the partial sum of said partial product and a third input and to provide a partial carry which is connected to succeeding register stages.

These and other objects, features and advantages of the invention will be better understood from the following more detailed description taken in conjunction with the drawings.

3. List of drawings

FIGURE 1 shows a block diagram of the system;
FIGURE 1a shows a representation of a digital computer;
FIGURE 1b shows a representation of an analog computer;
FIGURE 1c shows a representation of a digital differential analyzer;
FIGURE 1d shows a representation of an IDEA computer;
FIGURES 2 and 2b–2e show the organization of the modules and the connecting matrices;
FIGURES 3 and 3a–3c show the matrix control 126;
FIGURE 4 is a list of symbols used in the specification and drawings;
FIGURE 4a shows the circuitry for the basic asynchronous logic block;
FIGURE 4b shows the block diagram of the asynchronous logic block;
FIGURE 4c shows a single inverting gating circuit;
FIGURE 4d shows the block representation of this inverter;
FIGURE 4e shows a synchronous, OR transient gate;
FIGURE 4f shows the block representation of this gate;
FIGURE 4g is a waveform of the clock pulse input to the OR transient gate;
FIGURE 4h shows the waveform of the logic input;
FIGURE 4i shows the waveform at the common junction of diodes 421–423;
FIGURE 4j shows the waveform at the output of the OR transient circuit;
FIGURE 4k shows a logic diagram of the flip-flop;
FIGURE 4l shows the flip-flop in block form;
FIGURE 4m shows the gating circuitry for the flip-flop;
FIGURE 4n shows complement input gating for the flip-flop;
FIGURE 4o shows reset input gating for the flip-flop;
FIGURE 4p shows reset input gating for the flip-flop;
FIGURE 5 shows a counting unit;
FIGURE 5a shows a block representation of the counting unit;
FIGURE 6 shows a half adder-subtractor unit;
FIGURE 6a shows a block representation of the half adder-subtractor;
FIGURE 7 shows an accumulating unit;
FIGURE 7a shows a block representation of the accumulating unit;
FIGURE 8 shows a register unit;
FIGURE 8a shows a block representation of the register unit;
FIGURE 9 shows a counter module, C;
FIGURE 9a shows a block representation of the counter module;
FIGURE 10 shows a block representation of an eight-bit counter module;
FIGURE 11 shows a block representation of the bit-rate summer module, B;
FIGURE 12 shows a block representation of the accumulator module, A;
FIGURE 13 shows logic used in the A module;
FIGURE 13a shows the sign changing relay contacts for the A module;
FIGURE 13b shows the sign changing relay armature for the A module;
FIGURE 13c shows a block representation of the sign changing circuitry;
FIGURE 14 shows an eight-bit accumulator module, 8A;
FIGURE 15 shows a rate multiplier, R;
FIGURE 15a shows a block representation of this rate multiplier;
FIGURE 16 shows a summing unit, U;
FIGURE 16a shows a block representation of the summing unit, U;
FIGURE 17 shows the block representation of the adder-subtractor unit, UAS;
FIGURE 17a shows a logic diagram of the UAS unit;
FIGURE 18 is a block representation of the S module;
FIGURE 18a is a logic diagram of the input circuitry in the S module;

FIGURES 22a–22c show logic used in the W module;

FIGURE 23 shows a block representation of the H module;

FIGURE 24 shows the logic of the H module;

FIGURE 26 shows the block form of the F module;

FIGURE 26a shows the logic diagram of the F module;

FIGURE 28 shows a UH module;

FIGURE 28a shows the logic of the UH module;

FIGURE 29 shows a block representation of the UF module;

FIGURE 29a shows the logic of the UF module;

FIGURE 30a shows the logic of the M module;

FIGURE 30b shows the logic of the sign circuitry for the M module;

FIGURE 31 represents serial parallel multiplication;

FIGURE 32a shows a serial parallel multiplier;

FIGURE 32b shows logic used in the serial parallel multiplier;

FIGURE 32c shows the sign circuitry for the serial parallel multiplier;

FIGURE 32 shows a block representation of the serial parallel multiplier;

FIGURE 33 shows the connection of several serial parallel multipliers;

FIGURE 36b shows a portion of the A module;

FIGURE 37a shows a portion of the S module;

FIGURE 37 shows the manner in which FIGURES 37a and 37b fit together;

4. Description of block diagram

Before proceeding with a description of the IDEA computer, the principles of the invention may be better understood by a comparison of the computers depicted in FIGURES 1a–1d. FIGURES 1a–1d show simplified representations of a digital computer, an analog computer, a digital differential analyzer, and an IDEA-type computer, respectively. It will be understood that FIGURES 1a–1d are very much over-simplified and that FIGURE 1d does not truly show all of the inventive concepts of the IDEA computer.

However, a comparison of the computers is enlightening. For this purpose, there is shown in FIGURES 1a–1d how each computer produces an output $z$ which is a function of an input $x$ and the output $z$ at the previous increment of time. The present output may be designated as $z_n$ and the input and output at the previous time increment as $x_{n-1}$ and $z_{n-1}$, respectively. In the digital computer in FIGURE 1a, each new input $x$ is stored in memory 1. Digital words are extracted from memory and applied to the inputs to the arithmetic unit 2. The arithmetic unit 2 produces a digital output representing $z$ which is stored back in memory 1. When a new input $x$ is received, the new word $x$ is extracted from memory and applied to arithmetic unit 2 and the previous value of $z$ is extracted from memory 1 and applied to arithmetic unit 2. The arithmetic unit 2 then produces a new value of $z$ which is stored back in memory. Because the values of $z$ and $x$ can be represented by a very large number of digital bits, it is possible to achieve great accuracy in performing the calculations. However, where the arithmetic unit is producing a complicated function of $z$ and $x$, there is a significant amount of time required to make the numerous computations. Digital words must be transferred to the arithmetic unit too many times, thereby requiring a great many clock times to make each computation of $z$. Even the largest digital computers do not produce a new value of $z$ at each machine clock pulse time. Digital computers cannot operate in real time in producing an output $z$ which is a continuous function of the input $x$ for certain important classes of problems.

Figure 1A:
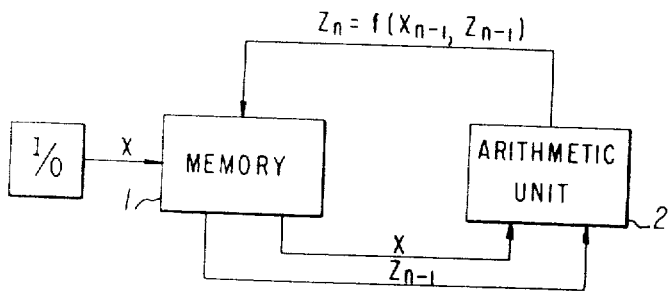
Figure 1B:
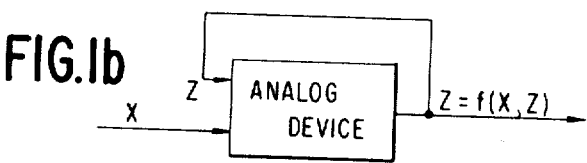

Referring to FIGURE 1b, an analog device is shown. This device accepts an input voltage $x$ and continually produces an output voltage $z$ which is a function of $x$ and $z$ because of the feedback loop. The analog device does operate in real time. However, even the most accurate analog devices are not capable of the precision required in many computations.

Figure 1C:
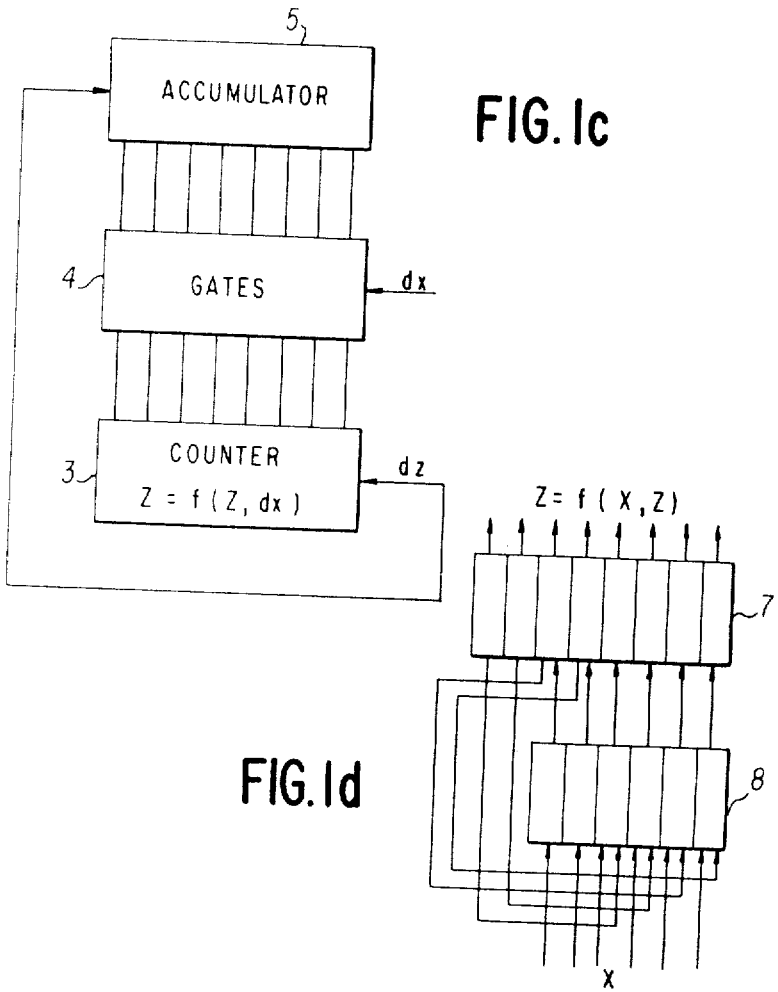

Referring to FIGURE 1c, the digital differential analyzer is seen to comprise a first counter 3 functioning as an integrand storage, a transfer device 4 functioning as a suitable gate, and a second counter 5 functioning as a remainder accumulator. An input $dx$ to the gates 4 gates the output of the counter 3 to the counter 5 to produce an output $dz$. By accumulating $dz$ in the counter 3, $z$ as a function of $z$ and $dx$ is obtained. The digital differential analyzer has the disadvantage that the serial $dx$ and $dz$ signals are not of multiple bit precision.

Figure 1D:
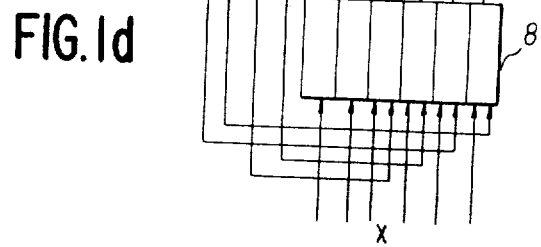

The IDEA-type computer is shown diagrammatically in FIGURE 1d. This computer includes registers 7 and 8 each of which includes a plurality of directly connected arithmetic units. Each arithmetic unit is capable of performing a complicated mathematical operation on the inputs applied thereto. It is possible to accumulate in the register 7 a number $z$ which is a function of an input $x$ and the value of $z$. The input $x$ is applied in parallel to the register 8. The multiple bit output $z$ of register 7 is also applied to the register 8 so that the register 8 continuously accumulates a function of $x$ and $z$ which is transferred to the register 7. Such a computing system has the advantage that the register 7 continuously accumulates the function $z$ in real time. At each clock time the arithmetic units in the register perform complicated arithmetic operations on the inputs to compute a new value of $dz$. This $dz$ is transferred to register 8 at the next clock time and a new $dz$ is computed. The system operates in real time because of the parallel transfer of numbers and because of the parallel operation of the arithmetic units. The computer system has the further advantage that the values $x$ and $z$ can be provided to any precision desirable merely by expanding the number of bits representing them.

Referring now to FIGURE 1, there is shown a very general block diagram showing the organization of the IDEA computing system. The most important parts of this system are a group of computing modules 101 and a program matrix 102 for interconnecting the computing modules in a desired manner. The desired interconnections between the computing modules are established by a general purpose digital computer denoted 103. The digital computer 103 may be any one of a number of commercial digital computers which include the usual input-output buffers 104–109, registers 110–113, central memory 114, arithmetic section 115, control console 116 and external memory 117.

*4.1. Control Computer 103.*—Information flow to and from the IDEA computing modules 101 may be through external buffers 121. The selection of these buffers is under control of a particular word set in the input-output control register 110 in digital computer 103.

In order to control the switching of the program matrix 102, another control word is inserted into program matrix control register 111. This word specifies the connection to be made by program matrix 102.

The selection of particular IDEA computing modules 101 is under control of the module selector 122. A particular word is inserted into selector control register 112 to provide this control. The module selector 122 addresses or selects one or more modules and then gives one of four commands. These commands are "input," "output," "reset," or "store" (I/O/R/ST).

In order to control the mode of operation of the IDEA computing modules 101, a mode matrix 123 is provided. A particular word set in mode control register 113 controls mode matrix 123. The IDEA computing modules 101 can be divided into as many as six groups of arbitrary size. The operation of each group can be independently set to "operate," "hold," or "reset." (O, H, R) by mode matrix 123. Furthermore, a "store" instruction (ST) will cause the values in the registers of a group of modules 101 to be transferred simultaneously to initial condition storage.

Auxiliary equipment such as the power supplies 118 and the pulse generator 119 which provides clock pulses to the computing module are also provided. In order to program the interconnection of the IDEA computing modules 101 manually, a manual program control 120 is provided. This is merely a patch panel which enables the programmer to set up certain simple operations manually.

In order to exercise direct control of the digital computer 103, a special program section 128 is provided. This section 128 accepts binary or ternary signals from modules 101 through program matrix 102 and executes several unique functions.

In order to perform maintenance checks of the system, a test panel 129 is provided. This test panel has controls for performing marginal checks through variation of power supply voltages from power supply 118 and the width and height of pulses from the pulse generator 119.

Briefly, the operation of the digital computer 103 in controlling the interconnection of the computing modules 101 is as follows. A 28-bit control register word is inserted into each of the registers 110–113. These control register words are stored in the core memory 114 and sent to the control register addressing unit 124 by a special instruction from program control 125.

Each of the 28-bit control register words defines a unique set of operations. The first four bits determine the intended use of a control word. Of the sixteen possible combinations of these four bits, one combination sends the control register word to the input-output control register 110, another sends the word to the selector control register 112 and another sends the word to the mode control register 113. The remaining thirteen codes identify a program word for the program matrix control register 111.

The 28-bit word in the input-output control register 110 synchronizes, activates, inhibits, and clears the input and output buffer registers 121. The control register 110 can also control the external equipment connected to the input-output buffer registers 121.

The operation of the program matrix control register 111 in controlling the program matrix 102 through the matrix control 126 will subsequently be described in detail in Section 5.1 of this specification.

The selector control register 112 directs the IDEA module selector 122 to address, or select, one or more modules and then to give one of four commands: "input," "output," "reset," or "store" (I/O/R/ST). The "input" command will cause the selected module to read a binary number into its storage flip-flops from the selector input-output bus 127, which is connected to the selector output buffer 109. Upon an "output" command the selector input buffer 108 accepts a binary number which is gated onto the selector input-output bus 127 from the output flip-flops of the selected module. The "reset" command causes resetting of the selected module to the stored initial conditions. The "store" command causes resetting of the initial condition to the output number. R/ST commands can be given concurrently with I/O commands.

The fifth, sixth, seventh, and eighth bits of the 28-bit selector control register (CR) word determine the commands. These bits are reset to 0 upon execution, except when the first two bits are both 1 indicating an output command to be executed until cancelled by the controlling computer. R/ST bits are always reset to 0 after execution.

| Select Commands | | (I/O/R/ST) | |
|---|---|---|---|
| Input | 1000 | Input and Reset | 1010 |
| | | Input and Store | 1001 |
| Output | 0100 | Output and Reset | 0110 |
| | | Output and Store | 0101 |
| Reset | 0010 | | |
| Store | 0001 | | |
| Repeat Output | 1100 | Repeat Output and Reset (once). | 1110 |
| Command Executed | 0000 | Repeat Output and Store (once). | 1101 |

The remaining twenty bits of the selector CR word are used to address the desired modules. Since a complete IDEA data word consists of several eight-bit (plus sign) groups, several modules must be selected at one time. The groups are transferred on the nine-bit selector I/O bus 127 in order. The IDEA module selector 122 and the selector I/O buffers 108 and 109 provide the logic for sequencing the groups.

The mode control register 113 provides independent mode and store control of up to six sub-sections of the IDEA computing module section 101 of the system. The sub-sections are arranged by the programmer. Three bits of the CR word are required to control each sub-section.

| Mode Commands | | (O/H/R/ST) | |
|---|---|---|---|
| Operate | 100 | Operate and Store (once) | 101 |
| | | Operate and Reset (once) | 110 |
| Hold | 000 | Hold and Reset | 010 |
| | | Hold and Store | 001 |

R and ST commands and O and H commands are mutually exclusive. O/ST and O/R are possible momentarily; the ST and R bits are reset to 0 upon execution. The mode matrix 123 is an extension of the program matrix 102 and is set-up by the same matrix control 126 as described below in Section 5.1. The mode matrix 123 is N by six by three-pole, where N is the number of register modules in Section 101, and six the number of sub-sections.

The operation of the input-output buffer registers 104–109 is as follows. The buffers are divided into three groups: external-106, 107; selector-108, 109; and matrix-104, 105. The external I/O buffers 106, 107 are the same as provided in modern general purpose digital computers. The number of channels in each direction is to be determined by the system application.

The selector I/O buffers 108, 109 read in and write out binary numbers as sequences of nine-bit words (eight bits plus sign). The single input buffer register 108 and single output buffer register 109 are both connected, through sequencing logic, to the selector I/O bus 127. The buffers are synchronized by the IDEA module selector 122, described previously. Under program control, data can be transferred directly to and from the selector I/O buffers 108, 109 and the core memory 114 and arithmetic section 115.

Matrix I/O buffers 104, 105 provide direct access to the IDEA section registers in modules 101 through the program matrix 102 as a means for monitoring several variables in the IDEA section by the controlling computer. Moreover, the channels of output buffer 105 make the rapid substitution of data by a control computer very easy. The output buffer register 105 appears simply as a memory cell to the controlling computer.

IDEA section variables can be read in continually and directly by the input channel, or the input buffer register 104 can act as a sample-and-hold device for sampling a particular variable at particular times selected by the controlling computer program.

Each buffer register 104, 105 is 25 bits in length. The number of channels of matrix I/O buffers 104, 105 is to be determined by the application, however, monitoring of IDEA variables will employ more direct inputs than either the sample-and-hold inputs or the outputs. Special instructions will permit selection from the several inputs. One output channel can be connected to "fan-out" to several (up to seven) program matrix 102 inputs; the destination of the 25-bit data is determined by three code bits in the 28-bit control register word in program matrix control register 113.

The special program unit 128 is used to exercise direct control of the controlling computer 103 and thus the system. The special program unit 128 accepts binary or ternary signals from IDEA modules 101 through the program matrix 102 and to execute any of the following functions:

(a) Turn on or turn off a program flag or sense switch in the control computer section.

(b) Increment an index register in the control computer.

(c) Interrupt the controlling computer program and cause transfer to another routine.

(d) Change the contents of the mode control register 113.

(e) Change the contents of the selector control register 12.

(f) Change the contents of the IDEA I/O control register.

(g) Energize, lights, displays, audible alarms, etc., at the console to alert the operator to special conditions.

Inputs to the special program unit 128 are signals indicating the condition of comparators, register overflows, and sign-bit changes, i.e., signals indicating some changed condition or event in the IDEA section 101. Functions (a), (b), and (c) above provide means to modify the control computer program upon the occurrence of one or more of these signals. Similarly, function (d) permits mode changes in an IDEA program for one or more subsections. Changing a CR word in the selector control register 112, function (e) above, permits execution of a selector command at a particular event time in modules which have been previously addressed. Also control of input-output channels coupled to the IDEA sections can be modified as in function (f).

*4.2. Description of Program Matrix 102.*—The program matrix 102 and matrix control circuitry 126 will be described in detail since these units establish the interconnections between the computing modules 101. The computing modules 101 are separated into twelve computing groups, each containing seventy modules and each having its own portion of the computer program matrix 102. The group switching networks provide paths for interconnections between modules of the same group and access to trunks terminating in other groups, as described below in more detail.

Referring to FIGURE 2, the modules 101 are divided into the twelve groups of modules 201-212. Each group of modules is associated with one of the group matrix units denoted 213-224. Each set of three module groups is connected to one of the trunk matrix units denoted 225-228. The trunk matrix units 225-228 are in turn conected to the central matrix 229. The group matrix units 213-224, the trunk matrix units 225-228 and the central matrix unit 229 are all included in the block denoted program matrix 102 in FIGURE 1. Connections are made from central matrix 229 to the control computer 103, to the buffers 121 and to the matrix control unit 126. Although these connections are shown quite simply in FIGURE 2, it will be appreciated that these connections are quite complex.

The program matrix includes a number of electronic crosspoints and a number of mechanical crosspoints. These crosspoints are quite similar to ordinary telephone crosspoints and are merely used to establish interconnections. Switches suitable for use as the mechanical crosspoints in this computer are commercially available as the crossbar switch made by the North Electric Company and the Type F crossbar switch made by James Cunningham and Company. Each one of the group matrix sections 213-224 contains 7500 electronic crosspoints and 2000 mechanical crosspoints. Each one of the trunk matrix sections 225-228 contains 4800 electronic crosspoints and 1200 mechanical crosspoints. The central matrix 229 contains 4300 electronic crosspoints and 1100 mechanical crosspoints. The crosspoints will be described in more detail hereafter.

Each group matrix section is interconnected with its associated module by 356 lines. Each one of the module sections 201-212 is connected to a trunk matrix by 89 trunk lines. Each one of the trunk matrix sections 225-228 is connected to the central matrix 229 by 75 trunk lines.

Signals between the modules are in two principal forms —rate information and number information. Rate information, such as "carry" inputs and outputs, is in two-bit form—one bit for sign, another indicating magnitude. Distributed Rate information—the rate of change of numbers—is in five-bit form, four bits and sign. With number information like the number outputs from registers or the number outputs of summers, the number of bits will depend upon the length of the word to be transmitted. While ideally a random word length switching system might be desired, practical considerations have led to four-bit module packaging and nine-bit "quantization" (eight bits and sign) of the number information transmitted through the program matrix 102. The manual program control 120 pairs the module multi-bit outputs (distributed rate and number outputs in four bits and sign form) into nine-bit switching groups so that they are compatible with the nine-pole distributed rate and number organization of the program matrix 102. This multi-bit "number" transmission reduces considerably the matrix size. The two-bit rate information does not lend itself to similar quantization so it is always rounted through the program matrix 102 in the fundamental two-bit form.

A reduction in the size of the signal switching system can be realized by taking advantage of the fact that all module types do not require complete access to all other modules and all possible connections are not required in any one program. In general it is desirable to wire the module inputs and outputs to the matrix in such a way that all modules of a particular type would have equal fan-in access and equal fan-out access.

It will be seen that the group matrix sections 213-224 are nominally independent sets of three partially filled single stage matrices. The use of a single stage rather than a multi-stage group matrix gives a minimum number of switches in series between module outputs and inputs and makes equipment and program changes easier to incorporate. The trunk matrices 225-228 and the central matrix 229 are also single stage networks.

Figure 2B:
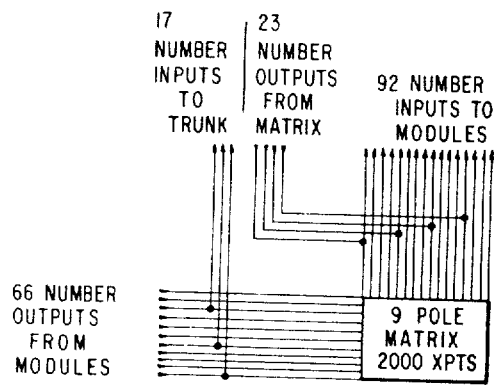
Figure 2C:
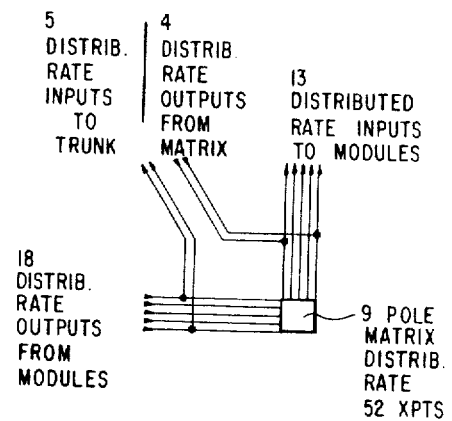
Figure 2D:
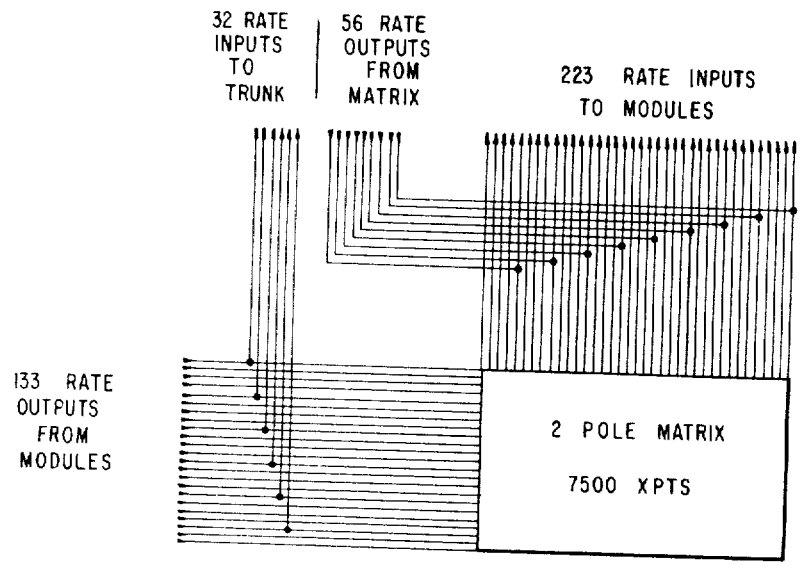

*4.2.1. Group Matrix.*—FIGURES 2b–2d show the relative sizes of the three matrices serving a group matrix. The major nine-pole matrix shown in FIGURE 2b is the one that transmits number information. This matrix requires approximately 2000 nine-pole cross-points to obtain the flexibility desired. The nine-pole distributed rate matrix shown in FIGURE 2c is quite small and uses less than sixty nine-pole cross-points.

The two-pole matrix is shown in FIGURE 2d. Seven thousand, five hundred two-pole cross-points are required. While this number of crosspoints is nominally four times as great as that for the nine-pole matrix, the number of switches in each are approximately the same.

*4.2.2. Trunk Matrix and Central Matrix.*—Trunking between module groups is handled by the matrix system shown in FIGURE 2e. The trunk matrix serves to interconnect module groups and the central matrix interconnects the trunk matrices. Trunk matrix 228 and central matrix 229 are shown in FIGURE 2e. The interconnecting cross-points are shown as shaded areas.

Twenty-five percent of the module outputs in each of the three groups of modules connect directly to the trunk matrix. This unit has the same input-output flexibility as the group matrix. Approximately 1200 crossbar nine-pole cross-points and 5000 electronic two-pole crosspoints are required in each trunk matrix.

Nine two-pole trunks and five nine-pole trunks from each trunk matrix go to the central matrix. This number is approximately equal to 28 percent of the trunk matrix inputs. Since cable delays over the relatively longer lines to and from the central matrix 229 will be larger than those experienced to and from a single trunk, little additional delay, in the form of series logic, can be allowed. Because of this restriction the central matrix 229 is not required to handle the outputs of adders, switches, et cetera, but rather will pass register number outputs from accumulators and counters in nine-bit form, "carry" outputs from the same devices, comparator output control information, and rate multiplier outputs in two-bit form. About 1100 crossbar nine-pole crosspoints and 4000 semiconductor crosspoints, plus the associated control circuitry, are provided in the central matrix.

FIGURE 2e shows a portion of central matrix 229 and trunk matrix 228 with the connections therebetween. In this figure, the shaded areas represent crosspoints. Access for 25 percent of the group module outputs to other group inputs in the same trunk and to the central matrix is shown. Portions of the central matrix which would serve to connect outputs in a group to inputs in the same group have been omitted. All outputs from the group have access to one or more trunks to the central matrix and trunks from the central matrix have access to all inputs. However, as the figure indicates, the pattern is not completely flexible. Module outputs of a given type connect to trunks which can handle only this type of output. Individual trunks from the central matrix have access to only one type of module input. One-third of the inputs and outputs of the central matrix can be connected respectively to the central matrix simultaneously.

The central matrix 229 consists of twelve sub-matrices with each having the same percentage module interconnecting flexibility as the group matrix.

A connection between modules in the same trunk but in separate groups is made by closing one crosspoint of the trunk matrix. For connections between modules of different trunks, the output trunk section of the trunk matrix connects the module output to a trunk, the central matrix selects any of its outputs within the trunk section of the module desired, and the trunk input section of the trunk matrix selects the specific module's input.

Figures 3, 3A:
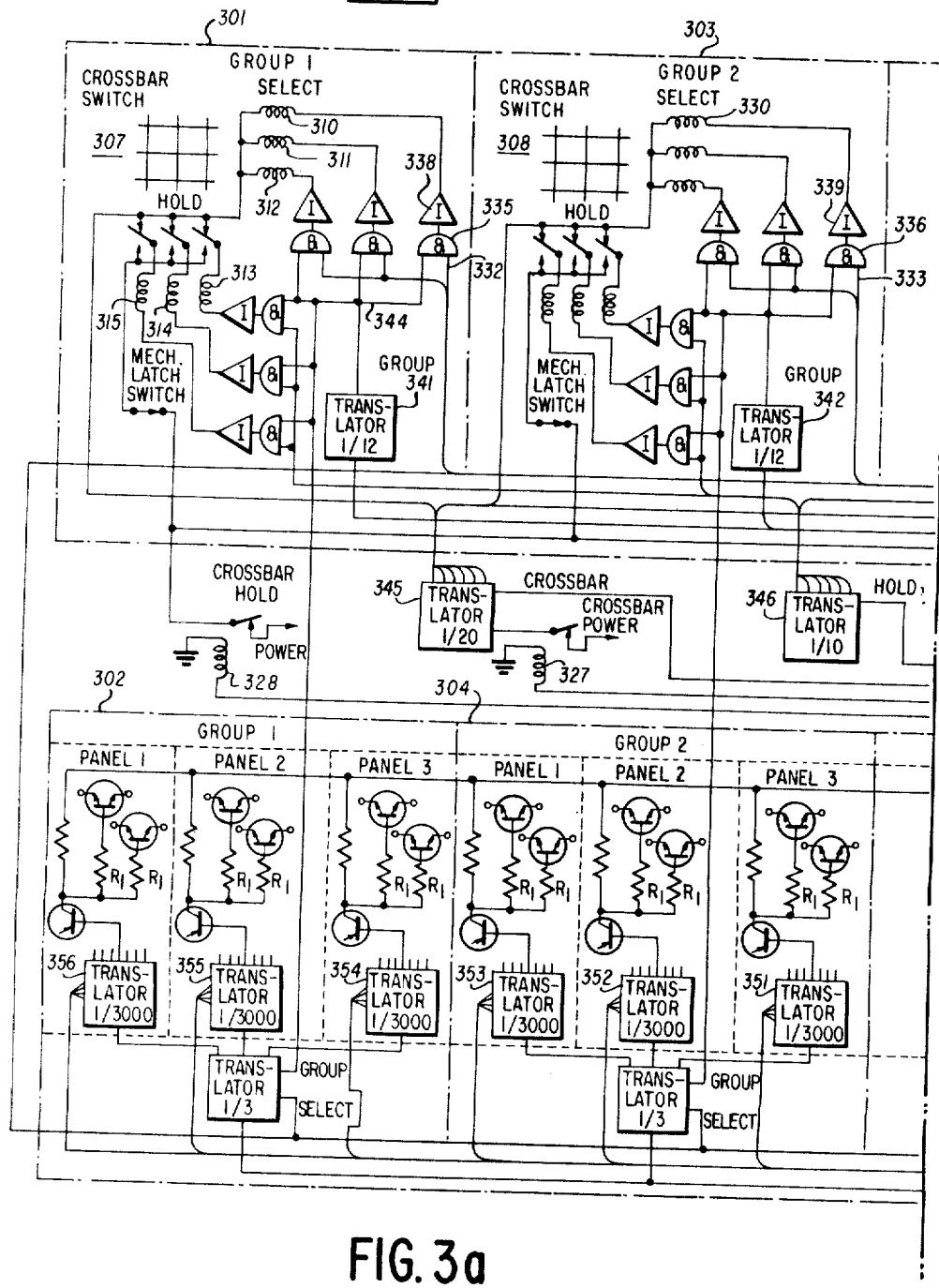
Figure 3B:
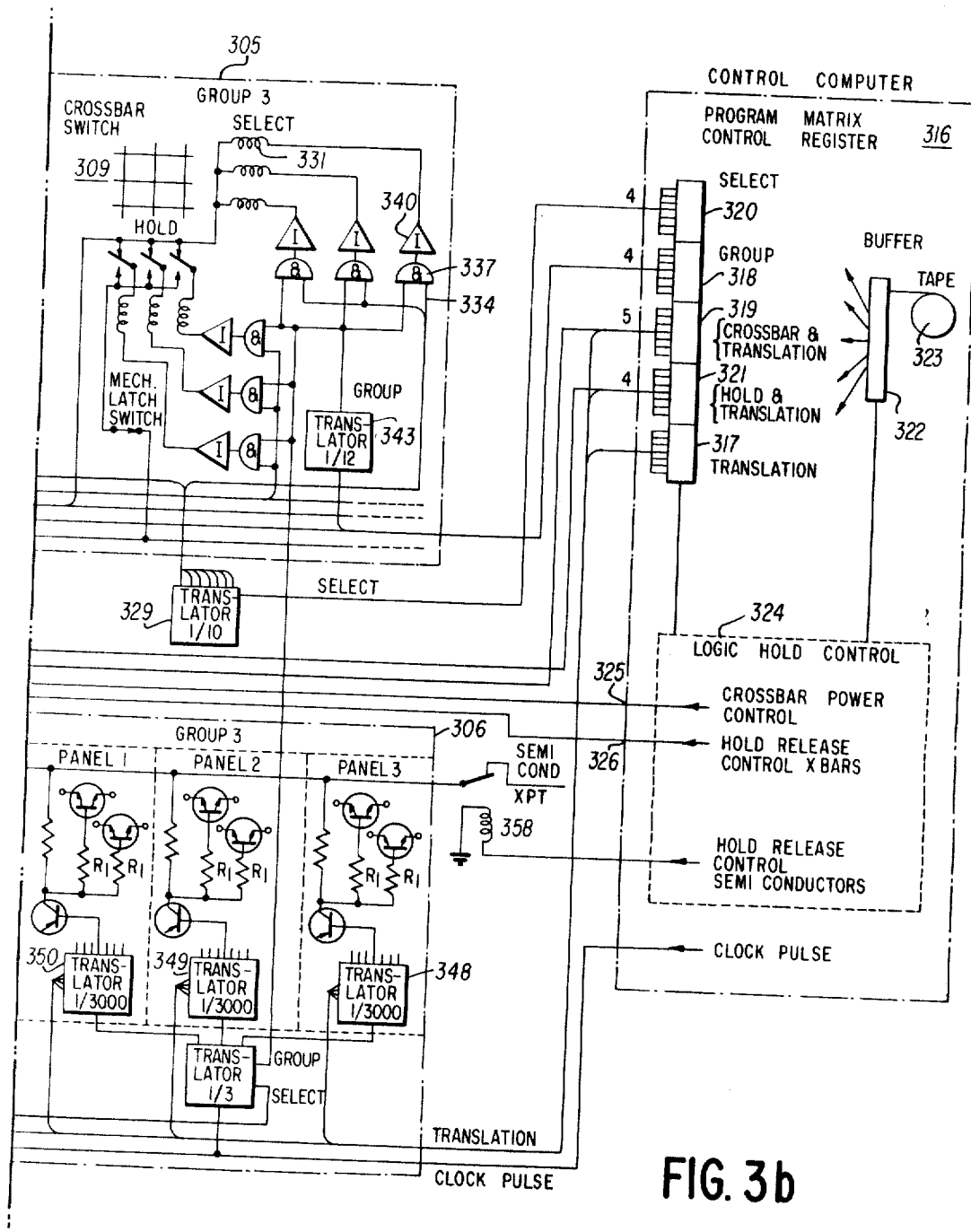

*4.3 Matrix Control 126.*—The matrix control and its cooperation with the crosspoints of each of the matrix section in program matrix 102 is shown in FIGURES 3a and 3b. The crossbars are divided into thirteen groups with twelve of the groups being used in the control of the group matrices 213–224 and the trunk matrices 225–228 and the thirteenth being used as a control designation for the central matrix 229. Only three groups of crossbars are shown in FIGURES 3a and 3b but the remaining groups are identical. Referring to FIGURES 3a and 3b, each group of crossbars include mechanical and electronic crossbars. As shown, Group 1 includes the mechanical crossbars and associated circuitry 301 and the electronic crossbars 302. Group 2 includes mechanical crossbars 303 and electronic crossbars 304 and Group 3 includes mechanical crossbars 305 and electronic crossbars 306. Each group includes twenty mechanical crossbars. Only one crossbar is shown for each group, the crossbar 307 being shown in Group 1, the crossbar 308 being shown in Group 2 and the crossbar 309 being shown in Group 3. Each crossbar includes ten selecting magnets and ten holding magnets. As shown in FIGURE 3, only the select magnets 310–312 are shown for crossbar 307 and only the hold magnets 313–315 are shown for crossbar 307. The control word controlling the program matrix is transferred to the program matrix control register 316. This is the same program matrix control register which is denoted 111 in FIGURE 1.

The control word stored in program matrix control register 316 is divided into five parts. The section 317 identifies the type of control word. This section indicates either crossbar matrix control and its special modes or electronic matrix control and its special modes.

The section 318 includes four bits which determine the group in which a crosspoint is to be closed.

The section denoted 319 specifies the particular crossbar out of the twenty crossbars in each group which is to be selected.

The select section 320 indicates which of the ten select magnets in the crossbar is to be energized.

The hold section 321 indicates which of the ten hold magnets for the crossbar is to be energized.

The group, select, and hold sections are each four bits long and the crossbar section includes five bits.

The operation of the matrix control in selecting a mechanical crosspoint is as follows. After receiving an order to program the matrix, the control computer fills its buffer memory 322, which may be the core memory 114 in FIGURE 1, with a block of words from tape input 323. This procedure is repeated after intermediate operations have processed the original block of words. The first word is identified by the section 317 to be a mechanical crossbar matrix instruction. This section is decoded in the control section 324 to energize the lines 325 and 326 so that relays 327 and 328 are picked up to supply crossbar power and hold power respectively to the mechanical crosspoints.

The four bits in the select section 320 are translated in translator 329 to place a ground potential on a particular select magnet in each of the groups. For example, the select section may specify that the magnets 310 in Group 1, 330 in Group 2, and 331 in Group 3 be energized. In order to do this, the inputs 332, 333, and 334 to AND gates 335, 336, and 337, respectively, are enabled. The outputs of these AND gates, acting through inverters 338–340, will connect ground potential to one of the select magnets 310, 330, or 331.

The four bits from the group section 318 are translated in the group translators 341–343. Assuming that the select magnet 310 in Group 1 is to be energized, the group translator 341 enables input 344 to AND gate 335, thereby raising the output of AND gate 335. When the output of AND gate 335 goes up, a ground potential is applied to one side of select magnet 310.

The five bits from the crossbar section 319 are decoded in the translator 345 which causes power to be applied to the "high" sides of the select and hold magnets of the indicated crossbar in each group.

The four bits from the hold section 321 of the program matrix control register are decoded in the translator 346 which causes a ground to be placed on the low side of the designated hold magnets in every group, subject to the inhibiting action of the group inhibit gating.

After the complete word in program matrix control register 316 has been processed, the group, crossbar, select and hold magnets have been designated. This results in one particular mechanical crossbar point being closed. Once the crossbar point has been closed, it will be held in position by the hold magnets. The next word can then be read from memory and the process repeated until all of the desired crosspoints have been closed.

In programming the matrix, many crosspoints will be closed which have the same group, select and crossbar designations. In order to do this, it is necessary only to change the hold section 321 of the program matrix control register. The control computer can be programmed to make this change in the four bits of the hold section without changing the remaining bits of the control word.

The electronic matrix control words are similar to those used for the mechanical crossbar selection. A control word used to close an electronic crosspoint has a select section in section 320 and a group section in section 318 of the program matrix control register. The bits in section 317 which specify an electronic crosspoint are decoded in decoder 324 to energize relay 358 to apply power to the electronic crosspoints. The remaining bits in the control register are translation bits which select one particular electronic crosspoint.

The group section 318 acts through translators 341–343 to specify a particular group just as in the selection of a mechanical crosspoint. Similarly, the select section 320 acts through translator 329 to specify one of three "selects" in each electronic group.

The remaining bits in the program matrix control register 316 are connected to the translators 348–356 which select particular electronic crosspoints.

The translators 348–356 are diode translators of the multi-stage matrix type using diodes. As shown in FIGURE 3c, each of these translators 348–356 includes four three-level diode trees 357–360 and three matrices 361–363. The in put 364 is from the sub-translator which selects one of the translators 348–356 in response to the group and select sections 318 and 320 of the control register 316. Three of the twelve translation bits from sections 317, 319, and 321 are connected to each of the diode trees 357–360 and the outputs of the trees 357–360 enable the AND gate in the matrices 361–362, the outputs of which in turn select a particular AND gate in the matrix 363.

The electronic crosspoint in itself is shown in FIGURE 3d. This circuit acts as a two-pole, single-throw switch with memory. The transistor 369 is a thyristor having its state sensed by the transistors 365 and 366.

Upon being triggered the thyristor 364 changes from a high impedance device to a low impedance device. This change causes a shift in the collector voltage of the thyristor 369 and this change is sensed by transistors 365 and 366 whose bases are connected to the thyristor's collector through resistors 367 and 368. The two transistors 365, 366 serve as the two poles of the crosspoint switch. These are bi-directional transistors in the sense that the emitter can be used interchangeably with the collector without a loss of gain (current can flow with equal ease in either direction through the transistor). A 2N1169 transistor is suitable for this purpose.

When the thyristor 369 is in its high impedance state, both the switches 365 and 366 will be shut off, but when the thyristor 369 is triggered to a low impedance state both switches 365 and 366 are conducting (actually saturated) and are capable of transmitting current in either direction.

5. Description of Modules

5.1. Timing and basic circuitry.

Before proceeding with a description of each of the arithmetic modules, the basic circuitry used in these modules will be described and the timing signals will be described.

The IDEA computing system employs clock pulses to synchronize its registers. The flip-flops, of which the registers are composed, can change state only when a clock pulse occurs. Information to these registers is in the form of binary levels, referred to as 1's and 0's, and may change only between clock pulses. These binary levels are generated by asynchronous logic circuits, the inputs of which are outputs of flip-flops and the outputs of which are inputs to flip-flops. Information travels through the asynchronous logic at its own speed, but it must settle down in the interval between clock pulses. For example, a clock pulse period of 1 microsecond and a pulse width of .1 microsecond allows an interval of .9 microsecond for all asynchronous logic to settle down.

Any binary level information is generally considered to be in either of two mathematical—parallel numbers or rates. An $n$-bit parallel number consists of $n$ binary levels on $n$ lines. It may have any one of $2^n$ values for each interval between clock pulses. A rate consists of a single binary level on a single line for each clock pulse interval. Its multi-bit value can be determined only by observing its time sequence over a number of clock pulse intervals. Parallel numbers and rates may be positive or negative during each clock pulse interval according to an attached bit of sign information. A positive sign is represented by a 0 in the sign bit and a negative sign is represented by a 1 in the sign bit. A distributed rate includes multiple bits which are related in a binary sequence. See the end of Section 6.5 for a detailed description of a distributed rate signal.

The logical symbols and the symbols used in denoting information transfer in this application are shown in FIGURE 4.

In the circuitry to be described, a 1 is represented by a $-2$ volt signal and a 0 is represented by a $-.5$ volt signal.

The basic asynchronous logic block used in this computer is shown in FIGURE 4a. Each asynchronous logic block includes a plurality of logic sections each of which includes a transistor, the transistors 401–403 being shown in FIGURE 4a.

Inputs to the logic block are applied through diodes, the diodes 404–412 being shown. If any of the inputs $a_1, a_2 \ldots a_n$ are 0's ($-.5$ volt), then the base of transistor 401 is at $-.5$ volt and transistor 401 is nonconducting. If all of the transistors 401, 402, and 403 are nonconducting, then the output A, taken from the collectors of the transistors, is at approximately $-2$ volts representing a 1 output. If all of the inputs $a_1, a_2 \ldots a_n$ are 1's ($-2$ volts), the base of transistor 401 will be negative and the transistor will be conducting. If any one of the transistors 401–403 are conducting, the output A will be approximately $-.5$ volt representing a 0.

FIGURE 4b shows the block representation to be used for representation of the circuitry of FIGURE 4a. The sections are denoted 413–416 and each section includes a transistor and associated circuitry as shown in FIGURE 4a. The following two rules will summarize the operation of the logic block and should be referred to in analyzing complicated logic. First, if all of the inputs to any one of the sections 413–416 are 1's, then the output A of the logic block is 0. Second, if each section 413–416 has at least one 0 input, the output A of the logic block is a 1. The logical equations representing the operation of the asynchronous logic block are given below.

$$A = \overline{(a_1 a_2 \ldots a_n)} \, \overline{(b_1 b_2 \ldots b_n)} \ldots \overline{(f_1 f_2 \ldots f_n)}$$

$$A = \overline{(\bar{a}_1 \cup \bar{a}_2 \cup \ldots \cup \bar{a}_n)} \, \overline{(\bar{b}_1 \cup \bar{b}_2 \cup \ldots \cup \bar{b}_n)}$$
$$\ldots \overline{(\bar{f}_1 \cup \bar{f}_2 \cup \ldots \cup \bar{f}_n)}$$

$$A = \overline{(a_1 a_2 \ldots a_n) \cup (b_1 b_2 \ldots b_n) \cup \ldots \cup (f_1 f_2 \ldots f_n)}$$

$$A = \overline{(\bar{a}_1 \cup \bar{a}_2 \cup \ldots \cup \bar{a}_n) \cup (\bar{b}_1 \cup \bar{b}_2 \cup \ldots \cup \bar{b}_n)}$$
$$\cup \ldots \cup (\bar{f}_1 \cup \bar{f}_2 \cup \ldots \cup \bar{f}_n)$$

A single gating circuit used extensively in this computer is shown in FIGURE 4c. FIGURE 4d shows the block representation of this circuit. If any of the inputs applied to diodes 417–419 are 0's (0.5 volt), the base of transistor 420 is $-.5$ volt, the transistor 420 is cut-off and the A output is at −2 volts, a 1. If all inputs are 1's (−2 volts), the base of transistor 420 is at −2 volts, the transistor is conducting and the output A is at −.5 volt, a 0. This circuit performs an AND function with inversion of the output. The logical operation is represented by the equation $$A = \overline{a_1 a_2 \ldots a_n}$$

Since the computer utilizes a plurality of the asynchronous logic blocks shown in FIGURE 4a, it is necessary to provide synchronizing gates to time some of the operations with the occurrence of clock pulses. A synchronous gate, referred to as an OR transient gate, is shown in FIGURE 4e; FIGURE 4f shows the block representation of this gate. This circuit is used to change the state of a flip-flop upon the occurrence of a clock pulse. More particularly, the trailing edge of the clock pulse is used to change the state of the flip-flop. The circuit of FIGURE 4c includes a diode 421 to which the clock pulse (p) is applied, and a diode 422 to which the logic function is applied. A biasing diode 423, a constant current source 424 and a capacitor 425 complete the synchronous gate.

The operation of the synchronous gate is best described with reference to the wave forms 4g through 4j in which FIGURE 4g shows the clock pulse input, FIGURE 4h shows the logic input, FIGURE 4i shows the wave form at the common junction of diodes 421–423 and FIGURE 4j shows the wave form at the output of the gating circuit. As shown at the time $t_0$, the clock pulse occurs at a time when the logic input, FIGURE 4h, is in the 1 condition. Since diodes 421–423 all have −2 volts applied to their anodes, they are all back biased and the capacitor 426 is charged toward −2 volts as shown in FIGURE 4i. Upon the occurrence of the trailing edge of the clock pulse, a positive transient is coupled through capacitor 426 to change the state of the flip-flop 427. During the period between the times $t_0$ and $t_1$, transitions in the logic function, FIGURE 4h, have no effect on the output of the synchronous gate. At the clock pulse time $t_1$, the logic input, FIGURE 4h, is on the 0 condition. The −.5 volt at the anode of the diode 422 clamps the common junction of the diodes at −.5 volt. Upon the occurrence of the trailing edge of the clock pulse, no positive transient is coupled through capacitor 426 to the output.

A flip-flop is shown in FIGURE 4k and the block representation of this flip-flop is shown in FIGURE 4l. The flip-flop includes two asynchronous gating circuits 428 and 429. Both of these circuits are of the type shown in FIGURE 4c. The flip-flop is set by applying a set pulse to the input 430 and is reset by applying a pulse to the input 431. When set, the A output is a 1 and when reset, the B output is a 1. The flip-flop together with its input gating circuitry is shown in FIGURE 4m. FIGURE 4m is a combination of synchronous logic shown in FIGURE 4e and the flip-flop shown in FIGURE 4k. When the flip-flop 432 is in the 1 state, a pulse applied to the $t$ input 433 will be coupled to the the 0 input 434 to switch the flip-flop to its 0 condition. When the flip-flop 432 is already in its 0 condition, a pulse applied to the $t$ input 433 will be coupled to the 1 input 435 to switch the flip-flop 432 to its 0 condition. The switching of condition occurs at the trailing edge of the clock pulse applied to the $p$ input 436. The operation just described is referred to as complement input gating. This is shown in block form in FIGURE 4n. It is also possible to reconnect the input gating so that the flip-flop will always be set or will always be reset. FIGURE 4o shows set input gating; reset input gating is shown in FIGURE 4p.

5.2. *Counting Unit.*—A simple counting unit is shown in FIGURE 5 and the block representation of this counting unit is shown in FIGURE 5a. The counting unit performs the counting logic of one stage of an up-down counter. The inputs are an input carry bit $c$, applied to the input 501, the sign $\copyright$ of the input carry applied to input 502, the previous sum bit S from the flip-flop 503, and a partial output carry bit $\bar{c}'$ on line 504. The partial output carry bit is provided in case there is a preceding half-adder-subtracter.

The outputs are the command signals designated $s \rightarrow$ which are used to complement the flip-flops 503, the carry output bit C and a bit of distributed rates $ds/2$. The sign of the carry output $\copyright$, and the sign of the distributed rate $\widehat{ds/2}$, are always the same as the sign of the input carry $\copyright$. The complement output, $s \rightarrow$, changes the state of flip-flop 503 when the clock pulse $p$ is applied to the synchronous gate 504.

As an example of the operation of the counting unit, assume the following conditions: flip-flop 503 contains a 1, that is, $S=1$; there is an input carry, $c=1$; and that the unit is counting in the forward direction, that is $\copyright$ is a 0 (this could also be referred to as the sign of the carry being positive). The $c$ input of 1 enables the gate 504 to complement the flip-flop 503 to its 0 state at the occurrence of a clock pulse. The section 505 of the logic block has applied as inputs thereto an S of 1, $\overline{\copyright}$ of 1, and $c$ of 1. Therefore, the output of the logic block 505 is a 0. At this time section 507 of the logic block has applied as inputs thereto an $\overline{S}$ of 0, C of 1, and $\copyright$ of 0; therefore, the output of logic block 507 is a 1. As explained previously, the output of logic block 505, 507 will be a 0. Assuming $\bar{c}'$ to be a 0, as it would be unless this line were connected to a half adder-subtracter, the output of the logic section 506 is a 1.

As another example of operation, assume the counting unit has the inputs as above except that it is counting in the reverse direction, viz., $\copyright = 1$. In this case, the flip-flop 503 will again be complemented by the carry input $c$. However, logic section 505 has applied as an input thereto the signal $\overline{\copyright}$ which is 0 and which produces a 1 output from this section. Similarly, the section 507 has input signal $\overline{S}$ which is a 0 and accordingly section 507 also produces a 1 input. Therefore, the output of the logic block 505, 507 is a 1. The output of gate 506 is accordingly a 0 indicating that there is no carry. When the counting unit is counting in the reverse direction, the occurrence of a 1 on the C output denotes a borrow.

5.3. *Half Adder-Subtracter Unit.*—The half adder-subtracter unit is shown in FIGURE 6 and a block representation of the half adder-subtracter is shown in FIGURE 6a. This unit adds algebraically two input bits $a$ and $c$ whose signs are $\copyright{a}$ and $\copyright$, respectively. The outputs are a sum bit S, and a carry bit C. The sum bit and the carry bit have the same signs $\copyright{S}$ and $\copyright$. The sum bit S is produced by the logic block 601 including the sections 602 and 603. The complement of the carry output is produced by logic block 604 having sections 605 and 606. The sign output is produced by logic block 607 having sections 608 and 609.

As an example of operation of the half adder-subtracter, assume that $c=1$, $a=1$, and that the signs of both inputs are positive, viz., $\copyright{a} = \copyright = 0$. The inputs to logic section 603 are $c=1$ and $a=1$. Therefore, the output of logic block 601 is a 0, indicating the sum of 0. The logic section 606 has as inputs $a=1$, $c=1$, $\copyright{a}=1$, $\overline{\copyright}=1$. Therefore, the output of logic block 604 is $\overline{C}=0$, indicating a carry of 1. Logic section 608 has an input of $a=1$ and $\copyright{a}=0$. Logic section 609 has input of $c=1$ and $\copyright=0$. Therefore, the output of logic block 607 is a 1 indicating that $\copyright = \copyright{S} = 0$. The signs of the carry and the sum outputs are therefore positive.

5.4. *Accumulating unit, UA.*—The accumulating unit is shown in FIGURE 7 and the block representation of the accumulating unit is shown in FIGURE 7a. The accumulating unit includes a counting unit 701 of the type shown in FIGURE 5 and a half adder-subtracter 702 of the type shown in FIGURE 6. The accumulating unit adds to S (the existing bit of a register whose sign is considered as positive) two input bits $a$ and $c$ whose signs are $\overline{(a)}$ and $\overline{(c)}$, respectively. The sum output is a command $s \rightarrow$ which complements S in synchronism with a pulse, $p$, applied externally to this unit. The carry output bit is C and its sign $\copyright$. In applications where the algebraic sum of $a$ and $c$ never exceed plus or minus 1, the distributed rate function is also usable. Here, a single bit of distributed rate, $ds/2$, is produced. The sign of $ds/2$ is $\overline{(ds/2)}$ and is equal to the carry output sign $\copyright$.

*5.5. Register unit, UR.*—The register unit is shown in FIGURE 8 and the block representation of the register unit is shown in FIGURE 8a. The register unit contains a storage flip-flop 801 and an operating flip-flop 802.

If the enable input ($e$) at 803 is in the 1 state and a pulse is supplied on the transfer-in command line 804, an input data bit is transferred into storage flip-flop 801. If $e=1$ and the reset command line 805 is pulsed, the storage flip-flop 801 is reset into the operating flip-flop 802. If the operate command line 806 is pulsed, the operating flip-flop 802 is complemented by the input $s \rightarrow$. If $e=1$ and the store command line line 807 is pulsed, the contents of the operating flip-flop 802 is transferred to the storage flip-flop 801. If $e=1$ and the transfer-out command line 808 is pulsed, the contents of the operating flip-flop 802 is transferred out on an output state line 809. The absolute value of the operating flip-flop is readout to other circuitry on line 810 from the logic block 811. Either the 1 output of operating flip-flop 802 or the 0 output of operating flip-flop 802 is read-out on line 810 as determined by the sign of the register containing this register unit. The register sign on line 812 is applied directly to the logic block 811 or through inverter 813 to the logic block 811 to determine whether the 0 or 1 output of flip-flop 802 is read-out to line 810.

Figure 9A:
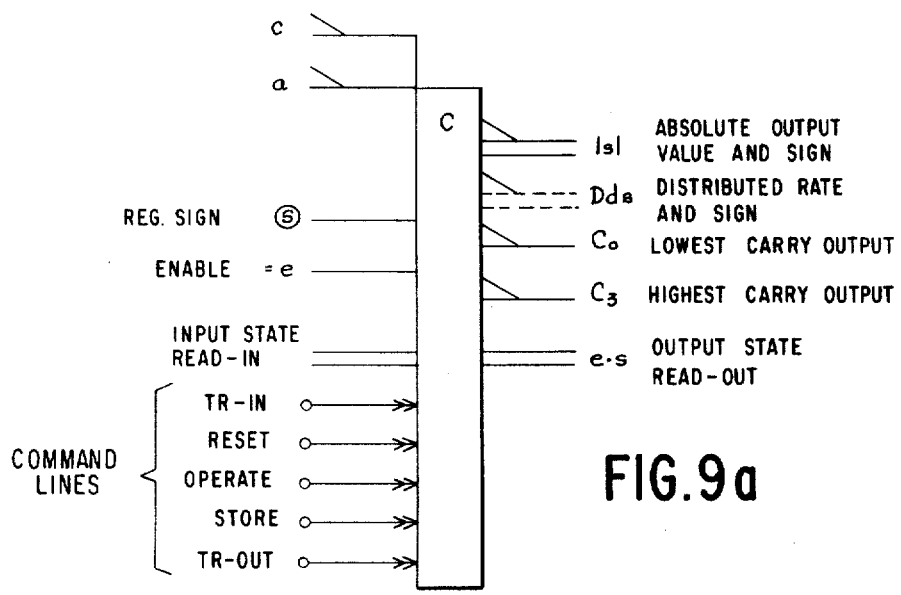
Figure 9:
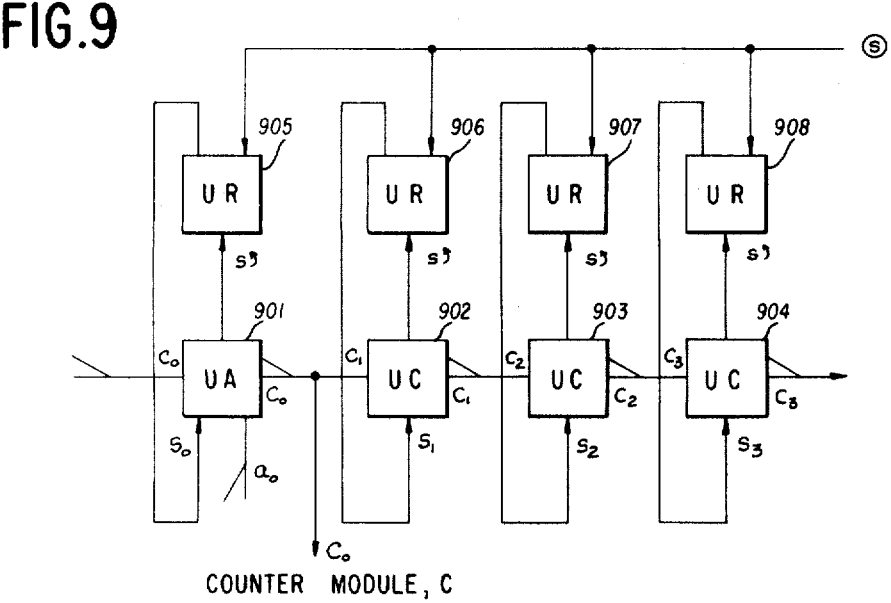
Figure 38:
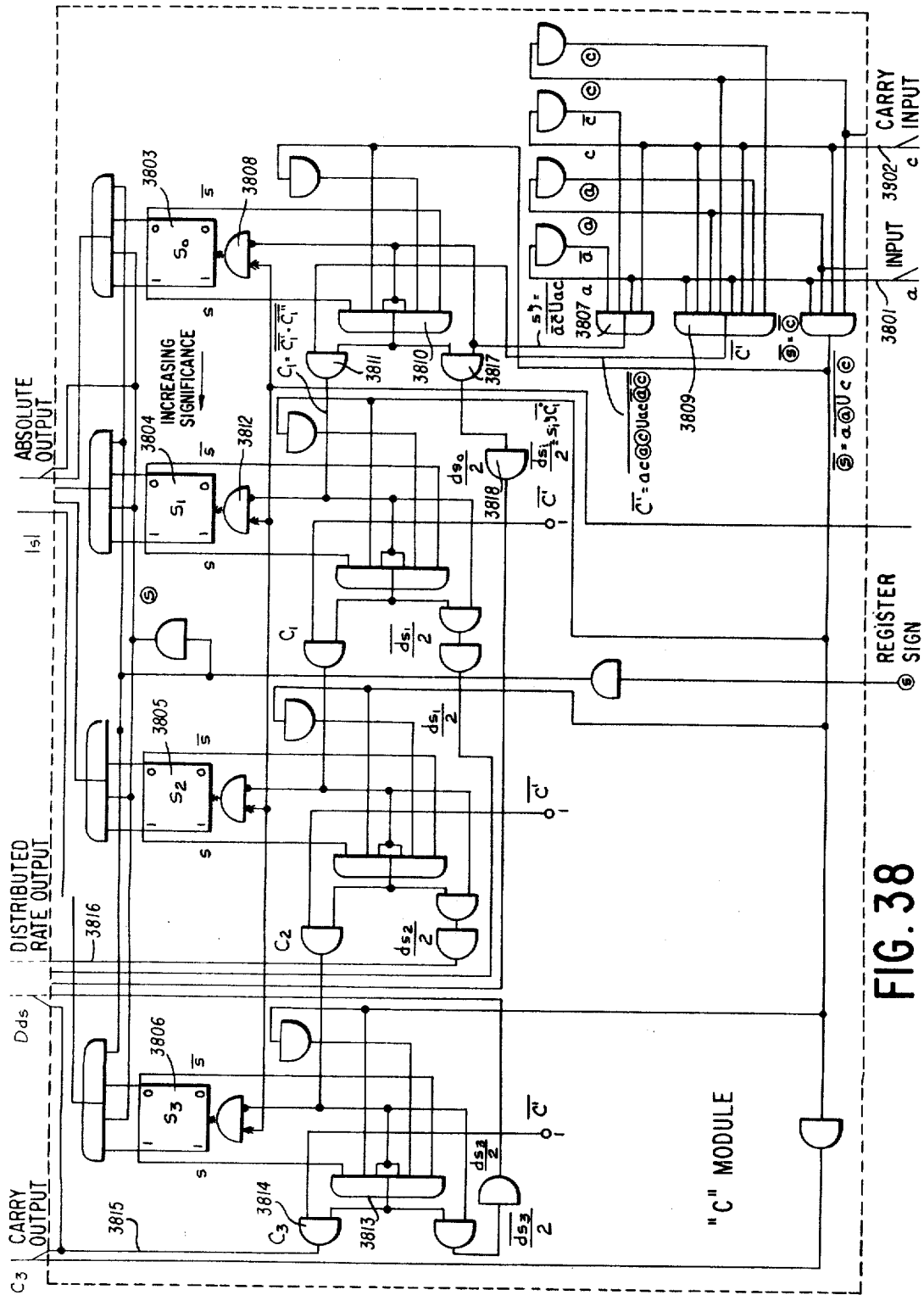
FIGURE 38 shows the C module.

*5.6. Counter module, C.*—The counter module is shown in FIGURE 9 and the block representation of the counter module is shown in FIGURE 9a. The logic diagram of an eight-bit counter module is shown in FIGURES 38a and 38b in detail and described in detail in Section 6.5 in conjunction with the solution of an actual problem.

FIGURE 9 shows a four-bit counter module which includes an accumulating stage 901 of the type shown in FIGURE 7 followed by three counting stages 902–904 of the type shown in FIGURE 5. Associated with each of the accumulating and counting stages 901–904 is one of the register units 905–908.

The counter module adds algebraically two signed input bits, $a$ and $c$ in its lowest order, to its present contents, S. The absolute value of its contents, $|S|$, is made available by comparing its state, S, to the sign, $\circledS$, of the register to which it belongs since the internal code of a register is 1's complement. All inputs and outputs to the counter module are levels continuously available between clock pulses. The state of a register may be changed only on a clock pulse introduced on one of its command lines.

A four-bit distributed rate output, D$ds$, is produced by the counter module and contains one bit from each order. The lowest order bit is useful only if the absolute algebraic sum of $a$ and $c$ is never greater than 1. Otherwise, the rate multiplier bit for this order must be made 0. The sign of the distributed rate is the same as $\copyright$, the sign of the $C_0$ and $C_3$ carry outputs. The lowest order carry output $C_0$ is sometimes useful as the most significant rate of change of the register. The highest order carry output $C_3$ is made available for possible connection as a carry input to the next module in a register.

Figure 10:
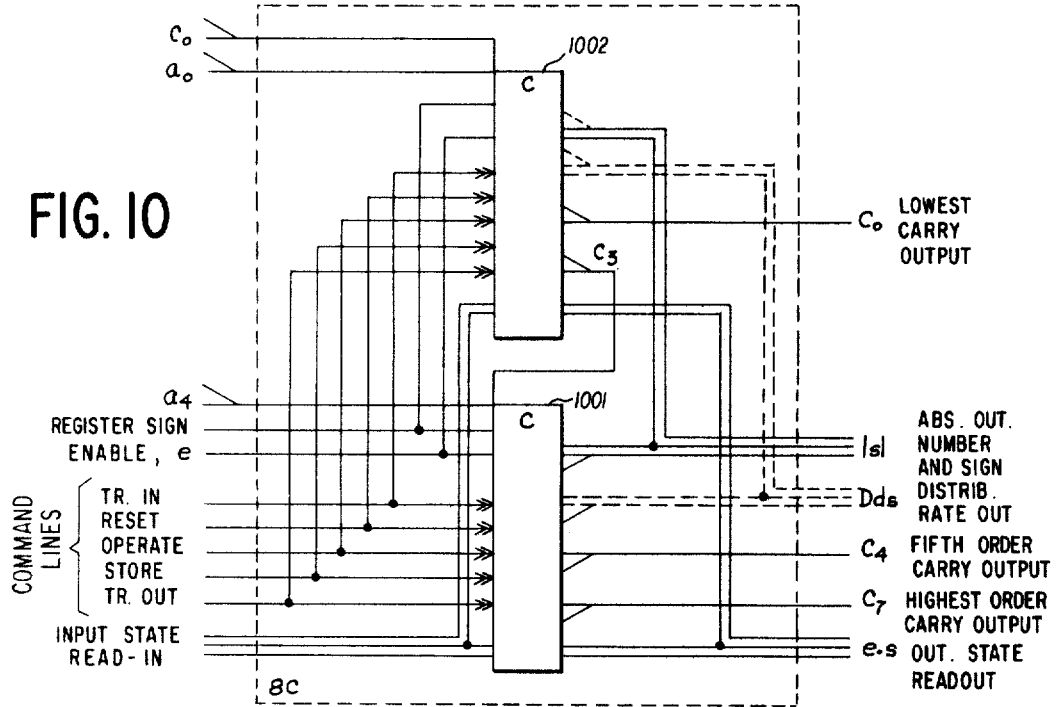

*5.7. Eight-bit Counter Module, 8C.*—FIGURE 10 shows an eight-bit counter module which includes two four-bit counter modules 1001 and 1002. The inputs and outputs are similar to the inputs and outputs of the C module shown in FIGURE 9a.

Figures 11, 12:
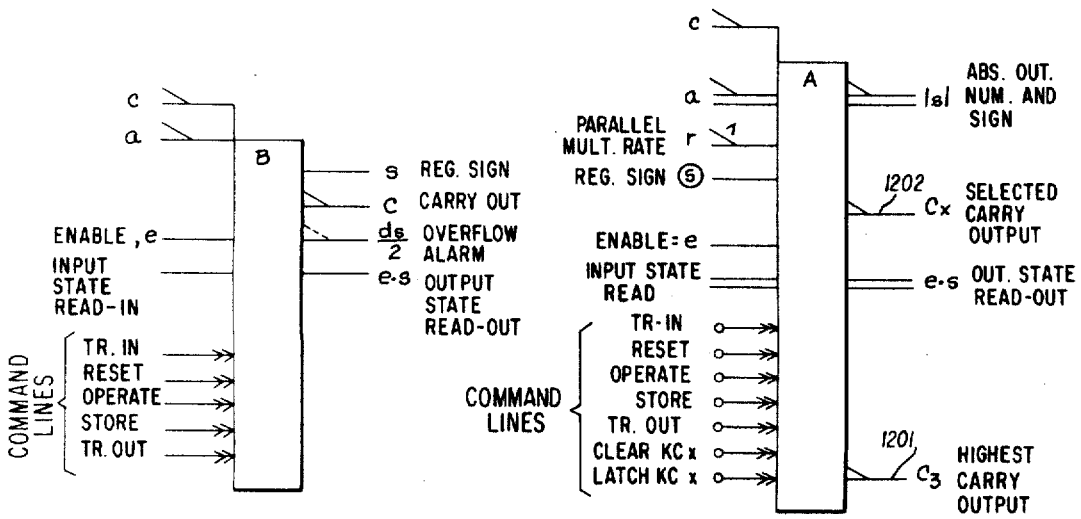
Figure 39:
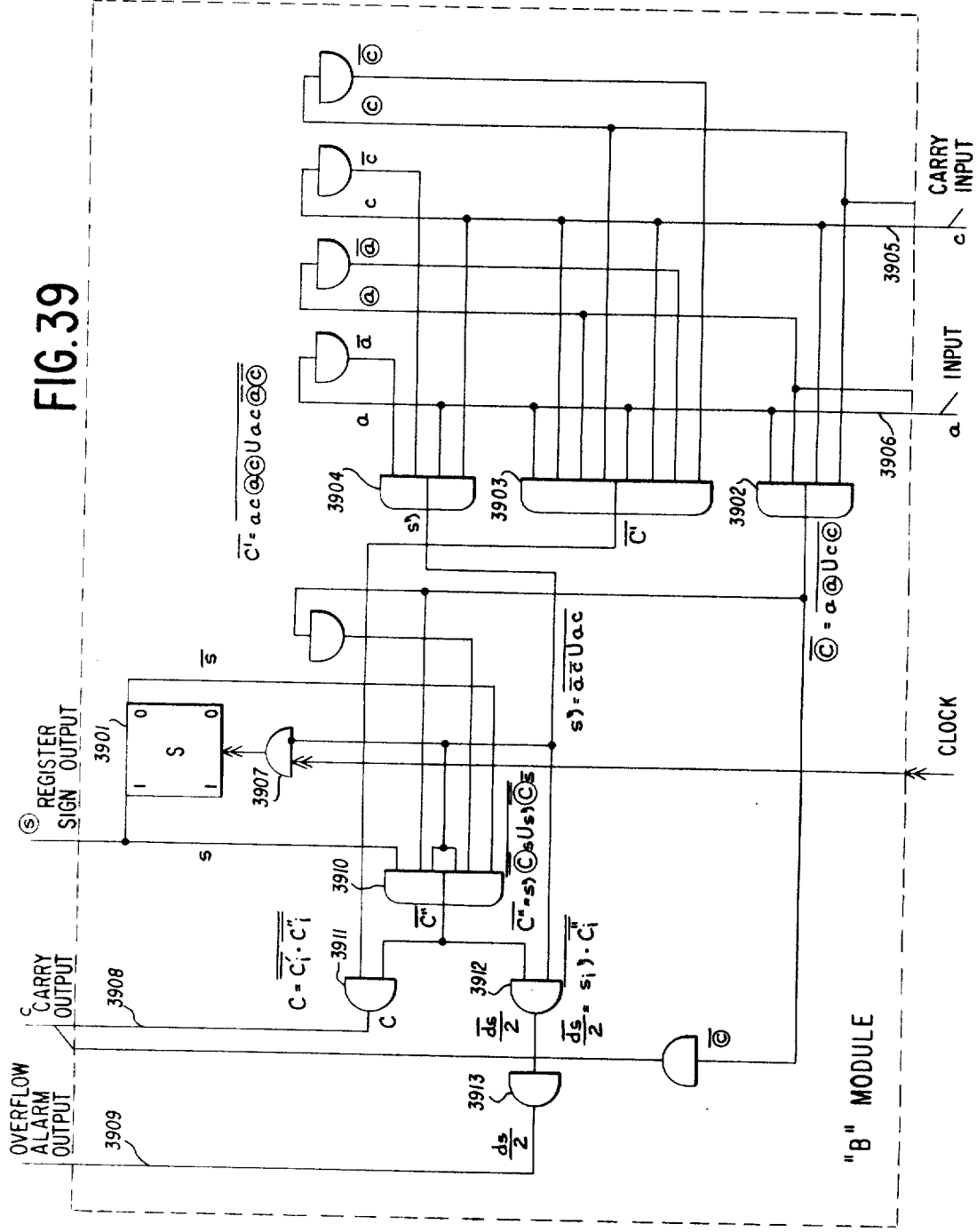
FIGURE 39 shows the C module.

*5.8. Bit-Rate Summer/Register Sign, B.*—The "bit-rate summer/register sign" module is shown in FIGURE 11. This module, when used as a bit-rate summer, is shown in more detail in FIGURE 39 and will be described more explicitly in Section 6.6 in conjunction with the description of the operation of the computer involving a simple problem.

This module is similar to the lowest order stage of a counter module. When used as a bit-rate summer, its two input rates $c$ and $a$ produce an overflow rate and sign on the carry output line which is equal to the average of the input rates $$C = \frac{c+a}{2}$$

For use as a register sign bit, the state of the operating flip-flop is brought out; i.e., then, only a single input can be used; namely $c$, the carry input from the preceding stage of the register. The output carry, C, is then the end-around carry of the register. Any distributed rate output bit $ds/2$, from the sign bit, indicates that the register has overflowed.

Figures 36, 36A:
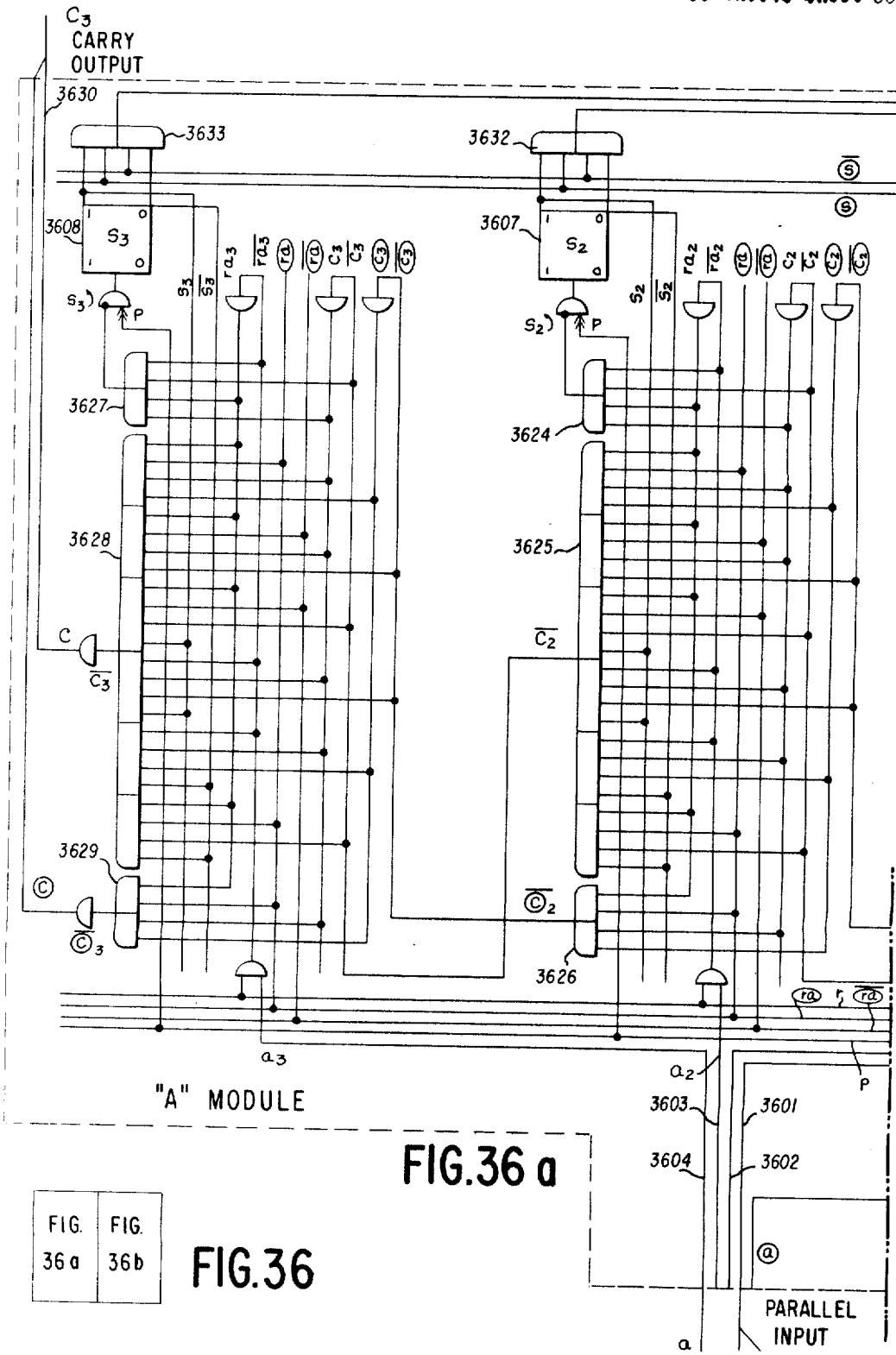
FIGURE 36a shows a portion of the A module.
FIGURE 36 shows the manner in which FIGURES 36a and 36b fit together.
Figure 36:
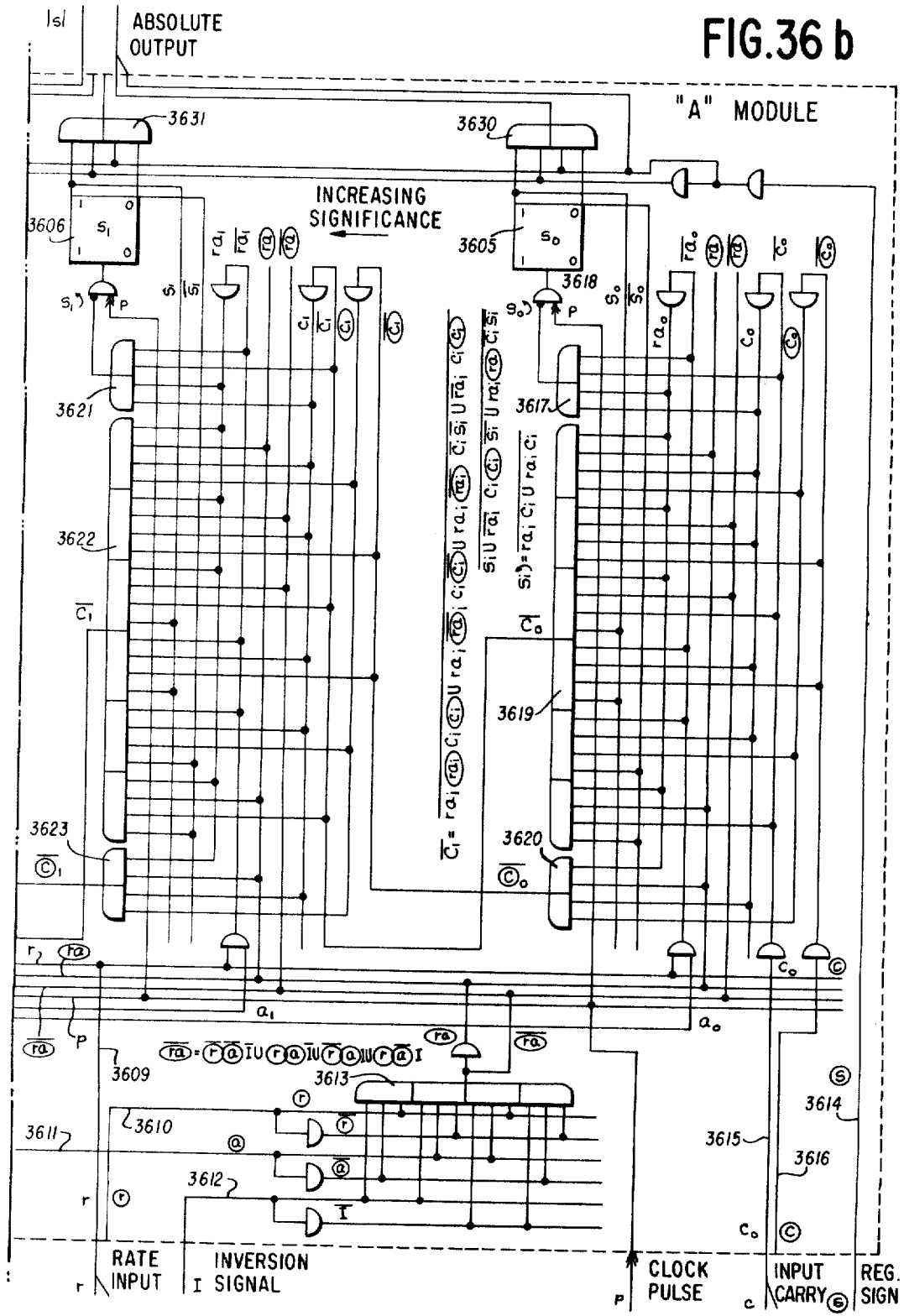

*5.9. Accumulator Module, A.*—The accumulator module is shown in block form in FIGURE 12. The detailed logic of the A module is shown in FIGURES 36a and 36b and described in Section 6.3 in conjunction with the solution of an actual problem. This module includes four accumulating stages each composed of a register unit, UR, shown in FIGURE 8, preceded by an accumulating unit, UA, shown in FIGURE 7. This module adds algebraically to its contents, S, a four-bit number $r \cdot a$, and an input carry $c$. The number $r \cdot a$ is, in turn, the "parallel" product of a single bit rate $r$ of sign $\overline{(r)}$ and a parallel input $a$ of sign $\overline{(a)}$. A logic diagram of a circuit for producing this parallel multiplication is shown in FIGURE 13.

Referring to FIGURE 13, the gating circuits 1301–1304 are provided to respectively produce the products of the rate input $r$ and the four-bit input $a_0$, $a_1$, $a_2$, and $a_3$. In order to produce the sign of the product, the logic block 1305 and gating circuits 1306 and 1307 are provided. This circuitry compares the sign of the rate input and the sign of the parallel input to produce the signal $\overline{(r \cdot a)}$ which is indicative of the sign of the product.

Referring again to FIGURE 12, the highest order carry output, denoted $C_3$, is brought out together with its sign for connection to a succeeding module in the register. This highest order carry is denoted 1201 in FIGURE 12. In addition, a selected order of carry output $C_x$ at 1202 is brought out together with its sign. The selection of $C_x$ is by means of a carry output selector $KC_x$ attached to the accumulator module and treated as part of this module. This carry output selector is shown in FIGURE 13a. The carry selector includes three relays denoted $K_0$, $K_1$, and $K_2$. The $K_0$ contacts denoted 1308–1311, the $K_1$ contacts denoted 1312–1313 and the $K_2$ contact denoted 1314 select the carry bit from one of the eight carry bits $C_0$–$C_7$. Energization of the three relays $K_0$, $K_1$, $K_2$ in a particular code selects one of the input carries $C_0$–$C_7$. The remainder of the contacts shown in FIGURE 13a select the sign of the carry, $\overline{(C_x)}$, in a similar manner.

The relay windings for the $K_0$, $K_1$, and $K_2$ relays are shown in FIGURE 13b. Each relay includes a latch winding to set the relay to a particular condition and a reset winding to reset all relays to their initial conditions. The latch and reset windings for the $K_0$ relay are denoted 1315 and 1316, respectively, the latch and reset windings for the $K_1$ relay are denoted 1317 and 1318, respectively, and the latch and reset windings for the $K_2$ relay are denoted 1319 and 1320, respectively. When an enable input $e$ at line 1321 is in the 1 state, the module is enabled for the command line pulses of transfer-in, reset, store, transfer-out, clear $KC_x$, or latch $KC_x$. Initially, a clear pulse applied at 1323 resets all three relays to their reset condition. Then, if there is an enable input at 1321, the latch pulse at 1322 can set up the relays in accordance with a select code applied to the inputs 1324–1326.

The block representation of the carry select circuitry for the A module, as shown in FIGURES 13, 13a, and 13b, is shown in FIGURE 13c.

*5.10. Eight-bit Accumulator Module, 8A.*—The eight-bit accumulator module is shown in FIGURE 14. This module includes two four-bit accumulator modules 1401 and 1402 of the type just described in connection with FIGURES 12 and 13.

Figure 15A:
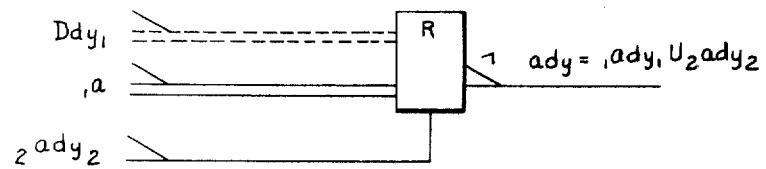
Figure 15:
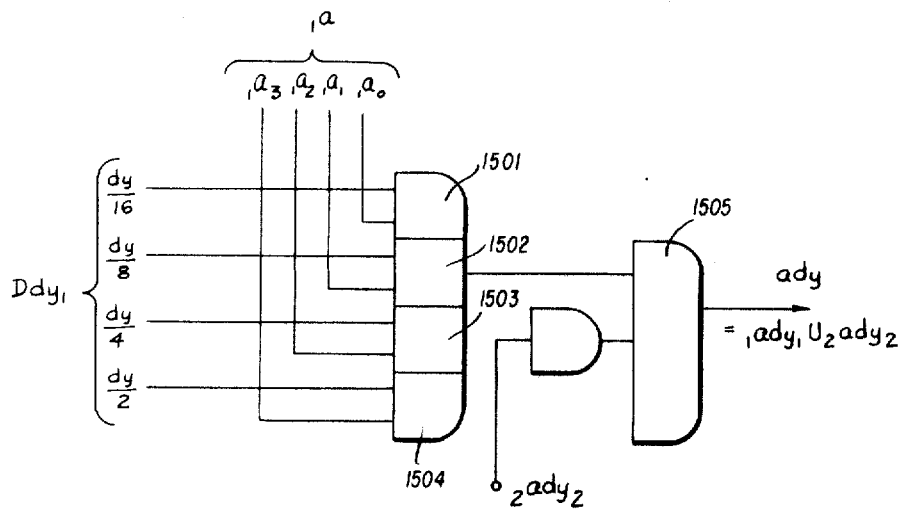

*5.11. Rate Multiplier, R.*—The rate multiplier is shown in FIGURE 15 and the block representation of the rate multiplier is shown in FIGURE 15a. The rate multiplier is used to produce the product of a four-bit input number, and sign, $_1a$, and a four-bit distributed rate and sign $Ddy_1$ to produce the distributed rate and sign $_1ady_1$. If $_1ady_1$ is a partial distributed rate product of a longer than four-bit distributed rate, and if another partial product, $_2ady_2$, is brought into the rate multiplier, the total rate product $ady = _1ady_1 U_2 ayd_2$ is produced. The four bits $a_0$–$a_3$ are multiplied by the four bits of distributed rate in the gating sections 1501–1504, respectively. The resultant product is multiplied by the partial product $_2ady_2$ in the gating section 1505. Two of the four-bit rate multipliers shown in FIGURE 15 can be combined to form an eight-bit rate multiplier.

*5.12. Summing Unit, U.*—The summing unit is shown in FIGURE 16 and a block representation of the summing unit is shown in FIGURE 16a. The summing unit adds algebraically three bits $a$, $b$, and $c$ having the signs $ⓐ$, $ⓑ$, $ⓒ$, respectively. The output is a two-bit absolute value of lower order S and higher order C having sign $Ⓢ=Ⓒ$. The summing unit includes the two half adders 1601 and 1602 of the type shown in more detail in FIGURE 6. In addition, the logic blocks 1603 and 1604 are provided to form the sign and higher order output respectively.

*5.13. Adder-Subtracter Unit, UAS.*—The adder-subtracter unit UAS is shown in FIGURE 17 and a more detailed logic diagram is shown in FIGURE 17a. The adder-subtracter unit accepts as inputs a bit of augend, $a_1$, of sign $ⓐ$, a bit of addend, $b_1$, of sign $ⓑ$, and an input carry bit $c_1$ of assumed sign $Ⓒ=ⓑ$.

If the input signs, $ⓐ$ and $ⓑ$, are alike (condition ①), it adds the absolute values of the inputs to produce a two-bit output $C_1$, $S_1$ of the common sign $Ⓒ=Ⓢ=ⓐ=ⓑ$.

If the input signs are different (condition ②), it subtracts the absolute values of $b_1$ and $c_1$ from the absolute value of $a_1$ without regard to their relative magnitudes. Then it produces a sum output bit, $S_j$, of sign $Ⓢ=ⓐ$, and a carry bit $C_i$ of sign $Ⓒ=ⓑ$.

Thus, $Ⓢ=ⓐ$ and $Ⓒ=ⓒ=ⓑ$.

The UAS unit includes two modified half adders 1701 and 1702 and combining circuitry 1703. The logic circuitry of the adder-subtracter unit is shown in detail in FIGURE 17a. The logical equations for the operation of the circuitry shown in FIGURE 17a are as follows:

First modified UAS $\frac{1}{2}$ $$① = \overline{ⓐ}\,\overline{ⓑ} \cup ⓐⓑ$$
$$Ⓢ = Ⓒ' = ⓐ$$
$$s_i = a_i \overline{b_i} \cup \overline{a_i} b_i$$
$$c_i' = a_i b_i$$
$$② = \overline{①} = ⓐ\overline{ⓑ} \cup \overline{ⓐ}ⓑ$$
$$Ⓢ = \overline{Ⓒ}' = ⓐ$$
$$s_i = a_i \overline{b_i} \cup \overline{a_i} b_i$$
$$c_i' = \overline{a_i} b_i$$

$$s_i = a_i \overline{b_i} \cup \overline{a_i} b_i$$
$$c_i' = ① \ a_i b_i \cup ② \ \overline{a_i} b_i$$
$$S_i = s_i \overline{c_i} \cup \overline{s_i} c_i = \overline{\overline{s_i} \overline{c_i}} \cup s_i c_i$$
$$c_i'' = ① \ s_i c_i \cup ② \ \overline{s_i} c_i$$

Second modified UAS $\frac{1}{2}$ $$① \quad Ⓢ = Ⓒ'' = ⓐ \qquad\qquad ① \quad C_i = c_i' \cup c_i'' = \overline{\overline{c_i'} \overline{c_i''}}$$
$$S_i = s_i \overline{c_i} \cup \overline{s_i} c_i \qquad\qquad Ⓒ = Ⓒ' = Ⓒ'' = ⓐ$$
$$c_i'' = s_i c_i$$

$$② \quad Ⓢ = \overline{Ⓒ}'' = ⓐ \qquad\qquad ② \quad Ⓒ = Ⓒ' = \overline{Ⓒ}'' = \overline{ⓐ} = ⓑ$$
$$S_i = s_i \overline{c_i} \cup \overline{s_i} c_i \qquad\qquad c_i = c_i' \cup c_i'' = \overline{\overline{c_i'} \cdot \overline{c_i''}}$$
$$c_i'' = \overline{s_i} c_i$$

$$C_i = \overline{\overline{c_i'} \overline{c_i''}} = (① \ a_i b_i \cup ① \ s_i c_i \cup ② \ \overline{a_i} b_i \cup ② \ \overline{s_i} c_i)$$

FUTURE CHANGE WILL SAVE
1 LEVEL/BIT, 1 TRANSISTOR/BIT $$Ⓢ = ⓐ$$
$$Ⓒ = ①ⓐ \cup ②ⓑ = (\overline{ⓐ}\,\overline{ⓑ} \cup ⓐⓑ)ⓐ \cup (ⓐ\overline{ⓑ} \cup \overline{ⓐ}ⓑ)ⓑ$$
$$= ⓐⓑ \cup \overline{ⓐ}ⓑ = ⓑ(ⓐ \cup \overline{ⓐ}) = ⓑ$$

From the above equations the operation of the logic block 1704–1710 of FIGURE 17a will be apparent.

Figure 18:
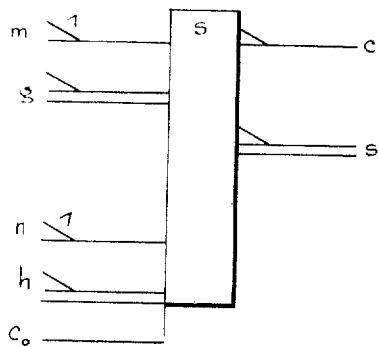
FIGURE 18b shows two rate multipliers used in the S module.
Figure 37B:
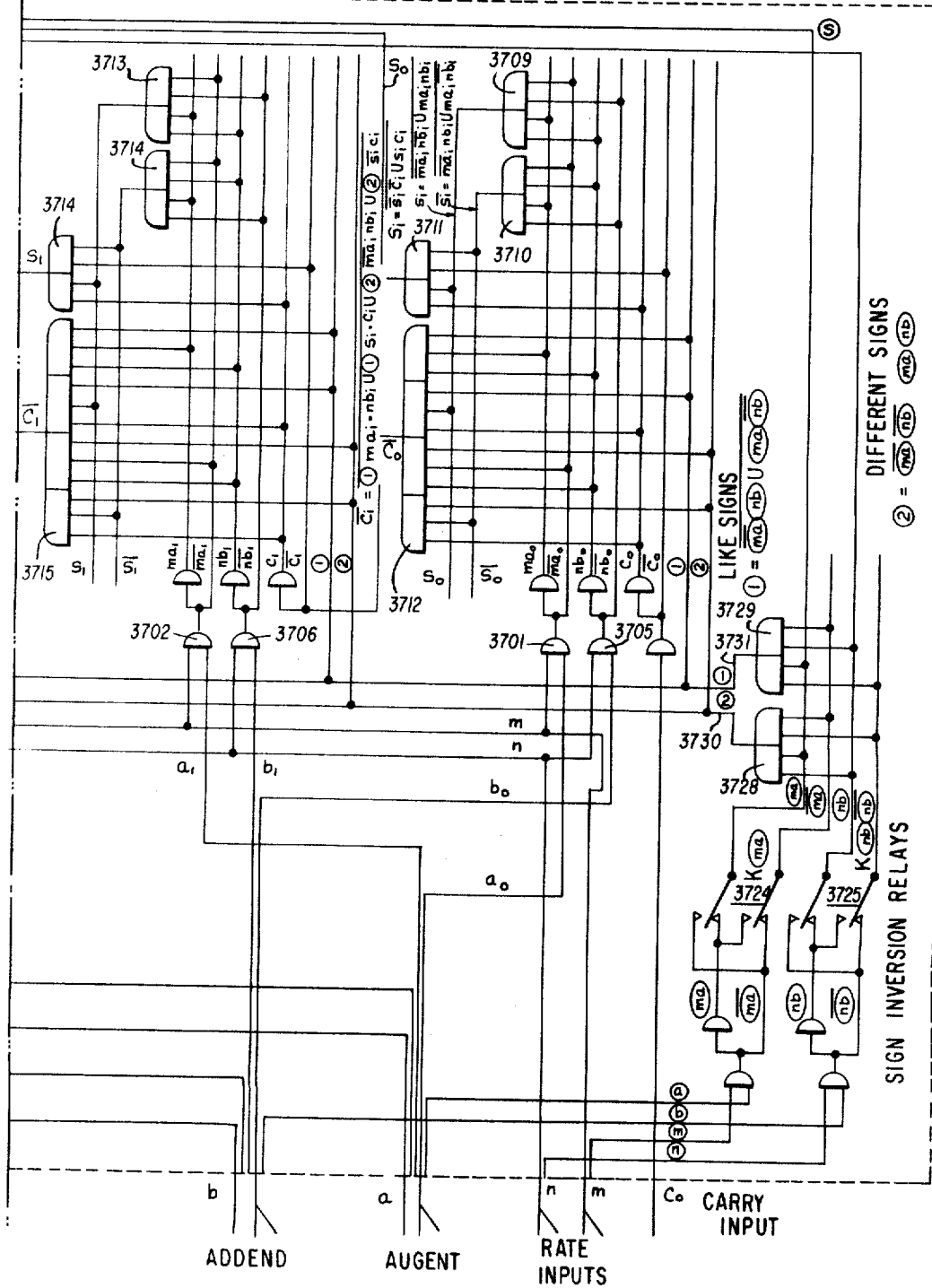
FIGURE 37b shows a portion of the S module.

*5.14 Adder-Subtracter Module, S.*—The adder-subtracter module S is shown in block form in FIGURE 18. The detailed logic of an eight-bit S module is shown in FIGURES 37a and 37b and described in detail in Section 6.4 in conjunction with an actual problem.

Figure 18B:
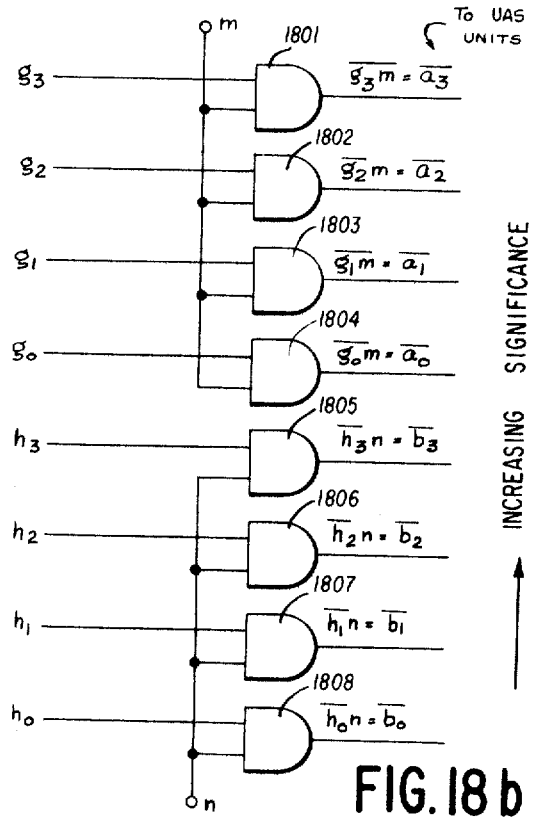
Figure 18A:
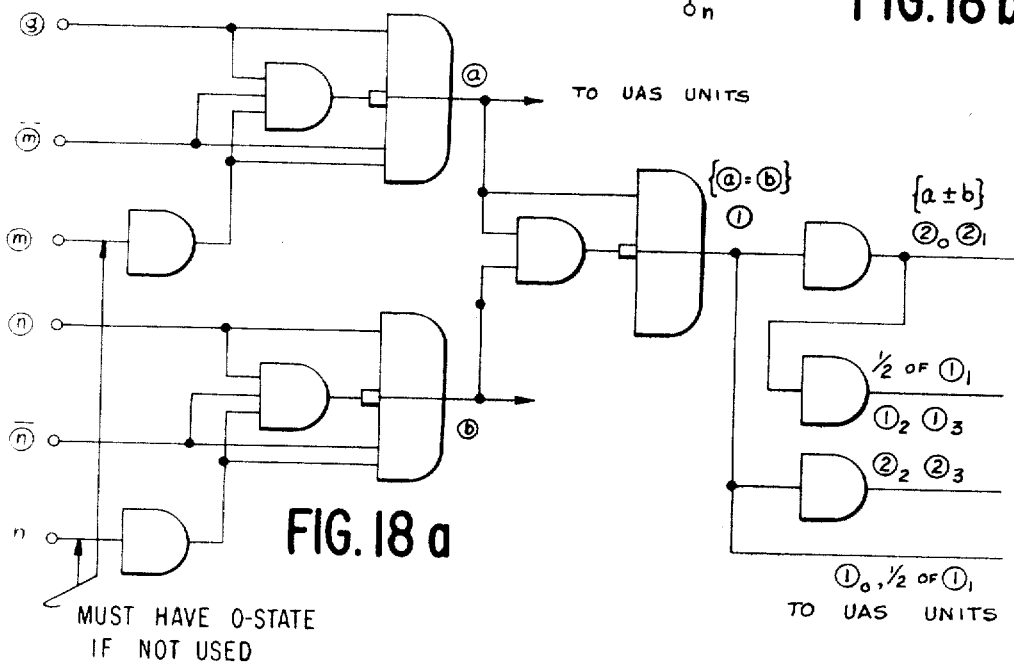

The four-bit module shown in FIGURE 18 includes four UAS units and two parallel multipliers. The logic input to the UAS units is shown in FIGURE 18a and the logic input to the parallel multipliers is shown in FIGURE 18b.

The four UAS units have a common sign for input orders of $a$: ⓐ, and a common sign for the input orders of $b$: ⓑ. The input carry of each order must have the same sign as $b$: ⓒ=ⓑ, and the output carry of each order will have the same sign as $b$: ⓒ=ⓑ.

The portion of the S module parallel multiplier shown in FIGURE 18$b$ includes the logic elements 1801–1804 which produce the $a$ input to the half adders described above. The parallel multiplier including the logic elements 1805–1808 produces the $b$ input to the UAS units described above. These two multipliers form the product, $a$, of rate $m$ and a four-bit input number $g$. The other multiplier forms the product $b$ of the rate $n$ and the number $h$. The circuitry used for producing the signs of $a$ and $b$ is shown in FIGURE 18$a$.

Figure 19:
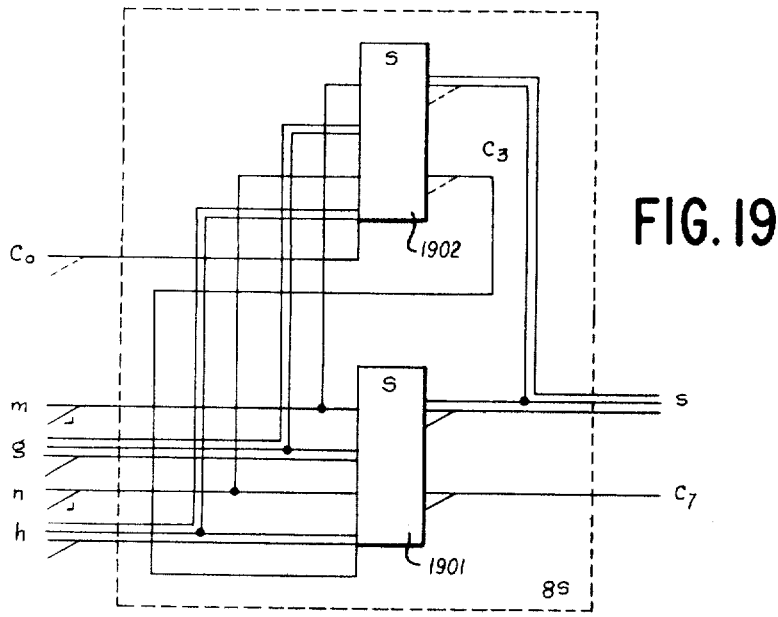
FIGURE 19 shows an eight-bit S module.

*5.15. Eight-bit Adder-Subtracter Module, 8S.*—The 8S module of FIGURE 19 includes S modules 1901 and 1902. When two S modules of FIGURE 18 are combined as shown in FIGURE 19, the result is the 8S module. The 8S module forms two eight-bit products, $a$ and $b$, where $a=mg$ and $b=nh$. The signals of these products, ⓐ and ⓑ, are each determined by the signs of its inputs ⓐ$=f($ⓜ, ⓖ$)$ and ⓑ$=f($ⓝ, ⓗ$)$. The sign of a parallel product may be inverted by applying the sign of its input rate to the corresponding inversion input terminal. If a rate sign is applied, instead, to its inversion input terminal its normal input terminal must be kept in the 0 state. The two eight-bit inputs are added algebraically and produce an eight-bit sum S of the same sign as $a$: ⓢ=ⓐ, and a one-bit "overflow" carry C of the same sign as $b$, ⓒ=ⓑ. The input carry, $c_0$, enters into this addition as an additional bit in the lowest order having the same sign as $b$: ⓒ=ⓑ.

Figure 20:
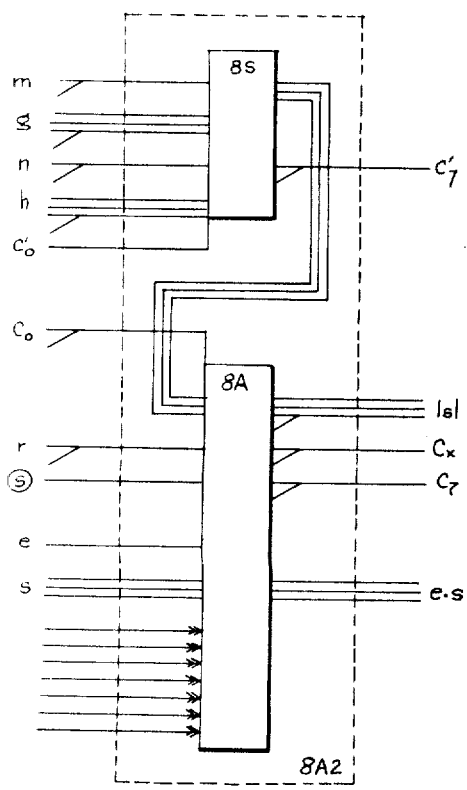
FIGURE 20 shows an eight-bit accumulator module with two inputs.

*5.16. Eight-bit Accumulator Module with Two Inputs, 8A2.*—By preceding an 8A, single input accumulator module with an 8S, adder-subtracter module, the 8A2, eight-bit accumulator module with two inputs can be formed as shown in FIGURE 20. The 8A2 module adds algebraically to the state of its operating register two eight-bit numbers $mg$ and $nh$, each of which is a product of the indicated single-letter inputs. Before the sum of these products is added to the contents of the register it is, in turn, multiplied by rate $r$. Each of the three parallel multiplications described above has programmable sign inversion. The 8A2 also accepts two input carry bits, $c_0$ and $c_0'$, in its lowest order and produces two output carry bits $C_7$ and $C_7'$, from its highest order. Input carry $c_0'$ is added to $mg$ and its sign is assumed to that of $nh$ (after inversion, if used). Output carry $C_7'$ will always bear this same assumed sign which is automatically correct for entering into the corresponding input carry position of a succeeding module of adder-subtracter if all the inputs and outputs to these 8S units are parts of the same multi-bit number and rates. Carries $C_7$ and $c_0$ may be applied to the succeeding or to the preceding 8A modules without regard to their signs.

Other functions of this 8A2 module are as described previously for its component modules.

Figure 21:
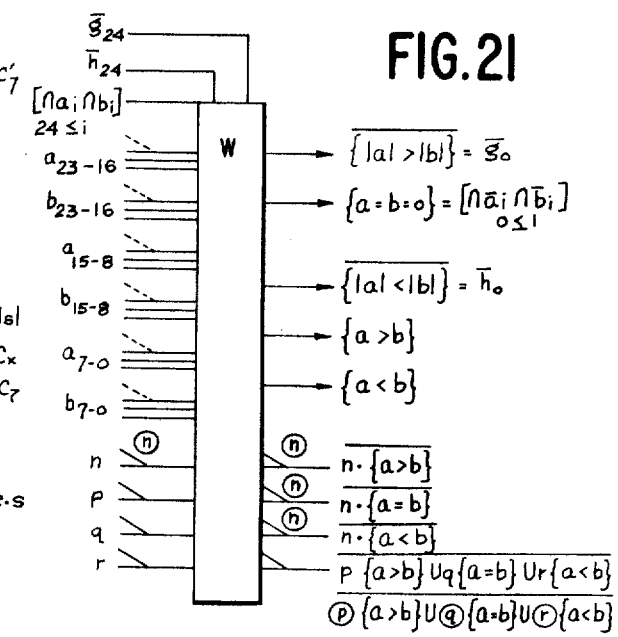
FIGURE 21 shows a comparator module.

*5.17. Comparator Module, W.*—The comparator module block diagram and logical equations are shown in FIGURE 21 and its internal logic is shown in FIGURES 22$a$–22$c$. It compares two inputs $a$ and $b$ of 24-bit absolute value each and of signs ⓐ and ⓑ and it determines whether $a>b$, $a=b$, or $a<b$ as a result of magnitude and sign information. This module is capable of comparing numbers of less than 24 bits by simply leaving unconnected its lower order input terminals. To compare numbers greater than 24 bits, the $\bar{g}$, $\bar{h}$, and $[\cap a_i \cap b_i]$ terminals connect adjacent orders. Each comparator module also contains a single-pole electronic switch which connects input bit $n$ to one of three output terminals according as $a>b$, $a=b$, or $a<b$. Each comparator module contains also another electronic switch which switches one of three input bits $p$, $q$, and $r$, to a common output terminal according as $a>b$, $a=b$, or $a<b$. This common output switch has a second pole for selecting the sign of the input bit for the sign output terminal.

The result of the comparison is brought out on only two terminals corresponding to $a>b$, $a<b$, in order to save poles on the interconnection matrix since this information is sufficient for external logic to determine $a=b$.

The operation of the logic circuitry 2201–2222 shown in FIGURES 22$a$–22$c$ will be apparent from the logical equations provided with the drawings.

*5.18. Electronic Switch Module, H.*—The electronic switch module is shown in block form in FIGURE 23 and a logic diagram is shown in FIGURE 24.

Electronic switch modules, H, accepts a four-bit input number $n$ of sign ⓝ and switches it to one of three output positions according to the control input information $\{a>b\}$, $\{a=b\}$, or $\{a<b\}$. Only two input terminals are provided, for $\{a>b\}$ and for $\{a<b\}$, since the internal logic can then determine if $\{a=b\}$. The sign of $n$ is simply brought out as the sign of each four-bit output.

The internal logic of the electronic switch module is shown in FIGURE 24, together with the logical equations describing the operation of the gating elements. The operation of the logic diagram will be apparent from the equations.

*5.19. Eight-bit Electronic Switch Module, 8H.*—The eight-bit electronic switch module is shown in FIGURE 25.

Figure 25:
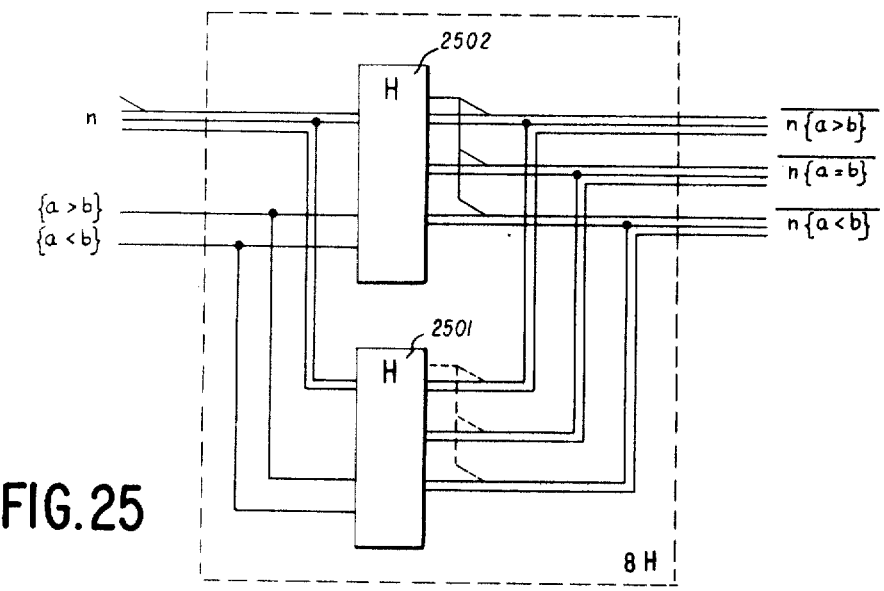
FIGURE 25 shows an eight-bit electronic switch module, H.

When two H electronic switch modules 2501 and 2502 are combined as shown in FIGURE 25, the result is the 8H electronic switch. The 8H switch accepts an eight-bit number $n$ and sign ⓝ and switches it to one of three locations according to the alternative control information $\{a>b\}$, $\{a=b\}$, or $\{a<b\}$. The sign ⓝ is brought along to all of the three output locations.

*5.20. Electronic Switch Module, F.*—The electronic switch module F, as shown in FIGURE 26 and FIGURE 26$a$, shows the logic circuit. This module accepts three four-bit numbers $p$, $q$, and $r$ along with their signs ⓟ, ⓠ, and ⓡ and switches one of them to a common output location according to the control information $\{a>b\}$, $\{a=b\}$, or $\{a<b\}$. An input terminal is provided for each of $\{a>b\}$, $\{a<b\}$ while $\{a=b\}$ is determined by the internal logic from the above inputs, by the equation of FIGURE 26$a$. Because of the sign switching F is actually a five-pole switch.

Figure 27:
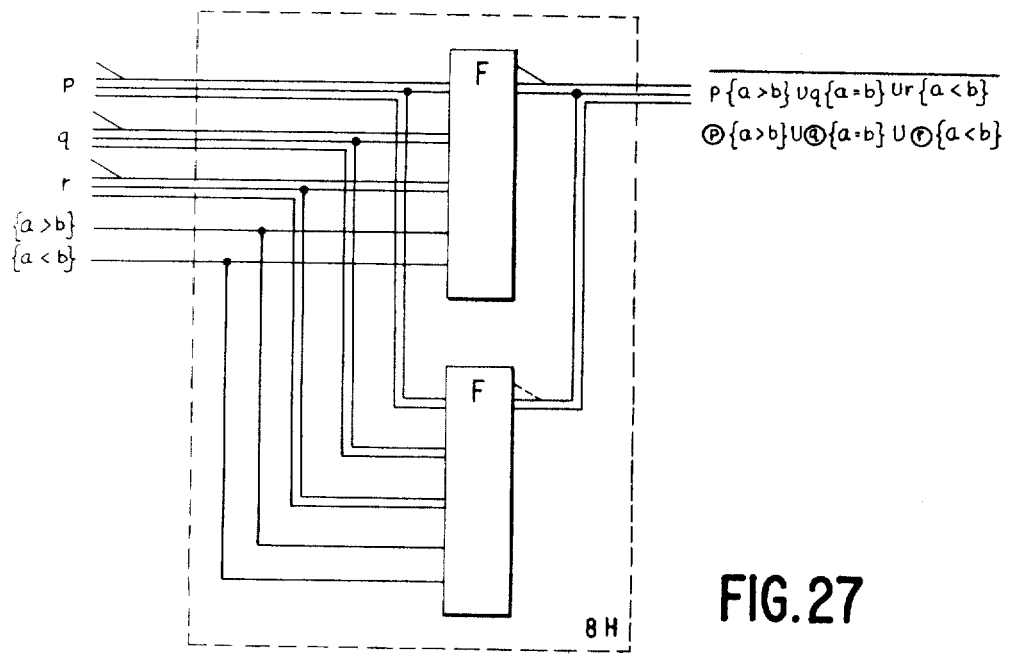
FIGURE 27 shows an eight-bit F module.

*5.21. Eight-bit Electronic Switch Module, 8F.*—Two F units may be combined as shown in FIGURE 27 to form an 8F electronic switch module. The 8F module is a nine-pole electronic switch which connects one of three inputs to a common output. These nine poles switch an eight-bit input number $p$, $q$, or $r$ along with its sign, ⓟ, ⓠ, or ⓡ, to the output terminals according to the control input information $\{a>b\}$, $\{a=b\}$ or $\{a<b\}$. Only $a>b$ and $a<b$ are brought in, and $\{a=b\}$ is determined by the internal logic of the F modules.

*5.22. Half Adder Unit, UH.*—Half adder unit, UH, shown in FIGURES 28 and 28$a$, adds two bits $a$ and $b$ of the same significance and produces an output of sum bit S and carry bit C. This unit may be constructed to accept true or complement inputs and to produce true or complement outputs with nearly equal equipment, as required for a given application.

*5.23. Full Adder Unit, UF.*—Full adder unit UF, shown in FIGURES 29 and 29$a$, adds three bits $a$, $b$, and $c$ of equal significance and produces an output of sum bit S and carry bit C. This unit may be constructed to accept true or complement inputs and to produce true or complement outputs with equal equipment as required for a given application.

Figure 30:
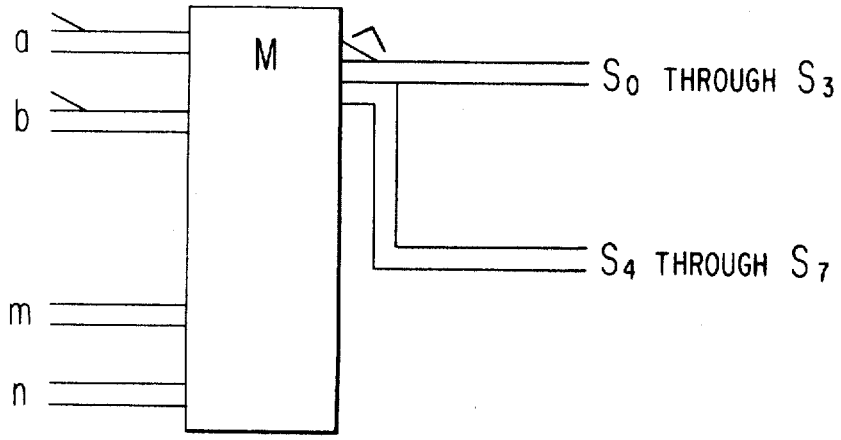
FIGURE 30 shows the parallel multiplier module, M.

*5.24. Simultaneous Multiplier Module (Parallel), M.*— A block diagram of the simultaneous multiplier (parallel)

module together with its logical equations is shown in FIGURE 30. FIGURE 30a shows the internal logic of the simultaneous multiplier module and FIGURE 30b shows the logic for producing the sign outputs. This module accepts two four-bit inputs $a$ and $b$ together with their signs $\circledast$ and $\circledast$ and forms an eight-bit product, S and its sign $\circledS$. The complement of $\circledS$ may be substituted for S at the output by applying the sign of S, $\circledS$, to the inversion output terminal. If the inversion output is used, the normal output terminal is still available.

The simultaneous multiplier modules are capable of interconnection to provide the simultaneous multiplication of longer-than-four-bit input numbers. For purposes of such interconnection, additional inputs, $m$ and $n$, are provided and the output may be split into upper and lower orders.

The inputs $m$ and $n$ are four-bit numbers which are added to the lower order of the partial product, $S_0$ through $S_3$. The resulting $S_0$ through $S_3$ may, in turn, be applied to the $m$ or $n$ inputs of other modules of the same significance until, finally, a single set of these four bits of the total product is obtained. Outputs $S_4$ through $S_7$ may be applied to the $m$ or $n$ input of a module of the next higher significance in order to develop, progressively, these next four bits of the total product.

*5.25. Serial-Parallel Multiplier, N.*—The general method of serial-parallel multiplication may be seen diagrammatically in FIGURE 31. A serial-parallel multiplier is shown in block form in FIGURE 32. FIGURE 32a shows the register logic, FIGURE 32b shows the bit multiplication logic and FIGURE 32c shows the sign logic. Referring to FIGURE 31, during each time increment, the multi-bit parallel multiplicand, $a$, is multiplied by $b_j$, a bit of multiplier $b$. The bits of $b$ appear in a time seqence of increasing significance. Thus, partial products are produced in a sequence of increasing significance. If each partial product is added to the next higher order partial product when this higher order partial product is formed, the total product is accumulated by this sequence. At the end of the first time increment, the lowest bit of this product, $S_0$, may be read-out, since future information will occur only in higher orders. Similarly, at the end of the second time increment, the next order of the product, $S_1$, may be read-out. In this same manner, all of the product may be read-out in a time sequence of increasing significance. If the operands $a$ and $b$ are each $n$ bits long, this product, S, will be $2n$ bits long and will appear in a sequence over $2n$ time increments.

If the bits of the product are read-out when they are formed, as described above, the remaining partial product is never longer than $n$ bits. Then it may be accumulated in a register of $n$ bits—the length of the operands. Then the accumulating device must contain a partial product, the significance of which increases by one bit per time increment. Then the "sum output" of the previous partial product must be shifted by one bit before being added to the current partial product. For this same reason, any carries of the previous partial product are not shifted before addition to the current partial product. If the logic for this register includes a complete ripple-through of the carry information during each time increment, it will also contain the $n$ most significant bits of the current partial product in parallel form. After $n$ time increments, this parallel partial product is the $n$ most significant bits of the total product.

Referring to FIGURE 32a, the product is developed as a time sequence. If the input word lengths are $n$-bits, the $n$ least significant bits of this product occur in the first $n$ time increments, and the $n$ most significant bits occur over the next $n$ time increments. Since only the $n$ most significant bits are ordinarily useful, the first $n$ bits may be discarded. This accumulating device is actually a type of parallel accumulator, which adds the "sum-bits" and "carry bits" of each partial product together during each time increment. It produces one parallel word $S_{i+1}$, $S_{i+2}$, ..., $S_{i+n}$ during each time increment, $i$, representing the $n$ most significant bits of the current partial product. After only $n$ time increments, the highest $n$ bits of the total product appear in parallel form:

$$\sum_{j=1}^{n} S_{i+j} 2^{i+j} = \sum_{j=1}^{n} S_{n+j} 2^{n+j}$$

The most significant bits of the previous partial product are stored for one time increment in the flip-flops 3101–3104 and are added to the current partial product in the next lower order of significance (since this partial product increases by one order of significance for each time increment). After $n$ (=word length) time increments, the $n$ most significant bits of the total product appear in the register. The lowest order sum information does not contribute to the $n$ most significant bits of the product.

FIGURE 32a may be considered as a serial-parallel multiplier module of four-bit length (if the dotted blocks are omitted and if sign information is provided for).

*5.26. Expandable Serial-Parallel Multiplication.*—As indicated in FIGURE 33, an arrangement of N-modules 3301, 3302, and 3303 can multiply numbers of $4m$-bits word length. Before application of the N-modules, the multiplier, $b$, is distributed into serial form over $4m$ time increments. This arrangement requires $m$ of the N-modules and produces the $4m$ most significant bits of the product as a parallel number while the inputs are maintained constant. The carries ripple through completely during each time increment.

Figure 34:
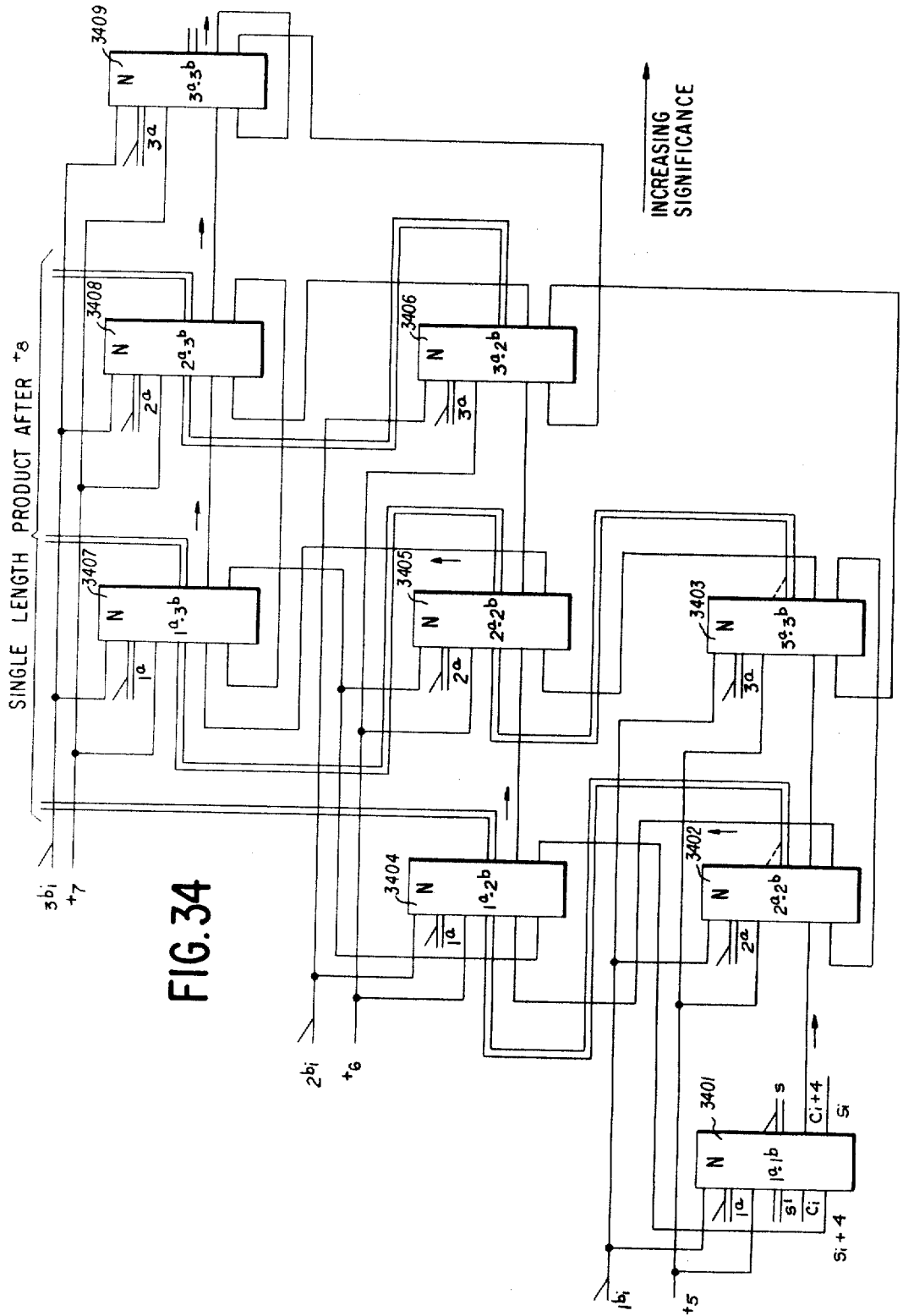
FIGURE 34 shows the connection of several serial parallel multipliers in tiers.

*5.27. Simultaneous (Serial-Parallel) Multiplication.*—As shown in FIGURE 34, the N-modules 3401–3409 may be arranged for "simultaneous" multiplication regardless of the word length of the operands. Actually, the clock pulse period must be divided into $4+m-1$ time increments where $4m$ is the maximum word length required. Then a single length product ($4m$ most significant bits) may be read-out in parallel form after a single clock period. For example, if the maximum word length is twenty bits, the clock period must be divided into at least $4+m-1=4+5-1=8$ time increments. During the first four increments, the operands are applied in the normal manner, resulting in a product contained in parallel form in the N-modules. But the output in modules of equal significance must be combined to make this product a single parallel number.

During the remaining time increments, the output of each module is applied to the next module of the same significance in place of its multiplicand. During the fifth time increment, the multipliers to the column of modules 3404–3406 are replaced by 1's while all other multipliers are replaced by 0's. This causes the contents of the column of modules 3401–3403 to be added to the contents of the column of modules 3404–3406. All numbers also shift to the left by one order, and the bit carries and borrows propagate between modules in their normal manner. During the sixth time increment, only the multipliers for modules 3407–3409 are made 1's so that the information in the column of modules 3404–3406 is added into the column of modules 3407–3409 and, again, all numbers shift by one bit. When this routine has been performed for $m-1$ time increments, the information in and below the $m^{\text{th}}$-from-the-bottom column has been combined into this column and all of the information has been shifted by $m-1$ bits in the direction of the lower orders. In a column of less than $m$ modules, the information has simply advanced to the farthest-from-the-bottom module and continued to shift in concert with the rest of the information. Then the result may be read out as a single parallel word, the most significant bit of which is $m-1$ bits from the high end of the "register." If $m-1=5-1=4$, the highest order module of four bits is simply not read-out. Because of the total of eight time increments, the lowest order bit remaining in the product is eight bits from the least significant end of the double product. Therefore, a single length product is always available from this arrangement even if the operands are only eight bits long.

6. Description of operation involving solution of simple differential equation To illustrate the operation of the computer of this application, the solution of a simple differential equation will be described. The equation to be programmed is as follows:

$$\dot{z} = -z\dot{x} + k$$

In programming this equation, it is desirable continuously to provide a quantity representative of the value of $z$ for all periods of time. For the purposes of this problem, we will assume that $\dot{x}$ is a single-bit rate signal that varies only between two levels at all periods of time. It will be understood that the quantity $\dot{x}$ might assume a more complicated function of time. Further, the solution of this particular differential equation is so simple that a complicated computer of the type described in this application would not ordinarily be used. However, the description of the computer in solving this simple differential equation will be such that it will enable a person skilled in the art to determine the solution of much more complicated problems using the computer of this application.

Figures 35, 35A:
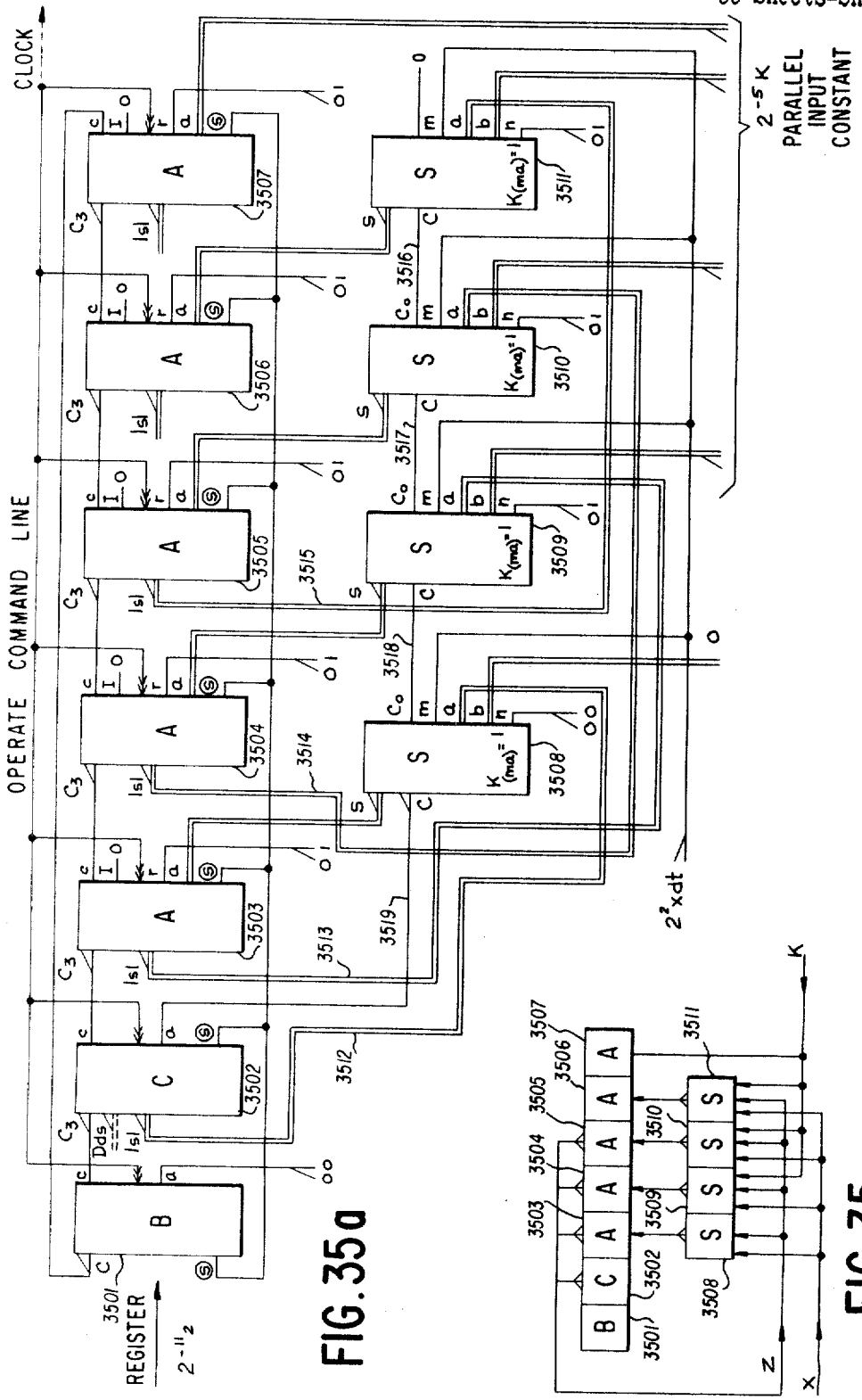
FIGURE 35 is a block representation of the modules used in the solution of a simple equation.
FIGURE 35a shows the same block diagram with more detail.

Referring to FIGURE 35, there is shown a representation of the portion of the computer required to solve the simple differential equation under consideration.

The scaled value of $z$ is accumulated in the register including the B module 3501, the C module 3502, and the A modules 3503–3507. Each of the modules 3502–3507 is a four-bit binary register. The output taken from modules 3502–3505 represents the absolute value to sixteen-bit precision of the quantity $z$ and the sign of $z$.

The quantity $z$ to sixteen-bit precision is connected in parallel to the inputs to the S modules 3508–3511. The parallel sixteen-bit representation of the quantity $z$ is multiplied by the single-bit rate input $\dot{x}$ in the S modules 3508–3511. The sign of this product is inverted and the product is transferred to the A modules 3503–3506 at each clock interval. The constant $k$ input, to sixteen-bit precision, is applied to the A module 3507 and to the S modules 3509–3511. The result is that at each clock interval the count standing in the register 3501–3507 is incremented by an amount equal to the negative value of the product of $z$ and the rate input $\dot{x}$ plus the constant quantity $k$. A quantity is accumulated in the register 3501–3507 in accordance with the following equation:

$$\dot{z} = -z\dot{x} + k$$

The quantity in the register 3501–3507 is representative of $z$ at all periods of time. The B module 3501 represents the sign of the value of $z$.

6.1. *Scaling, Assumptions and Initial Conditions.*—In order to use the computer to obtain real time solutions of the equation $\dot{z} = -z\dot{x} + k$, it is necessary to assume certain maximum values for the variable. Having assumed these maximum values, it is necessary to apply a scale factor to each of the variables so that the values will always fall within the limits of the computer. In this case, the variables are scaled such that their absolute values are always less than unity. The maximum values and scale factors applied to each of the inputs are given in the table below:

|   | Maximum | Scaled Variables |
|---|---|---|
| $\dot{x}$ | 0.2 | $2^2\dot{x}$ |
| $z$ | 2000 | $2^{-11}z$ |
| $k$ | 25 | $2^{-5}k$ |

In the solution of this problem, it will be assumed that $k$ is a constant and is equal to 16. It will be assumed that the rate input, $\dot{x}$, is equal to .125. After applying the scale factor, we have:

$$2^2\dot{x} = .5$$

In this example, $\dot{x}$ is a rate represented by a single bit and sign. The value of $+.5$ in the example is represented by alternating between 0 and 1 on successive clock intervals.

We will assume, that initially, the value of $z$ is 1500. Applying the scale factor of $2^{-11}$ to the initial value of $z$, a value of $z$ of .7324219 is initially contained in a register, thereby representing $2^{-11}z_0$.

It is also necessary to provide a time scale so that a solution of the problem may be obtained in real time or faster. We will assume that the computer is operating at a clock frequency of $2^{20}$ cycles per second. This is represented as:

$$2^{\beta c} = 2^{20} \text{ cycles per second}$$

We will assume a total problem time of 40,000 minutes. This is represented as:

$$t = 40,000 \text{ minutes} = 2,400,000 \text{ seconds real time}$$

We will assume that a solution is desired in about ten seconds. Therefore, the computer problem must run approximately $2^{18}$ times as fast as the actual problem. $2^{18}$ is a time scaling factor or ratio of running time to real time, which is represented as follows:

$$T = 2^\beta t$$

$$2^\beta = \frac{T}{t} \cong 2^{-18}$$

$$\beta = -18$$

We can now find the required integrator gain which is represented by $2^T$. The required integrator gain is given by:

$$2^{\beta T} = 2^{\beta c} \times 2^\beta = 2^{20} \times 2^{-18} = 2^2$$

The scaling and initial conditions for the problem having been described, i.e., the description will proceed to the computer components required to implement this problem.

6.2. *Description of Block Diagram 35a.*—In order to obtain the proper scaling factor necessary to obtain $2^{-9}k$, the four least significant bits of $k$ are applied directly to the $a$ input of the A module 3507 and are not added to the corresponding bits of the product $\dot{x}z$ in the S modules. A quantity equal to $$2^{-9}(-z\dot{x} + k)dt$$

is obtained from the S modules 3508–3511 by applying $2^{-9}kdt$ as the $nb$ input. The quantity $2^{-5}k$ is applied to the $b$ input as level information of sixteen-bit precision and a constant rate of 1 is applied to the $n$ input. A scaling factor of $2^{-4}$, necessary to obtain $2^{-9}k$, is obtained by applying $2^{-5}k$ at four orders lower of the S modules 3508–3511. Since the least significant four bits of $k$ need not be added to any corresponding bits of $z\dot{x}$, they are applied directly to the input $a$ of A module 3507 instead of to the S modules.

Further scaling is required to obtain the proper input to the A modules from the S modules.

The quantity $$2^{-13}(-z\dot{x}+k)dt = 2^{-11}(-z\dot{x}+k)dt \times 2^{-\beta T}$$

$$= 2^{-9}(-z\dot{x}+k)dt \times 2^{-4}$$

is obtained as the register input by scaling the adder-subtracter output, $2^{-9}(-z\dot{x}+k)dt$, right by four bits at the register input. This register input is added to the contents of the register by level logic in the register to obtain the next value in the register, but the contents of the register is changed to its new value only by the clock pulse at the end of the clock interval.

Thus, the value in the register after the $i+$1st clock pulse is related to its previous value by $$2^{-11}z_{i+1}=2^{-11}z_i+2^{-13}(-z\dot{x}+k)dt$$

or $$\frac{z_{i+1}-z_i}{dt}=2^{-2}(-z_i\dot{x}_i+k)$$

or $$\frac{dz}{dt}=2^{-2}(-z\dot{x}+k)=\text{change in } z \text{ per clock interval}$$

But since there are $2^\beta{}^T=2^{20}$ clock intervals per second $$\frac{dz}{dt}=2^{-2}\times2^{20}(-z\dot{x}+k)=2^{18}(-z\dot{x}+k)=$$

change in $z$ per second $=2^{-\beta}(-z\dot{x}+k)$ which equals the intended value of the time scaling factor.

FIGURE 35a is a more detailed drawing of FIGURE 35 in which like reference numerals denote the same modules. This figure shows the parallel connections between registers in more detail. The parallel sixteen-bit representation of $z$ is connected from register 3503–3505 to the S modules 3508–3511 as follows: Four bits from C module 3502 are connected over the four-bit lines 3512 to the $a$ input to S module 3508. The four bits from A module 3503 are connected over the four-bit lines 3513 to the $a$ input to S module 3509. The four bits from A module 3504 are connected over the four-bit lines 3514 to the $a$ input to the S module 3510. The four bits from the A module 3505 are connected over the four-bit lines 3515 to the $a$ input to the S module 3511.

The single-bit rate signal $\dot{x}$ is connected to the $m$ inputs to the S modules 3508–3511.

The sixteen-bit parallel $k$ input is applied as follows: Four bits are each connected to the $b$ inputs to the S modules 3509, 3510, and 3511 and four bits are connected to the $a$ input to the A module 3507.

The S modules 3508–3511 are interconnected to provide partial carries to succeeding S modules. At each clock time the partial carries are transferred from S module 3511 to S module 3510 on line 3516; from S module 3510 to S module 3509 on line 3517; from S module 3509 to S module 3508 on line 3518; and from S module 3508 to C module 3502 on line 3519.

Similarly, the modules 3501–3507 are interconnected to provide partial carries. The partial carry from each module is connected to the $c$ input to the succeeding module.

Each of the A modules 3503–3507 also have the following inputs. Each A module is provided with an I input which is used to invert the contents of the registers. For the purposes of this problem, the I inputs are 0. Each A module is also provided with an $r$ input. For the purposes of this problem, the $r$ input is assumed to be 1. However, it should be noted that another single-bit rate signal could be applied tot his $r$ input if desired. The sign of the quantity standing in the A modules is connected to each register by means of the signal marked Ⓢ which is derived from the B module 3501. The B module 3501 is used to keep track of the sign of the number in register 3502–3507.

The sign inversion required in the transfer of the quantity $-z\dot{x}$ from the S modules 3508–3511 to the A modules 3503–3506 is accomplished by means of simple relay circuitry which will be described in more detail in conjunction with a description of the S module.

6.3. *Accumulator Module, A.*—The accumulator module, referred to as the A module, is shown in FIGURES 36a and 36b which together form a logic diagram for the A module. The accumulator module accepts a four-bit parallel input at each clock time and accumulates the partial sum of all of these inputs. The four-bit parallel input, referred to as the $a$ input, is coupled over the lines 3601–3604 to the A module. The four bits of the parallel input are referred to as the $a_0$, $a_1$, $a_2$, and $a_3$ bits, respectively. The sign of the $a$ input is provided on the line 3611.

The partial sums of the bits successively appearing on the lines 3601–3604 are respectively accumulated in the flip-flops 3605–3608.

Other inputs to the A module are as follows. A rate input $r$ is provided on the line 3609. The sign of this rate input, Ⓡ, is provided on the line 3610. An inversion signal I is provided on the line 3612.

The sign of the rate input, Ⓡ, the sign of the $a$ input, Ⓐ, and the inversion signal I are all combined in the logic block 3613 to produce the signals $\widetilde{ra}$ and $\overline{\widetilde{ra}}$. For the purpose of this example, we have assumed that the sign of the $r$ input is a 0 (positive) and the $r$ input itself is a constant 1.

Other inputs to the A module include the register sign Ⓢ on line 3614, the input carry $C_0$ on line 3615, and the sign of the input carry Ⓒ on line 3616.

In order to provide the partial sum $S_0$ which is set into flip-flop 3605 at each clock time, the logic block 3617 and the OR-transient circuit 3618 are provided. The inputs to the logic block 3617 are the signals $ra_0$, $\overline{ra}_0$, $C_0$, and $\overline{C}_0$. Since we have assumed that the $r$ input is a constant 1, the logic circuit 3617 produces an output dependent upon the condition of the $a_0$ bit and the carry input $C_0$. The output of logic circuit 3617 is coupled to the input to OR-transient circuit 3618. When a clock pulse occurs at the P input to OR-transient 3618, the flip-flop 3605 will be set in accordance with the condition of the $a_0$ bit and the carry input $C_0$.

The logical equation for the output of the logic block 3617 is:

$$S_0=\overline{ra_0}\overline{c_0}U\overline{ra_0c_0}$$

This logical equation means thta the flip-flop 3605 will be complemented upon the occurrence of either of the following two conditions. First, there is a carry of 1, and an $ra$ of 0; the second condition is that there is a carry of 0, and a product $ra$ of 1.

In order to produce a partial carry from the $a_0$ bit, the logic circuit 3619 is provided. The inputs to logic circuit 3619 are $S_0$ and $\overline{S}_0$, and the signals $ra_0$, $\overline{ra}_0$, Ⓡ$\widetilde{a}$, $\overline{Ⓡ\widetilde{a}}$, $C_0$, $\overline{C}_0$, Ⓒ, and $\overline{Ⓒ}$. These signals respectively, the true and complement outputs of flip-flop 3605, the true and complement values of the product of the rate signal $r$ and the first bit $a_0$ of the $a$ input, the true and complement sign of this product, the true and complement value of the carry input, and the true and complement values of the sign of the carry input. The logic circuit 3619 produces an output $\overline{C}_0$.

The logic equation representing the operation of the logic block 3619 is as follows:

$$\overline{c_0}=ra_0\,\widetilde{(ra_0)}\,c_0\,Ⓒ\,U\,ra_0\,\widetilde{(ra_0)}\,c_0\,Ⓒ\,U\,ra_0\,\widetilde{(ra_0)}\,\overline{c_0}S_0$$

$$U\overline{ra_0}c_0\,Ⓒ\,\overline{S}_0U\overline{ra_0}c_0\,Ⓒ\,\overline{S}_0U\overline{ra_0}\,\widetilde{(ra)}\,\overline{c_0}S_0$$

This equation shows that there are six conditions which will produce a carry $c_0$. The first condition is that $ra_0$ is 1, the sign of $ra_0$ is negative (1), $c_0$ is 1 and the sign of $c_0$ is negative (1). The second condition is that $ra_0$ is 1, the sign of $ra_0$ is positive (0), $c_0$ is 1 and the sign of $c_0$ is positive (0). The third condition is that $ra_0=1$, the sign of $ra_0$ is positive, $c_0$ is 0 and $S_0$ is 1. The fourth condition is that $ra_0$ is 0, $c_0$ is 1, the sign of $c_0$ is negtaive and $S_0$ is 1. The fifth condition is that $ra_0$ is 0, $c_0$ is 1, the sign of $c_0$ is negative and $S_0$ is 0. The sixth condition is that $ra_0=1$, the sign of $ra_0$ is negative, $c_0$ is 0, and $S_0$ is 0. It should be noted that when $c_0$ is 1 and the sign of $c_0$ is negative, there is a negative carry which is usually referred to as a borrow.

In order to determine the sign of the carry $C_0$, a logic circuit 3620 is provided. This logic circuit provides an output indicative of the sign of the carry.

In a similar manner, logic circuits 3621, 3622, and 3623 generate the partial sum $s_1$, partial carry $C_1$, and the sign of the partial carry $\overline{C_1}$ in the second register of the A module. Logic circuits 3624–3626 provide similar functions for the third register and logic circuits 3627–3629 provide similar functions for the fourth register.

The output from the A module is from the logic blocks 3630–3633. The inputs to each of logic circuits 3630–3633 are the true and complement outputs of the associated flip-flops 3605–3608 and the true and complement values of the register sign $\text{\textcircled{S}}$ and $\overline{\text{\textcircled{S}}}$.

6.4. Description of Adder-Subtracter Module.

The adder-subtracter module, referred to as the S module is shown in FIGURES 37a and 37b. Each of the S modules includes two parallel multipliers by means of which either or both of two four-bit inputs may be multiplied by two single-bit rate inputs. The S module further includes means for accumulating the partial sums and carries of the products thereby obtained. The inputs to the S module are as follows: The $a$ input is a parallel four-bit input with sign. In the example which is being considered, four bits of the number $z$ are taken from an A register and connected to the $a$ input of the S module.

A second parallel four-bit input with sign is provided at the $b$ input to the S module. In the example being considered, four bits of the constant $k$ are applied to the $b$ input to the S module.

Provision is made for connecting two single-bit rate signals to each S module. One rate signal and sign is connected at the $n$ input and one rate signal and sign is connected at the $m$ input. In the example being considered, the rate $\dot{x}$ is connected to the $m$ input. The $n$ input is assumed to be a constant 1.

The $m$ input is multiplied by each of the respective bits of the $a$ input. In order to multiply the $m$ input by each of the bits of the $a$ input, the gating sections 3701–3704 are provided. The $m$ input is multiplied by the $a_0$ bit in the gating element 3701; the $m$ input is multiplied by the $a_1$ bit in the gating element 3702; the $m$ input is multiplied by the $a_2$ bit in the gating element 3703 and the $m$ input is multiplied by the $a_3$ bit in the gating element 3704. Similarly, each bit of the $b$ input is multiplied by the $n$ input in the gating elements 3705–3708.

The products $ma_0$ and $nb_0$ are added together by means of the logic circuits 3709 and 3710. The outputs of logic circuits 3709 and 3710 are combined with the carry input $c'_0$ in the logic circuit 3711 to form the partial sum $S_0$ which is one bit of the output of the S module. In order to produce the first partial carry, a logic circuit 3712 is provided.

Similarly, the products $ma_1$ and $nb_1$ are added in logic circuits 3713 and 3714 and combined with the first carry $c_0$ in logic circuit 3715 to produce the second partial sum $S_1$ which is the second bit of the output of the S module. The logic circuit 3715 provides an output indicative of the second partial carry.

Logic circuits 3716–3719 perform similar functions to produce the third partial sum and third partial carry. Logic circuits 3720–3723 perform similar functions to produce the fourth partial sum and the fourth partial carry.

In order to conserve logic circuits, the sign of the output sum S on line 3726 is always taken to be equal to the sign $\overline{ma}$. Similarly, the sign of the carry output on line 3727 is always equal to the sign $\overline{nb}$. These assumptions are made to avoid comparison circuitry which would be necessary to determine whether the product $ma$ or $nb$ is greater. The signs $\overline{ma}$ and $\overline{nb}$ are combined in the logic blocks 3728 and 3729. These two logic blocks produce an output on either the line 3730 or 3731 in accordance with the relative signs of $ma$ and $nb$. By applying these signals on lines 3730 and 3731 to the logic blocks 3712, 3715, 3719, and 3723 producing the carry outputs, the correct signs for the output sum S and the output carry C are insured. It can be shown mathematically that under the conditions shown, the sign of the output sums on line 3726 will always be equal to the sign of $ma$ and the sign of the carry output on line 3737 will always be equal to the sign of $nb$.

Means are also provided in the S module for programming a sign change. These means include the relays 3724 and 3725. While the windings of these relays have not been shown, it will be understood that the windings are merely energized to switch the contacts to the desired position to produce the sign change required.

In the instant problem, the constant $k$ is added to $-z\dot{x}$. Therefore, it is desirable to change the sign of $z\dot{x}$. The number $z$ is applied to input $a$ in FIGURE 37b and $\dot{x}$ is applied to input $m$. Therefore, the sign of $ma$ must be inverted. This is accomplished by energizing relay 3724 to the condition opposite that shown in FIGURE 37b. In this case, $\overline{ma}$ is replaced by $\overline{\overline{ma}}$, thereby effecting the desired sign inversion and producing the sum $-z\dot{x}+k$ in the S module.

Briefly reviewing the operation of the S module with respect to the solution of the differential equation $$\dot{z} = -z\dot{x} + k$$

four bits of the quantity $z$, taken from the A modules 3502–3505, are connected as the $a$ input to the S module. Each of these bits is multiplied by the single-bit rate input $\dot{x}$ applied to the $m$ input. The product $ma$ is produced at the outputs of the gating elements 3701–3704. The sign of the product $ma$ is inverted by energizing relay 3724. Each of these partial products is added to the constant input $k$ which is applied to the $b$ input to the S module. The logic circuits 3711, 3714, 3718, and 3722 produce a four-bit output indicative of $-z\dot{x}+k$ at each increment of time.

6.5. Counter Module, C.

In the instant problem, the C module is used to accumulate all the excess carries from the S modules and from the A modules. The carry output from S module 3508 is applied to the $a$ input 3801. The carry output from the A module 3503 is applied to the $c$ input 3802. The counter module adds algebraically the two signed input bits $a$ and $c$ in its lowest order and adds the sum to the present contents $s$ contained in the flip-flops 3803–3806. By way of orientation of the C module shown in FIGURE 38 and the C module shown in block form in FIGURE 9, it should be explained that each of the flip-flops 3803–3806 is a part of one of the register units 905–908 which are shown in detail in FIGURE 8. While each of the register units described in conjunction with FIGURE 8 contains two flip-flops, only one flip-flop is necessary for the instant problem. Accordingly, the flip-flops 3803–3806 are the operating flip-flops 802, while the storage flip-flops 801, not required for this problem, have been omitted from FIGURE 38$a$ to simplify it.

The $a$ input at 3801 and the $c$ input at 3802 are combined in logic block 3807 to produce the complementing signals $s \smile$ which acts through OR-transient circuit 3808 to complement flip-flop 3803. The logic block 3807 produces a 1 output to complement flip-flop 3803 under either of the following two conditions. First, $a$ is 1 and $c$ is 0. Second, $a$ is 0 and $c$ is 1. When both $a$ and $c$ are 1 and when both $a$ and $c$ are 0, the flip-flop 3803 will not be complemented.

The carry from the first stage flip-flop 3803 is generated by the logic block 3809. Logic block 3809 produces an output indicative of a carry $C'$ under either of the following two circumstances. First, the inputs $a$ and $c$ are both 1 and the signs of both inputs are positive. Second, the inputs $a$ and $c$ are both 1 and the signs of both inputs are negative. Whether there is a carry which will complement flip-flop 3804 is further determined by the state of flip-flop 3803 and the sign of the register $\text{\textcircled{S}}$. These conditions are compared in the logic block 3810, the output of which is gated against the output of logic block 3809 in the gating circuit 3811. The output of gating circuit 3811 acts through OR-transient circuit 3812 to complement the flip-flop 3804. Similar circuitry is provided to propagate carries to the flip-flops 3805 and 3806.

A carry from flip-flop 3806 is an indication of the occurrence of one of two possible conditions. First, it may be an indication that the whole register 3502–3507 has overflowed, thus producing an error. Second, this carry may be an indication that the number in the whole register 3502–3507 is changing sign. This occurs when the number standing in the register 3502–3507 is passing through 0. When the contents of register 3502–3507 pass through 0 when counting in the negative direction and when the contents pass through 0 counting in the positive direction, the register sign Ⓢ must be changed.

Logic block 3813 and gating circuit 3814 are provided to detect this carry. The output of gating circuit 3814, on line 3815, is connected to the B module 3501 to indicate an overflow condition or to set a flip-flop which determines the sign Ⓢ of the whole register 3502–3507.

Circuitry is also provided in the C module for producing a distributed rate output at 3816. These four bits of distributed rate are denoted $dS_0/2$, $dS_1/2$, $dS_2/2$, and $dS_3/2$. Each of these bits of distributed rate is indicative of the anti-carry of an associated flip-flop. The anti-carry is best defined by contrasting it with a carry. For example, a carry is produced from flip-flop 3803 when it is already in its 1 state and it is complemented. When flip-flop 3803 is in its 0 state and is complemented, there is an anti-carry.

The distributed rate concept can be explained best with reference to the table below.

DISTRIBUTED RATE

| OR'd Anti-Carries | Time Interval | 3806 | FF 3805 | 3804 | 3803 |
|---|---|---|---|---|---|
| 0 | 0 | 0 | 0 | 0 | 0 |
| 1 | 1 | 0 | 0 | A 0 | 1 |
| 1 | 2 | 0 | A 0 | C 1 | 0 |
| 1 | 3 | 0 | 0 | A 1 | 1 |
| 1 | 4 | A 0 | C 1 | C 0 | 0 |
| 1 | 5 | 0 | 1 | A 0 | 1 |
| 1 | 6 | 0 | A 1 | C 1 | 0 |
| 1 | 7 | 0 | 1 | A 1 | 1 |
| 1 | 8 | C 1 | C 0 | C 0 | 0 |
| 1 | 9 | 1 | 0 | A 0 | 1 |
| 1 | 10 | 1 | A 0 | C 1 | 0 |
| 1 | 11 | 1 | 0 | A 1 | 1 |
| 1 | 12 | A 1 | C 1 | C 0 | 0 |
| 1 | 13 | 1 | 1 | A 0 | 1 |
| 1 | 14 | 1 | A 1 | C 1 | 0 |
| 1 | 15 | 1 | 1 | A 1 | 1 |
| 0 | 0 | C 0 | C 0 | C 0 | 0 |

In this table, the states of flip-flops 3803–3806 are shown for fifteen time intervals assuming that the flip-flop 3803 is complemented at each interval. Between time interval 0 and time interval 1, flip-flop 3803 changes from the 0 state to the 1 state but flip-flop 3804 does not change state, so there is an anti-carry. Between time interval 1 and time interval 2, flip-flop 3803 changes from the 1 state to the 0 state and flip-flop 3804 changes from the 0 state to the 1 state so there is a carry. However, flip-flop 3804 changes from the 0 state to the 1 state and flip-flop 3805 does not change states so there is an anti-carry. From the distributed rate table above it can be seen that the flip-flop 3803 has an anti-carry between time intervals 0 and 1, 2 and 3, 4 and 5, 6 and 7, 8 and 9, 10 and 11, 12 and 13, 14 and 15. Flip-flop 3804 produces an anti-carry between time intervals 1 and 2, 5 and 6, 9 and 10, 13 and 14. Flip-flop 3805 produces an anti-carry between time intervals 3 and 4, and 11 and 12. Flip-flop 3806 produces an anti-carry between time intervals 7 and 8. The anti-carriers from each of the flip-flops 3803–3806 are the four bits of distributed rate at the output 3816. It should be noted that from the distributed rate table above that if all anti-carry outputs are OR'd, the OR'd output approaches a constant 1.

The distributed rate bit $dS_0/2$ is produced by the logic block 3810, the gating circuit 3817 and the inverter 3818. Similar circuitry is provided to produce the other distributed rate bits. The distributed rate signal is a very useful signal in indicating the rate of change of the contents of a register.

*6.6. Bit-Rate Summer/Register Sign Module.*—The B module shown in FIGURE 39 includes a flip-flop 3901 which as used in this problem, records the sign of the number standing in the whole register 3502–3507. When the flip-flop 3901 is in the 1 condition, the register sign Ⓢ is negative. When the flip-flop 3901 is in the 0 state, the register sign Ⓢ is positive.

The logic circuitry 3902–3904 is provided for use when the module is used as a summer for summing the two input rates $a$ and $c$. However, the circuitry 3902–3904 is not used in the instant problem.

The carry output from the C module 3502 is connected to the $c$ input 3905. The $a$ input at 3906 will be assumed to be a constant 0 with sign of 0 for the purposes of this problem. When there is a carry input 1 on line 3905, the logic circuit 3904 produces a 1 output $s\rightarrow$ which acts through OR-transient circuit 3907 to complement the flip-flop 3901. Normally this will indicate a sign change for the number standing in the register 3502–3507. When this sign change occurs, it is necessary to provide an end-around carry on the carry output 3908. This end-around carry is connected to the $c$ input of the least significant register 3507. This end-around carry is necessary whenever the count in the register 3502–3507 goes through 0. This end-around carry is necessary because the internal code of the register 3502–3507 is 1's complement and the least significant bit of the register must be complemented when the contents of the register pass through 0.

There are times when the complementing of the flip-flop 3901 does not indicate a sign change for the register 3502–3507, but, rather, indicates an overflow of the register. This is an alarm condition and it is desirable to produce an overflow alarm output on line 3909 to indicate this. The signal on line 3909 is connected to the special program section 128 in the control computer to indicate an alarm condition which will be brought to the attention of the programmer or which will be corrected automatically by the control computer.

In order to produce the carry output on 3908 or the overflow alarm output on line 3909, the gating circuitry 3910, 3911, 3912, and 3913 is provided. The operation of logic circuitry 3910–3913 can best be described with reference to particular examples producing an alarm output or a carry output when the register changes signs. First, the example which produces an output on 3908 when the register changes sign will be discussed. Assume the flip-flop 3901 is in the 1 condition indicating that the sign of the register Ⓢ is negative. Assume the carry input 3905 has a 1 input, thereby producing the signal $s\rightarrow$ of 1 at the output of gate 3904. Assume that the sign Ⓒ of the carry is 0, indicating that it is a carry and not a borrow. This sign of the carry will produce the signal $\overline{Ⓒ}=1$ at the output of logic block 3902. The assumptions just made describe the following condition. The number contained in the register 3502–3507 is negative as indicated by Ⓢ=1. The count is proceeding in the forward, or positive, direction as indicated by the sign of the carry Ⓒ=0. There is a carry $c$ of 1 indicating that the registers 3502–3507 have just overflowed. The condition just described is that the count in the register 3502–3507 has just passed through 0 passing in the positive direction. This condition should produce a carry output on the line 3908. Referring to the logic block 3910, the inputs reading from top to bottom are $S=1$, $\overline{C}=1$, $s\_\mathcal{J}=1$. These three inputs to the top section of logic block 3910 produce a 0 output. This 0 output is gated against the output of logic block 3903 in the gating circuit 3911. The output of logic block 3903 is a 1, indicating that there is a carry $c$ having a positive sign. The 0 from logic block 3910 and the 1 from logic block 3903 produce a 1 output on the line 3908 indicating a carry.

For the overflow alarm output example, assume the following conditions. The flip-flop 3901 contains a 0 indicating that the sign of the count in the register 3502–3507 is positive. Assume $c$ at 3905 is positive and $\overline{c}$ is 0, indicating a carry. The assumptions just made describe the condition in which the register 3502–3507 contains a positive number, the count is proceeding in the forward or positive direction and that there is an overflow carry $c$. This is an overflow alarm condition. The inputs to logic block 3910 reading from top to bottom are as follows: $S=0$, $\overline{C}=1$, $s\_\mathcal{J}=1$, $s\_\mathcal{J}=1$ $\overline{C}=0$, and $\overline{S}=1$. Since there is at least 0 input to each of the two sections of logic block 3910, the output is a 1. This 1 output, when combined with the $s\_\mathcal{J}=1$ in logic block 3912, produces a 0 output from that gate. This 0 ouput is inverted in inverter 3913 to produce a 1 input on 3909, indicating an overflow alarm.

*6.7 Operation.*—The operation of the computer in solving the differential equation $\dot{z}=-z\dot{x}+k$ is best described with reference to Tables 2 and 3 below showing the numbers in the register 3502–3507 and the S modules 3508–3511 for sixteen successive clock intervals.

TABLE 2

| Clock Interval | $2^{-11}z$ | $2^2\dot{x}$ | $-2^{-9}z\dot{x}$ | $2^{-9}k$ | $2^{-13}z\dot{x}+k$ | $2^{-13}dz$ |
|---|---|---|---|---|---|---|
| 0 | .7324219 | 0 | .00000 | .03125 | .03125 | .0019531 |
| 1 | .7343750 | 1 | −.73437 | .03125 | −.70312 | −.0439450 |
| 2 | .6904300 | 0 | .00000 | .03125 | .03125 | .0019531 |
| 3 | .6923831 | 1 | −.69238 | .03125 | −.66113 | −.0413206 |
| 4 | .6510625 | 0 | .00000 | .03125 | .03125 | .0019531 |
| 5 | .6530156 | 1 | −.65301 | .03125 | −.62176 | −.0388600 |
| 6 | .6141556 | 0 | .00000 | .03125 | .03125 | +.0019531 |
| 7 | .6161087 | 1 | −.61610 | .03125 | −.58485 | −.0365531 |
| 8 | .5795556 | 0 | .00000 | .03125 | .03125 | .0019531 |
| 9 | .5815087 | 1 | −.58150 | .03125 | −.55025 | −.0343906 |
| 10 | .5471181 | 0 | .00000 | .03125 | .03125 | .0019531 |
| 11 | .5490712 | 1 | −.54907 | .03125 | −.51782 | −.0323638 |
| 12 | .5167074 | 0 | .00000 | .03125 | .03125 | .0019531 |
| 13 | .5186605 | 1 | −.51866 | .03125 | −.48741 | −.0304631 |
| 14 | .4881974 | 0 | .00000 | .03125 | .03125 | .0019531 |
| 15 | .4901505 | 1 | −.49015 | .03125 | −.45890 | −.0286813 |
| 16 | .4614692 | | | | | |

TABLE 3

| Decimal Equivalent | Binary Numbers at End of Clock Interval (Before Clock Pulses) | | | | | | Clock Interval | |
|---|---|---|---|---|---|---|---|---|
| .7324219 | 0.1011 | 1011 | 1000 | 0000 | 0000 | 0000 | 0 | Reg. Contents. |
| +.0019531 | +0.0000 | 0000 | 1000 | 0000 | 0000 | 0000 | | Reg. Inputs. |
| .7343750 | 0.1011 | 1100 | 0000 | 0000 | 0000 | 0000 | 1 | Reg. Contents. |
| −.0439450 | −.0000 | 1011 | 0011 | 1111 | 1111 | 1011 | | Reg. Input. |
| .6904300 | 0.1011 | 0000 | 1100 | 0000 | 0000 | 0101 | 2 | Reg. Contents. |
| +.0019531 | .0000 | 0000 | 1000 | 0000 | 0000 | 0000 | | Reg. Input. |
| .6923831 | 0.1011 | 0001 | 0100 | 0000 | 0000 | 0101 | 3 | Reg. Contents. |
| −.0413206 | −.0000 | 1010 | 1001 | 0011 | 1111 | 1101 | | Reg. Input. |
| .6510625 | 0.1010 | 0110 | 1010 | 1100 | 0000 | 1000 | 4 | Reg. Contents. |

Referring to Table 2, the clock intervals are indicated in the first column. The second column shows the decimal equivalent of the binary number contained in the register 3502–3507. At each clock interval this is the scaled value of $z$. The third column shows the rate signal $\dot{x}$ at all intervals of time. $\dot{x}$ has a constant value of .125. The scaling fractor is $2^2$. Therefore, the scaled value of $\dot{x}$ shown in the third column is .5 which is represented by switching between the 0 state and the 1 state on successive clock intervals. The fourth column shows the scaled product $z\dot{x}$. The fifth column shows the scaled value of the constant $k$ which is assumed to be 16 in this problem. The sixth column shows the sum of the scaled values of $z\dot{x}+k$. The seventh column shows the values in the sixth column multiplied by a scaling factor of $2^{-4}$. As mentioned previously, this scaling factor of $2^{-4}$ was necessary to obtain $2^{-9}k$. In the computer, there is no actual multiplication of the values in the sixth column by $2^{-4}$ to obtain the values in the seventh column. Rather, the binary representation of the decimal number indicated in column 6 is added to the contents of the register at four orders lower than would normally be done to obtain the scaling factor $2^{-4}$. At each clock interval the $dz$ values in column 7 are added to the present contents of the register, column 1, to obtain the new contents of the register during the next clock interval.

Referring to Table 3, there is shown the binary number standing in the register 3502–3507 and in the S modules 3508–3511 at five intervals of time.

The initial condition of the register 3502–3507 is that it contains the number 1500 as we assumed in Section 6.1. After the scaling factor $2^{-11}$ has been applied to 1500, the decimal equivalent is .7324219. The binary representation of this decimal number is 1011, 1011, 1000, 0000, 0000, 0000 as shown in the top row in Table 3. This is the normal binary representation of a fraction as:

$$z = \frac{1}{2} + \frac{1}{2^2} + \frac{1}{2^3} + \frac{1}{2^4} + \cdots$$

This binary number is represented by the register 3502–3507 as follows. The four bits contained in C module 3502 are 1011. The four bits contained in A module 3503 are 1011. The four bits contained in the A module 3504 are 1000. The four bits of each of the A modules 3505–3507 are all 0's.

During the first clock interval the rate input $\dot{x}$ is a 0. This 0 is multiplied by the number in register 3502–3507 which is coupled over the four-bit lines 3512–3515 to each of the S modules 3508–3511. This multiplication takes place in the gating circuits 3701–3704. The resultant product, which is 0, is added to the four bits of the constant $k$ which are connected to the gating circuits 3705–3708 in each of the S modules. Four bits of this sum appear at the S output of each of the S modules. This sum is .0000, 0000, 1000, 0000, 0000, 0000 as shown in binary form in the second row binary numbers in Table 3. This binary number is the input to register 3502–3507. Four bits of this number are connected to the $a$ input of each of the A modules 3503–3507. The four bits 1000 (the ninth through twelfth bits to the right of the decimal point in the second row in Table 3) are connected to the $a$ input to A module 3504. These bits 1000 are applied to the input leads 3604, 3603, 3602, and 3601, respectively, of the A module. These four bits are added to the contents 1000 of the flip-flops 3608, 3607, 3606, and 3605, respectively. The result is that the flip-flop 3608 is complemented to the 0 state and a carry output is produced on the line 3630.

The carry output on line 3630 is applied to the *c* input of A module 3503.

This carry input to A module 3503 is applied to the *c* input denoted 3615 in FIGURE 36. This carry input complements the flip-flop 3605 in A module 3503. This flip-flop previously contained a 1; the carry at 3615 complements it to a 0 and produces a carry output from logic block 3619 which complements flip-flop 3606. This flip-flop 3606 had previously been in the 1 state; it is complemented to the 0 state and a carry output is produced from logic block 3622 which complements flip-flop 3607 in A module 3503. Filp-flop 3607 had previously been in the 0 state and is now in the 1 state. The result of adding the number in the second row of Table 3 to the present contents of the register 3502–3507 as shown in the first row of Table 3 is that the four flip-flops in A module 3503 are now set to the 1100 condition and the four flip-flops in A module 3504 are set to the 0000 condition during the second clock interval. Because of this, the binary number standing in register 3502–3507 during the second clock interval is 1011, 1100, 0000, 0000, 0000, 0000 as shown in the third row of Table 3.

This type of operation continues through the sixteen clock intervals indicated in Table 2 and the operation can continue until the capacity of the register 3502–3507 is exceeded. The contents of register 3502–3507 is the value of *z* at each clock interval as determined by the equation $$\dot{z} = -zx + k.$$

7. Description of operation involving solution of two-body problem

The equation chosen for illustrating the actual capabilities of the computer of this application is a radial acceleration equation in a two-body central force problem. This equation is:

$$m\ddot{R} = mR\dot{\phi}^2 \sin^2\theta + mR\dot{\theta}^2 - \frac{\gamma Mm}{2} + mT$$

$\ddot{R}$ is the radial acceleration, *m* is the mass of the body and M is the mass of the earth. The first and second terms on the right-hand side are the centrifugal force; the third is the gravitational force; and *mT* is the radial component of an applied thrust T. It is assumed that $\theta$ and $\phi$ are provided as analog voltages and are converted to twelve bit binary numbers by incremental converters which consequently also supply pulses proportional to $\dot{\theta}$ and $\dot{\phi}$. It is noted that for an earth-satellite problem the earth's radius, $R_0$, is the greatest part of $R = R_0 + r$ and that $\ddot{R}$ is primarily the difference of two very large terms. Hence, maximum precision is desired in this calculation. In addition, in such a problem it is often necessary to have the calculated radial acceleration constantly available. This required that all calculations be made in real time. The required precision and speed are not available in prior art digital or analog computers.

Figure 40:
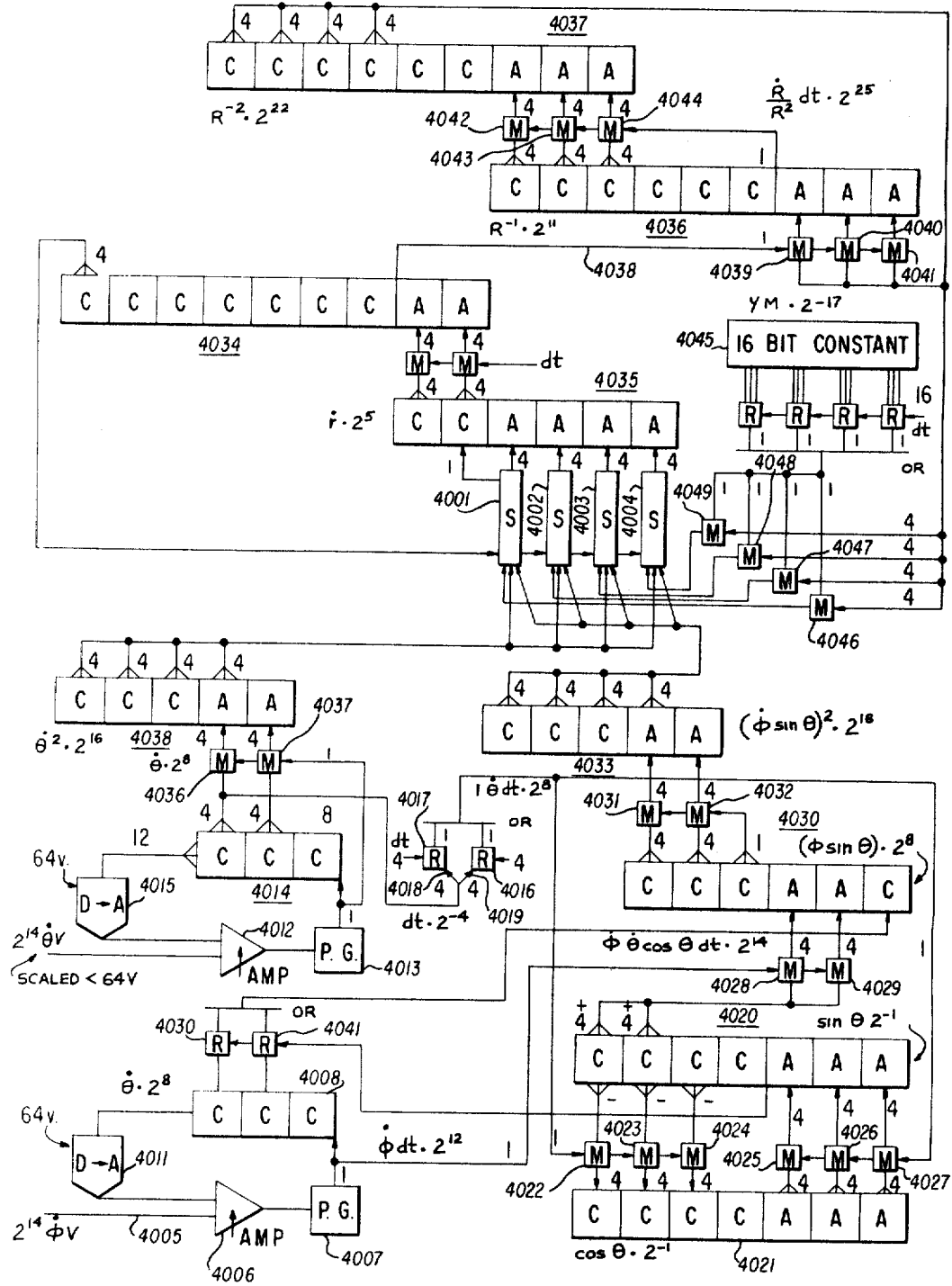
FIGURE 40 shows a block representation of the two-body problem.

FIGURE 40 shows in block form the modules and the interconnection of the modules required to continuously provide an output indicating the value of radial acceleration. The value of radial acceleration $\ddot{R}$ is continuously available to sixteen-bit precision as the outputs from the S modules 4001–4004. The remaining modules in FIGURE 40 are used to generate values corresponding to the four terms on the right-hand side of the radial acceleration equation. These four values are summed in the S modules 4001–4004.

In this problem, it is assumed that M, *m*, and $\gamma$ are constant. The term *mT* is available from another computer external to the one shown. The signal $\dot{\phi}$ is available as an analog voltage at 4005. This voltage is converted to a digital representation by the analog comparator 4006, pulse generator 4007, a reversible counter including C modules 4008–4010 and digital-to-analog converter 4011. The pulse generator 4007 adds forward or reverse pulses to the reversible counter 4008–4010 until this counter contains a digital representation of the magnitude of the analog input voltage. The digital representation is converted to an analog voltage in digital-to-analog converter 4011, the output of which is compared to the input.

In a similar manner, the analog voltage $\theta$ is converted to a digital representation by means of analog comparator 4012, pulse generator 4013, reversible register 4014, and digital-to-analog converter 4015.

In order to produce a signal proportional to $\dot{\theta}dt$, the digital representation of $\theta$ from register 4014 is connected to the rate multipliers 4016 and 4017. These rate multipliers are of the type shown in FIGURES 15 and 15a. Four bits of the $\theta$ number are connected to the *a* inputs 4018 and 4019 of rate multipliers 4017 and 4016, respectively. The distributed rate input to each rate multiplier 4016 and 4017 is the distributed rate of time which is obtained by gating clock pulses to the four distributed rate bits. The outputs of rate multipliers 4016 and 4017 are combined to form a number proportional to $\dot{\theta}dt$. This number very closely approximates $d\theta$ which will be used to form a number proportional to sin $\theta$.

In order to do this, a register 4020 and a register 4021 are provided. The register 4021 accumulates a number proportional to the cos $\theta$ and the register 4020 accumulates a number proportional to sin $\theta$. A number proportional to sin $\theta$ is multiplied by a number proportional to $\dot{\theta}dt$ in the parallel multipliers 4022–4024 which are of the type shown in FIGURES 30, 30a, and 30b. The outputs of the parallel multipliers 4022–4024 are numbers proportional to sin $\theta\dot{\theta}dt$ which approximate sin $\theta d\theta$. These numbers are integrated in the register 4021 to produce a number proportional to cosin $\theta$ in the register 4021. Similarly, the number proportional to cosin of $\theta$ from register 4021 is multiplied by a signal proportional to $d\theta$ in the multipliers 4025–4027. The output of multipliers 4024–4027 is a number proportional to cosin of $\theta d\theta$. This is integrated in the register 4020 to produce a number proportional to sin $\theta$.

The number from register 4020 is multiplied by a number proportional to $\dot{\phi}dt$ in the multipliers 4028 and 4029. The outputs of multipliers 4028 and 4029 are accumulated in a register 4030. Also added to this register is a number proportional to $\dot{\phi}\theta$ cosin $\theta dt$ obtained from multipliers 4030 and 4031. The output of register 4030 is multiplied by the rate of change in the register in the multipliers 4031 and 4032. The outputs of multipliers 4031–4032 are accumulated in register 4033 which integrates the outputs and produces a number proportional to $(\dot{\phi} \sin \theta)^2$. This number from the register 4033 is connected to the *a* input to each of the S modules 4001–4004. There are sixteen bits from register 4033 and four bits are connected to each of the S registers 4001–4004 at the *a* input. A number proportional to R is obtained from the register 4034. The four highest order bits of R are connected respectively to the S modules 4001–4004 at the *m* input. Each of the S modules 4001–4004 produces a number proportional to the product $R\dot{\phi}^2 \sin^2\theta$. This number is added to the other number inputs to the S modules.

The manner in which the number proportional to R is accumulated in register 4034 is as follows. A number proportional to $\ddot{R}$ is accumulated in S modules 4001–4004. The output of these S modules is integrated in register 4035 to produce a number proportional to $\dot{R}$. The output of this is integrated in turn in the register 4034 to form a number proportional to R.

In order to form a number proportional to $\dot{\theta}^2$, the multipliers 4036 and 4037 and the register 4038 are provided. The sixteen-bit output of register 4038 is proportional to $\dot{\theta}^2$. The sixteen-bit number proportional to $\dot{\theta}^2$ is connected to the *b* inputs to S modules 4001–4004 and they are multiplied by the four-bit number R to form a number proportional to $R\dot{\theta}^2$.

In order to accumulate a number proportional to $R^{-2}$, the registers 4036 and 4037 are provided. The register 4036 accumulates a number proportional to $R^{-1}$ and the register 4037 accumulates a number proportional to $R^{-2}$. A rate input is taken from register 4034 on the line 4038 and is proportional to $\dot{r}$. The rate $\dot{r}$ is multiplied by $R^{-2}$ in the multipliers 4039–4041. The output of multipliers 4039–4041 is integrated in the register 4036 to form a number proportional to $R^{-1}$. The rate of change of register 4036 is multiplied by the highest order twelve bits of register 4036 in the multipliers 4042–4044. The output of multipliers 4042–4044 is integrated in the register 4037 to form a number proportional to $R^{-2}$.

A sixteen-bit constant proportional to $\gamma M$ is produced as indicated at 4045. This sixteen-bit constant is multiplied by the sixteen bits proportional to $R^{-2}$ in the multipliers 4046–4049. The output is a number proportional to $\gamma Mm/R^{-2}$. This number is subtracted from the contents of S modules 4001–4004. The S modules 4001–4004 accumulate numbers proportional to $MR\dot{\phi}^2 \sin^2\theta \; MR\dot{\theta}^2$; and $-\gamma Mm/R^2$ as described above. Although the input term $mT$ is not shown, this term is also added to the contents of S modules 4001–4004. Thus, the S modules 4001–4004 accumulate a number proportional to $\ddot{R}$.

Although the particular embodiments of this invention have been shown and described, it will be appreciated that various other changes can be made without departing from the principles of the invention. The appended claims are, therefore, intended to cover any such modifications within the true spirit and scope of the invention.

What is claimed is:

1. A closed loop simultaneous computing system comprising a plurality of parallel logic registers, each of said registers being adapted for reversible counting,
    each of said registers being adapted for the accumulation of binary data,
    multistage parallel connecting matrix means connected to each of said registers,
    control means connected to said matrix means for coupling the outputs of selected registers to inputs of other of said registers whereby the signal produced at any one input of a register is a function of the signal produced at the output of that register, and said parallel logic registers containing numerical functions which are simultaneously and continually available as output data from said computing system.

2. The computing system recited in claim 1 wherein said system performs mathematical computations on at least one multi-bit, parallel input signal and one serial rate signal, each bit of said parallel input signal being connected to one of said registers, said rate signal being applied simultaneously to said register, said register being adapted to accumulate numbers to form a mathematical function of said parallel input signal and said rate signal, said register being adapted to provide a carry to successive registers.

3. The computing system recited in claim 2 wherein each of said registers includes a plurality of digital arithmetical units, each of said arithmetic units having means to perform a logical operation on at least two inputs, one bit of said parallel input signal being connected to one input to each arithmetic unit, said serial rate signal being connected to a second input to each arithmetic unit, said arithmetic units being interconnected to provide carries to successive arithmetic units, said arithmetic units providing a parallel output indicative of a function of said inputs.

4. A computing system comprising
    a plurality of parallel logic registers, each of said registers being adapted for reversible counting, each of said registers being adapted for the accumulation of binary data, certain of said parallel logic registers being interconnected to perform mathematical computations simultaneously and continually, said parallel logic registers containing numerical functions which are simultaneously and continually available as output data from said computing system,
    said system performs mathematical computations on at least one multi-bit, parallel input signal and one serial rate signal, each bit of said parallel input signal being connected to one of said registers, said rate signal being applied simultaneously to said register,
    said register being adapted to accumulate numbers to form a mathematical function of said parallel input signal and said rate signal, said register being adapted to provide a carry to successive registers,
    each of said registers including a plurality of digital arithmetical units comprising adder/subtractor modules,
    each of said arithmetic units having means to perform a logical operation on at least two inputs and means for multiplying at least two inputs to continually provide an output indicative of the product thereof, one bit of said parallel input signal being connected to one input to each arithmetic unit, said serial rate signal being connected to a second input to each arithmetic unit, and
    said arithmetic units being interconnected to provide carries to successive arithmetic units, said arithmetic units providing parallel output indicative of a function of said inputs.

5. The computing system recited in claim 4 wherein each adder/subtractor module has means for multiplying four bits of said parallel input number by said serial rate input, said multiplying means providing four partial products, each indicative of the product of one of said parallel input bits and said serial rate input, and wherein each of said adder/subtractor modules includes means to accumulate said partial products to provide a four-bit parallel output and a carry output indicative of said accumulated partial products.

6. A computing system comprising a plurality of parallel registers, each of said registers being adapted for the accumulation of binary data, certain of said parallel logic registers being interconnected to perform mathematical computations simultaneously and continually, said parallel logic registers containing numerical functions which are simultaneously and continually available as output data from said computing system, each of said registers being adapted to perform mathematical computations on at least one multi-bit parallel input signal and one serial rate signal, each bit of one parallel input signal being connected to one of said registers, a rate signal being applied simultaneously to said register, said register being adapted to accumulate a mathematical function of said parallel input signal and said rate signal, the mathematical function contained in said one register being connected to the parallel inputs of other registers.

7. The computing system recited in claim 6 wherein each register has means to provide a carry to a succeeding register.

8. The system recited in claim 6 wherein each register provides accumulation of said mathematical functions in a positive direction or a negative direction and wherein each mathematical function may have a positive or a negative value.

9. The computing system recited in claim 6 wherein said one register includes a plurality of digital or arithmetic units, each of said arithmetic units having means to perform a logical operation on at least two inputs, one bit of said parallel input signal being connected to one input to each arithmetic unit, said serial rate signal being connected to a second input to said arithmetic unit, said arithmetic units being interconnected to provide carries to successive arithmetic units, said arithmetic units providing a parallel output indicative of a function of said inputs.

10. The computing system recited in claim 9 wherein said arithmetic units are adder/subtractor modules and wherein the means for performing a logical function on said input includes means for multiplying at least two inputs to provide an output indicative of the product thereof.

11. The computing system recited in claim 10 wherein each adder/subtractor module has means for multiplying four bits of said parallel input number by said serial rate input, said multiplying means providing four partial products, each indicative of the product of one of said parallel input bits and said serial rate input, and wherein each of said adder/subtractor modules includes means to accumulate said partial products to provide a four-bit parallel output and a carry output indicative of said accumulated partial products.

12. The system recited in claim 6 wherein said other registers have means for producing the product of a rate signal and an input signal and wherein said other certain registers have means for accumulating the sum of said product and the number previously contained in said register, and wherein each of said registers has means for producing a carry signal.

13. The computing system recited in claim 6 wherein said other registers include a plurality of accumulator modules, each of said accumulating modules including at least one binary storage device, first means to logically combine first and second inputs, second means to logically combine third and fourth inputs, and means to add the outputs of said first and said second logical combining means, the output of said adding means being connected to complement said binary storage device.

14. The computing system recited in claim 13 wherein said first logical combining means includes means for multiplying a plurality of parallel input bits by a first serial rate input and wherein said second logical combining means includes means for multiplying a second plurality of parallel input bits by a second serial rate signal, the outputs of said first and said second multiplying means being the partial products of said parallel input bits and said serial rate signals, means to add corresponding partial products to form a plurality of partial sums, and means to complement a different binary storage device in accordance with each partial sum, means providing a carry between successive binary storage device, and means providing an output from said binary storage devices indicative of a function of said inputs.

15. The computing system recited in claim 14 including a source of clock pulses, and means responsive to the outputs of said multiplying means and to said clock pulses to complement said binary storage devices upon the occurrence of a clock pulse and in accordance with the condition of said multiplying means.

16. The system of claim 1 in which there is provided means for periodically converting each of a multiple of input variables to a digital representation of said variable, a plurality of means for periodically combining certain of said digital representations to form functions of said digital representations, each of said plurality of means providing an output function for each period of time, and means for accumulating the outputs of said plurality of combining means to periodically provide a digital representation of a complex function of said input variables, said accumulating means providing a digital output representing said complex function at each period of time.

17. The computing system recited in claim 16 wherein each of the plurality of means for combining the digital representations of said input variables includes at least one register, each of said registers including a plurality of parallel arithmetic units, said arithmetic units being directly interconnected to simultaneously perform an arithmetic computation in real time.

References Cited
UNITED STATES PATENTS

| | | | |
|---|---|---|---|
| 3,018,959 | 1/1962 | Thomas | 235—167 |
| 3,061,192 | 10/1962 | Terzian | 235—157 |
| 3,162,839 | 12/1964 | Cypser | 340—172.5 |

OTHER REFERENCES

Pages 156–160, 1955—Richards R. K. Arithmetic Operations in Digital Computers.

MALCOLM A. MORRISON, *Primary Examiner.*

ROBERT C. BAILEY, T. M. ZIMMER,
*Assistant Examiners.*